(12) United States Patent
Fukuda et al.

(10) Patent No.: US 8,683,520 B2
(45) Date of Patent: *Mar. 25, 2014

(54) INFORMATION PROVIDING SYSTEM, RECEIVING DEVICE, INFORMATION PROVIDING DEVICE, INFORMATION PROVIDING METHOD AND PROGRAM

(75) Inventors: Kazuhiro Fukuda, Kanagawa (JP); Tetsuo Maruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 810 days.

This patent is subject to a terminal disclaimer.

(21) Appl. No.: 12/114,303

(22) Filed: May 2, 2008

(65) Prior Publication Data

US 2009/0138914 A1 May 28, 2009

(30) Foreign Application Priority Data

Jun. 28, 2007 (JP) ................................ 2007-170996

(51) Int. Cl.
- G06F 3/00 (2006.01)
- G06F 13/00 (2006.01)
- H04N 5/445 (2011.01)

(52) U.S. Cl.
USPC .......................................................... 725/44

(58) Field of Classification Search
USPC ................... 725/44, 135, 32, 40, 56; 463/25; 341/176
See application file for complete search history.

(56) References Cited

U.S. PATENT DOCUMENTS

| | | | |
|---|---|---|---|
| 6,057,890 A * | 5/2000 | Virden et al. ................. 348/563 |
| 6,754,271 B1 * | 6/2004 | Gordon et al. ........... 375/240.12 |
| 2002/0194604 A1 | 12/2002 | Sanchez et al. |
| 2005/0050160 A1 | 3/2005 | Upendran et al. |
| 2005/0088333 A1 * | 4/2005 | Allport ......................... 341/176 |
| 2006/0015925 A1 * | 1/2006 | Logan ........................... 725/135 |
| 2007/0050809 A1 | 3/2007 | Pharn |
| 2007/0053514 A1 * | 3/2007 | Imai et al. ..................... 380/204 |

FOREIGN PATENT DOCUMENTS

JP    2001-337745    12/2001

(Continued)

OTHER PUBLICATIONS

U.S. Appl. No. 12/060,595, filed Apr. 1, 2008, Fukuda, et al.

(Continued)

*Primary Examiner* — Nasser Goodarzi
*Assistant Examiner* — An Nguyen
(74) *Attorney, Agent, or Firm* — Oblon, Spivak, McClelland, Maier & Neustadt, L.L.P.

(57) ABSTRACT

The information providing device includes the program listing information transmitting portion to transmit program listing information indicating a plurality of currently viewable programs to the receiving device, the related information storage portion to store related information including a plurality of pieces of information concerning a program edited to be sequentially displayed in association with the program, the program designation information receiving portion to receive program designation information designating a selected channel or a program selected or determined based on the program listing information from the receiving device, the related information extracting portion to extract related information corresponding to a program designated by the program designation information from the related information storage portion, and the related information transmitting portion to transmit the extracted related information to the receiving device. The information providing device which effectively provides the information concerning the currently viewable programs with simple operation is thereby provided.

20 Claims, 38 Drawing Sheets

(56) References Cited

FOREIGN PATENT DOCUMENTS

| | | |
|---|---|---|
| JP | 2002-232372 | 8/2002 |
| JP | 2003-125305 | 4/2003 |
| JP | 2004-56772 | 2/2004 |
| JP | 2005-204333 | 7/2005 |
| JP | 2006-41588 | 2/2006 |
| JP | 2006-333165 | 12/2006 |
| JP | 2007-88716 | 4/2007 |
| JP | 2007-116719 | 5/2007 |
| WO | WO 02/32139 A2 | 4/2002 |
| WO | WO 2005/022891 A2 | 3/2005 |

OTHER PUBLICATIONS

U.S. Appl. No. 12/119,780, filed May 13, 2008, Fukuda, et al.

Akio Yanagimachi, "The latest information of integrated digital broadcasting ISDB having many services", Trend of broadcast technology to be understood easily, From "NHK Giken news", NHK engineering service Foundation, Mar. 25, 1999, pp. 22-29 with an additional page.

Nobuyuki Sasaki, "Present situation of data broadcasting service BS digital broadcast (III)", Broadcasting technology, Kenrokukan publication Co., Ltd., vol. 54, Jun. 1, 2001, pp. 59-66.

European Communication pursuant to Article 94(3) EPC dated Sep. 24, 2013, in European Patent Application No. 08 156 630.9-1902.

* cited by examiner

FIG.8

■PROGRAM INFORMATION

PROGRAM INFORMATION ⇒ DETAIL DISPLAY

■SERVICE PROVISION INFORMATION

SALES INFORMATION ⇒ PRODUCT PURCHASE

ADVERTISING INFORMATION ⇒ DETAIL DISPLAY, QUESTIONNAIRE

PAYMENT INFORMATION ⇒ PAYMENT PROCEDURE

PROGRAM INFORMATION ⇒ RECORDING RESERVATION, VIEWING RESERVATION

FIG.9

```xml
<program id="P00001" name="PROFESSIONAL STYLE" genre="DOCUMENTARY" keywords="AAA AAA   BBB BBB   KNOW-HOW IMPRESSION" >
<oa start_date="2007/1/1" start_time="13:00:00" end_date="2007/1/1" end_time="15:00:00" >
    <details>
        <CreditsList>
            <Person id="1_1" name="AAA AAA"  Birthplace="Japan"/>
            <Person id="1_2" name="BBB BBB"  Birthplace="Japan"/>
            <Person id="1_3" name="CCC CCC"  Birthplace="Japan"/>
        </CreditsList>
    </details>
</oa>
<relation id="AA1" reference_id_list ="L00001"/>
</program>
```

FIG.10

```xml
<content id="C00001" name="PRODUCT 1" genre="PUBLICATION" keywords="XXX YYY ZZZ" maker="zony" price="100 YEN" content_info="www.zony.co.jp "/>
```

FIG.11

```
<program_relation id="L00001" name="HHH" start_date="2007/1/1" start_time="13:00:00" end_date="2007/1/1" end_time="15:00:00" >
    <link_program id="1" program_id="P00001" genre="SHOPPING "/>
    <link_content id="1" content_id="C00001" genre="SPORT"/>
    <link_content id="2" content_id="C00002" genre="DVD"/>
    <link_content id="3" content_id="C00003" genre="PUBLICATION"/>
</program_relation>
```

FIG.12

```
<ecg_set id="es00001" name="GGG" start_date="2007/1/1" start_time="13:00:00" end_date="2007/1/1" end_time="15:00:00" >
    <content id="1" type="program" program_id="P00001"/>
    <content id="2" type="content" content_id="C00001"/>
    <content id="3" type="content" content_id="C00002"/>
    <content id="4" type="content" content_id="C00003"/>
    <content id="5" type="content" content_id="C00004"/>
</ecg_set>
```

```
<ecg_scenario id="sc00011" name="GGG" start_date="2007/1/1" start_time="13:00:00" end_date="2007/1/1" end_time="15:00:00" >
    <content id="1" ecg_set_id="es00001"/>
    <content id="2" ecg_set_id="es00002"/>
    <content id="3" ecg_set_id="es00003"/>
    <content id="4" ecg_set_id="es00004"/>
</ecg_scenario>
```

FIG.15
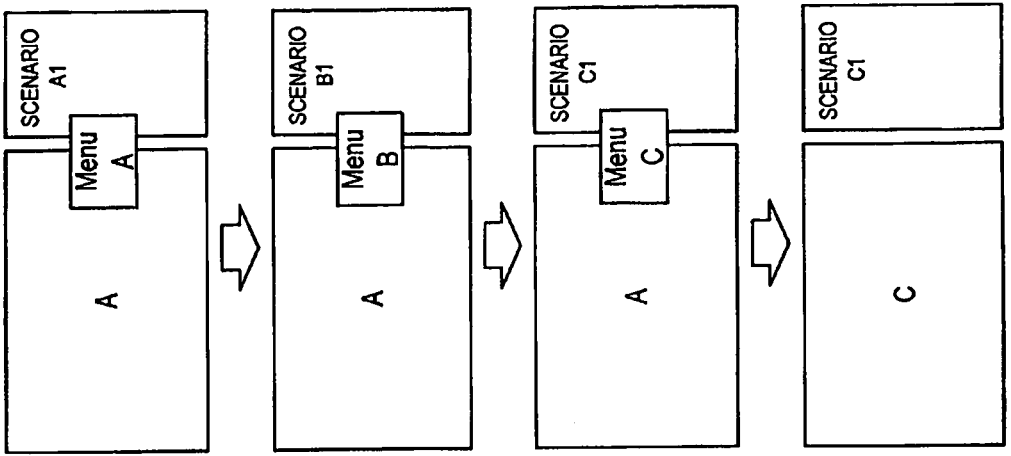
(1) PROGRAM BEING VIEWED (CHANNEL A)
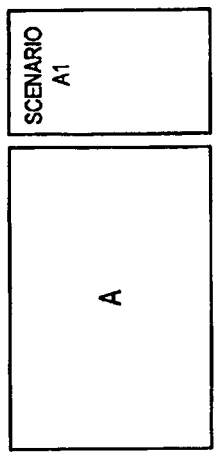
(2) PROGRAM CHANGE (CHANNEL A TO C)
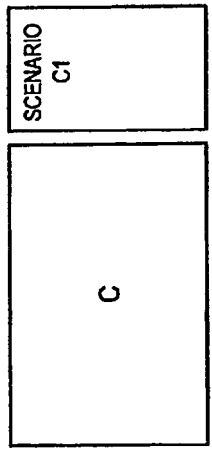
(3) RECORDED PLAYBACK IN PROGRESS
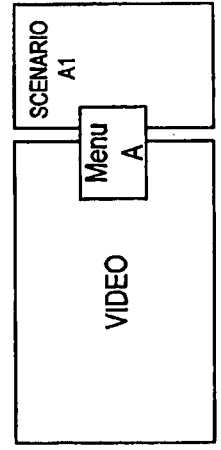

FIG.16
(5) MANUAL SWITCHING BY PROGRAM LIST
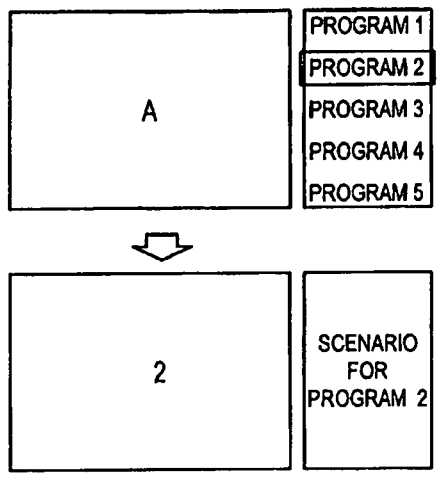
(6) AUTOMATIC SWITCHING BY PROGRAM LIST
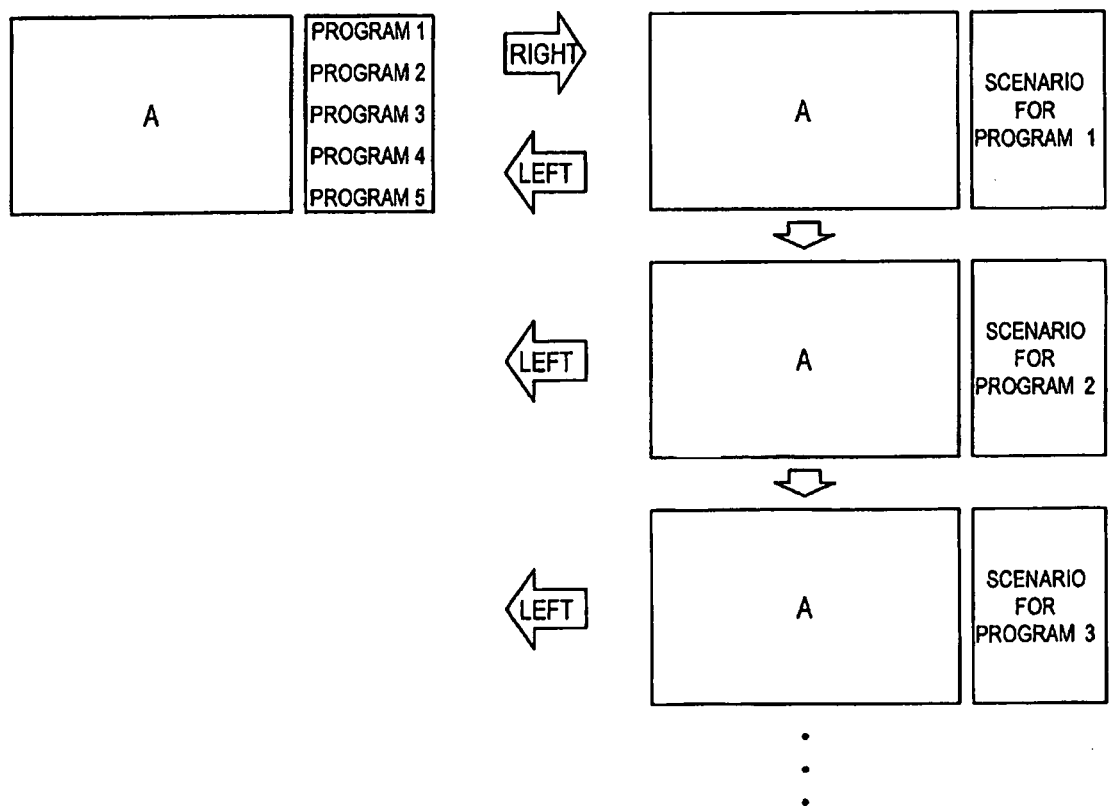

INFORMATION PROVIDING SYSTEM, RECEIVING DEVICE, INFORMATION PROVIDING DEVICE, INFORMATION PROVIDING METHOD AND PROGRAM

CROSS REFERENCES TO RELATED APPLICATIONS

The present invention contains subject matter related to Japanese Patent Application JP 2007-170996 filed in the Japan Patent Office on Jun. 28, 2007, the entire contents of which being incorporated herein by reference.

BACKGROUND OF THE INVENTION

1. Field of the Invention

The present invention relates to an information providing system, a receiving device, an information providing device, an information providing method and program.

2. Description of the Related Art

Recently, a system in which content providers transmit video/audio information related to a program, and a user receives, displays and plays back the video/audio information using a receiving terminal and views the video/audio information has been widespread. In such a system, information related to the program is transmitted together with the video/audio information.

A user of the receiving terminal can thereby browse electronic program guide (EPG) information or data broadcast information as information related to a program. The EPG information is information which indicates the scheduled broadcast time, overview or the like of a plurality of programs on a daily or weekly basis, for example. The data broadcast information is information which is provided additionally for the program being viewed.

Japanese Patent Application Publication No. 2005-94355 discloses an information display device which sequentially displays EPG information of other programs which are currently viewable while displaying video information related to the program being viewed.

SUMMARY OF THE INVENTION

However, the information which is provided as EPG information is limited, and it is not in conjunction with the currently viewable programs (i.e. a program change or the like is not updated in real time). On the other hand, although the information which is provided as data broadcast information contains information related to a program and is in conjunction with the currently viewable programs, it is provided to a user of a data broadcast service only. Further, the EPG information and the data broadcast information are not browsable while viewing a recorded video. Therefore, a user cannot browse the information related to the currently viewable programs for sure when viewing a program video or a recorded video.

When browsing the EPG information, a user operates a remote control which is attached to a receiving terminal or the like to select desired information (program) from the information displayed as a list. On the other hand, when browsing the data broadcast information, a user operates a remote control or the like according to an operation method which is specified for each provider of data broadcast information to select desired information. In some cases, when browsing the EPG information and the data broadcast information, a user operates a different user interface (remote control, operation button or the like) to select desired information. Thus, a user who has a passive attitude when viewing of a program video and a recorded video is requested to perform an active and complicated operation for acquiring information related to a program.

On the other hand, a content provider cannot provide information related to the currently viewable programs for sure to a user who is viewing a program video or a recorded video. Further, a content provider cannot provide information related to a program to a user without requiring the user to perform a complicated operation, and therefore it cannot efficiently prompt a user to access the provided information. Furthermore, because content providers provide information related to a program independently of one another, a method of information provision and display and an operation method requested for a user are not standardized, which hampers effective provision of information related to a program to a user.

In light of the foregoing, it is desirable to provide information providing system, receiving device, information providing device, information providing method and program which enable effective provision of information related to currently viewable programs with a simple operation.

According to an embodiment of the present invention, there is provided a receiving device connected with an information providing device for providing information concerning a program through a communication network. The receiving device includes a channel selecting portion to select a channel of a program to be received, a program listing information receiving portion to receive program listing information indicating a plurality of currently viewable programs from the information providing device, a selection determining portion to select a program based on the program listing information and determine selection of the program, a program designation information transmitting portion to transmit program designation information designating a selected channel or a program selected or determined based on the program listing information to the information providing device, a related information receiving portion to receive related information including a plurality of pieces of information concerning a program edited and associated with the program and corresponding to a program designated by the program designation information from the information providing device, and a display control portion to perform display control to display a video of a selected channel or a determined program and the program listing information, and sequentially display a plurality of pieces of information included in the received related information.

In this configuration, in the receiving device, program listing information which indicates a plurality of currently viewable programs is provided from the information providing device and displayed. By the channel selection operation or the selection determination operation based on the program listing information, the video display of the program is switched, and program designation information which designates a selected channel or a determined program is transmitted to the information providing device. Then, related information which includes a plurality of pieces of information concerning a program that are edited and associated with the program and which corresponds to a program that is designated by the program designation information is received from the information providing device. Then, the video of a selected channel or a determined program and the program listing information are display-controlled, and a plurality of pieces of information which are included in the related information are sequentially displayed. Because the related information is provided through the operation of channel selection or program selection or determination, a user can browse the information concerning the currently viewable programs for sure with simple operation. Further, because a plurality of pieces of information which are included in the related information are sequentially displayed, a user can efficiently browse the information concerning a program with high visibility.

The related information receiving portion may receive scenario information containing set information in a scenario form, each set information including a combination of program information concerning a program and service provision information concerning the program information or including the program information, as the related information from the information providing device. In this configuration, because the program information and the service provision information which are contained in scenario information are sequentially displayed, a user can easily browse the information concerning the currently viewable programs.

The receiving device may further include an attribute information designating portion to designate attribute information for selecting information with a prescribed attribute from a plurality of pieces of information included in the related information, an attribute designation information transmitting portion to transmit the designated attribute information as attribute designation information to the information providing device, and a second related information receiving portion to receive second related information including information with an attribute designated by the attribute designation information selectively extracted from a plurality of pieces of information included in the related information corresponding a program designated by the program designation information and edited from the information providing device, and the display control portion may perform display control to sequentially display a plurality of pieces of information included in the received second related information. In this configuration, the related information which is provided from the information providing device is designated in the receiving device. A user can thereby acquire the related information which match the user's wish rather than the related information which are intended for users in general and thus efficiently browse desired information.

The program listing information may be displayed separately from a video of a selected channel or a determined program by the display control portion, the program designation information transmitting portion may transmit the program designation information designating a program selected based on the program listing information to the information providing device, the related information receiving portion may receive the related information corresponding to the program designated by the program designation information from the information providing device, and the display control portion may perform display control to display the program information included in the received related information together with the program listing information. In this configuration, the program listing information and the program information are displayed separately from a video of the program. Therefore, the amount of program information to be displayed together with the program listing information is not limited due to the limitation of a display area, and a user can select a channel without suffering from low visibility and operability. A user can thereby select a desired program accurately by referring to the program information.

The receiving device may further include a related information processing portion to process the related information received from the information providing device, and the related information processing portion may process the related information in such a way that a plurality of pieces of set information associated with a program are displayed according to preset priorities, and a plurality of pieces of service provision information associated with the program information are displayed according to preset priorities after the program information included in each set information is displayed, by display control of the display control portion. In this configuration, the program information and the service provision information which are contained in the scenario information are sequentially displayed in units of set information according to the priorities, and therefore a user can efficiently browse the information related to the currently viewable programs.

The related information processing portion may process the related information in such a way that the scenario information is repeatedly displayed by display control of the display control portion. In this configuration, the scenario information is repeatedly displayed, and therefore a user can easily browse the information related to the currently viewable programs.

The receiving device may further include a processing request transmitting portion to transmit a processing request for requesting provision of detail information concerning selected program information to the information providing device when selection of the program information is determined, and transmit a processing request for requesting provision of detail information concerning selected service provision information to the information providing device when selection of the service provision information is determined, and a detail information receiving portion to receive detail information corresponding to the processing request from the information providing device, and the display control portion may perform display control to display the received detail information. In this configuration, the detail information concerning the program information and the service provision information is displayed, and therefore a user can easily browse the information related to the currently viewable programs.

If the channel selecting portion and the selection determining portion are not operated for a predetermined length of time with the program listing information being displayed, the program designation information transmitting portion may sequentially transmit the program designation information respectively designating a plurality of programs included in the program listing information to the information providing device, and the display control portion may perform display control so as to sequentially display the related information received from the information providing device based on the program designation information. In this configuration, the related information concerning a plurality of programs which are included in the program listing information is sequentially displayed without performing channel selection or program selection or determination. Thus, a user can easily browse the information related to the currently viewable programs.

The display control portion may perform display control in a video display area for displaying a video of a selected channel or a determined program or a prerecorded video, a program listing information display area for displaying the program listing information and a related information display area for displaying the related information, and the program listing information display area and the related information display area may be arranged not to overlap the video display area. Because the program listing information and the related information are displayed without overlapping the display of a program video or recorded video in this configuration, a user can browse the information related to the currently viewable programs with high visibility together with a program video or a recorded video.

According to another embodiment of the present invention, there is provided an information providing device connected with a receiving device for receiving a program through a communication network. The information providing device includes a program listing information transmitting portion to transmit program listing information indicating a plurality of currently viewable programs to the receiving device, a related information storage portion to store related information including a plurality of pieces of information concerning a program edited to be sequentially displayed, in association with the program, a program designation information receiving portion to receive program designation information designating a selected channel or a program selected or determined based on the program listing information from the receiving device, a related information extracting portion to extract related information corresponding to a program designated by the program designation information from the related information storage portion, and a related information transmitting portion to transmit the extracted related information to the receiving device In this configuration, in the information providing device, the related information including a plurality of pieces of information concerning a program edited to be sequentially displayed in association with the program in the information providing device. Then, the program designation information which designates a selected channel or a program selected or determined based on the program listing information is received from the receiving device. Then, the related information which corresponds to a program that is designated by the program designation information is extracted, and the extracted related information is transmitted to the receiving device. Because the related information is edited so as to sequentially display a plurality of pieces of information concerning a program, a content provider can effectively provide the information related to the currently viewable programs to a user with high visibility through the information providing device.

The related information storage portion may store scenario information containing set information in a scenario form, each set information including a combination of program information concerning a program and service provision information concerning the program information or including the program information, as the related information in association with the program. In this configuration, the related information is edited so as to sequentially display the program information and the service provision information in a scenario form. Therefore, a content provider can effectively provide the information for prompting the program channel selection or the use of services to a user through the information providing device.

The information providing device may further include an attribute designation information receiving portion to receive attribute designation information designated for selecting information with a prescribed attribute from a plurality of pieces of information included in the related information from the receiving device, a second related information extracting portion to extract the related information corresponding to a program designated by the program designation information from the related information storage portion, selectively extract information with an attribute designated by the attribute designation information from a plurality of pieces of information included in the extracted related information and edit the selectively extracted information as second related information, and a second related information transmitting portion to transmit the edited second related information to the receiving device. In this configuration, the related information which is provided from the information providing device is designated in the receiving device. A content provider can thereby effectively provide the related information which match the user's wish through the information providing device. Further, a content provider can thereby keep track of preferences of users in general about program viewing and service provision based on the program designation information and the attribute designation information which are provided from users to the information providing device.

The related information storage portion may store scenario information containing a plurality of pieces of set information prioritized concerning the program, each set information including a combination of the program information and a plurality of pieces of service provision information prioritized concerning the program information or including the program information, as the related information in association with the program. Because the related information is edited so as to sequentially display the program information and the service provision information in units of set information according to the priorities, a content provider can effectively provide the information for prompting the program channel selection or the use of services to a user according to the priorities through the information providing device.

The information providing device may further include a detail information associating portion to associate detail information concerning the program information and the service provision information respectively with the program information and the service provision information, a processing request receiving portion to receive a processing request for requesting provision of detail information concerning the program information or detail information concerning the service provision information from the receiving device, a detail information acquiring portion to acquire the detail information corresponding to the received processing request, and a detail information transmitting portion to transmit the detail information acquired based on the processing request to the receiving device. In this configuration, the detail information concerning the program information and the service provision information is respectively associated with the program information and the service provision information, and therefore an information provider can effectively provide the detail information for prompting the program channel selection or the use of services to a user.

The detail information associating portion may associate information for executing processing necessary for service provision based on the service provision information with the service provision information. Because the information for executing processing that is necessary for service provision is associated with the service provision information, an information provider can effectively prompt the use of services based on the service provision information to a user.

According to another embodiment of the present invention, there is provided an information providing system where a receiving device for receiving a program and an information providing device for providing information concerning a program are connected through a communication network. The receiving device of the information providing system includes a channel selecting portion to select a channel of a program to be received, a program listing information receiving portion to receive program listing information indicating a plurality of currently viewable programs from the information providing device, a selection determining portion to select a program based on the program listing information and determine selection of the program, a program designation information transmitting portion to transmit program designation information designating a selected channel or a program selected or determined based on the program listing information to the information providing device, a related information receiving portion to receive related information based on the program designation information from the information providing device, and a display control portion to perform display control to display a video of a selected channel or a determined program and the program listing information, and sequentially display a plurality of pieces of information included in the received related information. The information providing device of the information providing system includes a program listing information transmitting portion to transmit the program listing information indicating a plurality of currently viewable programs to the receiving device, a related information storage portion to store the related information including a plurality of edited pieces of information concerning a program in association with the program, a program designation information receiving portion to receive the program designation information from the receiving device, a related information extracting portion to extract the related information corresponding to a program designated by the program designation information from the related information storage portion, and a related information transmitting portion to transmit the extracted related information to the receiving device.

In this configuration, the program listing information which indicates a plurality of currently viewable programs is provided from the information providing device to the receiving device and displayed. In the receiving device, the video display of the program is switched by the channel selection operation or the selection determination operation based on the program listing information, and the program designation information which designates a selected channel or a determined program is transmitted to the information providing device. In the information providing device, the related information generated by editing a plurality of pieces of information concerning a program is stored in association with the program, and the related information which corresponds to a program that is designated by the program designation information is transmitted to the receiving device. In the receiving device, the video of a selected channel or a determined program and the program listing information are displayed, and a plurality of pieces of information which are included in the related information are sequentially displayed. Because the related information is provided through the operation of channel selection or program selection or determination, a user can browse the information concerning the currently viewable programs for sure with simple operation. Further, because the related information is edited so as to sequentially display a plurality of pieces of information contained in the related information, a content provider can effectively provide the information related to the currently viewable programs to a user with high visibility through the information providing device.

According to another embodiment of the present invention, there is provided an information providing method applied to an information providing system where a receiving device for receiving a program and an information providing device for providing information concerning a program are connected through a communication network. The information providing method includes the steps of storing related information including a plurality of edited pieces of information concerning a program in association with the program by the information providing device, providing program listing information indicating a plurality of currently viewable programs to the receiving device by the information providing device, selecting a channel of a program to be received or selecting or determining a program based on the program listing information by the receiving device, acquiring program designation information designating a selected channel or a program selected or determined based on the program listing information from the receiving device by the information providing device, extracting related information corresponding to a program designated by the program designation information from the related information stored in association with the program and providing the extracted related information to the receiving device by the information providing device, and performing display control to display a video of a selected channel or a determined program and the program listing information, and sequentially display a plurality of pieces of information included in the extracted related information by the receiving device.

In this method, the related information that is generated by editing a plurality of pieces of information concerning a program is stored in association with the program. In the information providing device, the program listing information which indicates a plurality of currently viewable programs is provided to the receiving device. In the receiving device, the program designation information which designates a selected channel or a selected or determined program by the channel selection or the selection determination based on the program listing information is transmitted to the information providing device. In the information providing device, the program designation information is acquired, and the related information which corresponds to a program that is designated by the program designation information is extracted and transmitted to the receiving device. In the receiving device, the video of a selected channel or a determined program and the program listing information are displayed, and a plurality of pieces of information which are included in the related information are sequentially displayed.

According to another embodiment of the present invention, there is provided a program which causes a computer to function as a channel selecting portion to select a channel of a program to be received, a program listing information receiving portion to receive program listing information indicating a plurality of currently viewable programs from the information providing device, a selection determining portion to select a program based on the program listing information and determine selection of the program, a program designation information transmitting portion to transmit program designation information designating a selected channel or a program selected or determined based on the program listing information to the information providing device, a related information receiving portion to receive related information including a plurality of pieces of information concerning a program edited and associated with the program and corresponding to a program designated by the program designation information from the information providing device, and a display control portion to perform display control to display a video of a selected channel or a determined program and the program listing information, and sequentially display a plurality of pieces of information included in the received related information.

In this configuration, program listing information which indicates a plurality of currently viewable programs is provided from the information providing device and displayed. By the channel selection or the selection determination operation based on the program listing information, the video display of the program is switched, and program designation information which designates a selected channel or a determined program is transmitted to the information providing device. Then, related information which includes a plurality of pieces of information concerning a program that are edited and associated with the program and which corresponds to a program that is designated by the program designation information is received from the information providing device. Then, the video of a selected channel or a determined program and the program listing information are display-controlled, and a plurality of pieces of information which are included in the related information are sequentially displayed.

According to another embodiment of the present invention, there is provided a program which causes a computer to function as a program listing information transmitting portion to transmit program listing information indicating a plurality of currently viewable programs to the receiving device, a related information storage portion to store related information including a plurality of pieces of information concerning a program edited to be sequentially displayed, in association with the program, a program designation information receiving portion to receive program designation information designating a selected channel or a program selected or determined based on the program listing information from the receiving device, a related information extracting portion to extract related information corresponding to a program designated by the program designation information from the related information storage portion, and a related information transmitting portion to transmit the extracted related information to the receiving device.

In this configuration, the related information including a plurality of pieces of information concerning a program edited to be sequentially displayed is stored in association with the program. Then, the program designation information which designates a selected channel or a program selected or determined based on the program listing information is received from the receiving device. Then, the related information which corresponds to a program that is designated by the program designation information is extracted, and the extracted related information is transmitted to the receiving device.

According to the embodiments of the present invention described above, there is provided an information providing system, a receiving device, an information providing device, an information providing method and a program which enable effective provision of information related to currently viewable programs with a simple operation.

BRIEF DESCRIPTION OF THE DRAWINGS

FIG. 8 is an explanatory view showing an example of the peripheral configuration of an ECG scenario.

FIG. 9 is an explanatory view showing an example of metadata (program information) which is contained in an ECG scenario.

FIG. 10 is an explanatory view showing an example of metadata (service provision information) which is contained in an ECG scenario.

FIG. 11 is an explanatory view showing an example of metadata (association information for establishing association among a program, program information and service provision information) which is contained in an ECG scenario.

FIG. 12 is an explanatory view showing an example of metadata (ECG set and ECG scenario) which is contained in an ECG scenario.

FIG. 15 is an explanatory view showing display patterns of a display screen in execution of an ECG scenario.

FIG. 16 is an explanatory view showing display patterns of a display screen in execution of an ECG scenario.

DETAILED DESCRIPTION OF THE PREFERRED EMBODIMENTS

Figure 1:
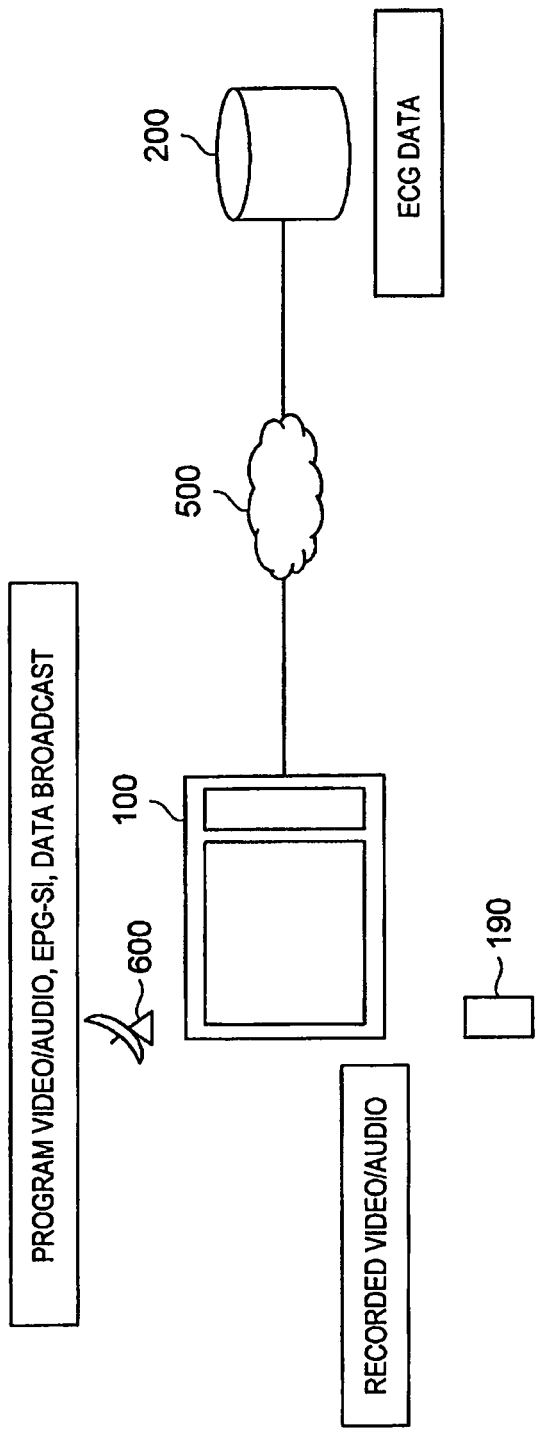
FIG. 1 is an explanatory view conceptually showing a configuration of an information providing system.

Hereinafter, preferred embodiments of the present invention will be described in detail with reference to the appended drawings. Note that, in the specification and the appended drawings, structural elements that have substantially the same function and structure are denoted with the same reference numerals, and repeated explanation of these structural elements is omitted.

First Embodiment

Configuration of Information Providing System

FIG. 1 is an explanatory view conceptually showing the configuration of an information providing system according to the first embodiment of the present invention. Referring to FIG. 1, the information providing system includes a receiving terminal 100 (receiving device) of a user and an electronic content guide (ECG) server 200 (information providing device) which is connected to the receiving terminal 100 through a communication network 500.

The receiving terminal 100 receives video/audio information, data broadcast information and electronic program guide-service information (EPG-SI) which are related to the currently viewable programs through a receiving antenna 600 or the like and provides the information to a user. In some cases, the receiving terminal 100 provides prerecorded video/audio information to a user. Further, the receiving terminal 100 according to this embodiment can receive the information related to the currently viewable program from the ECG server 200 which is connected through the communication network 500 and provide the received information to a user.

The ECG server 200 includes a storage portion which stores various information, a communication portion which communicates various information and so on as described later, and it operates a system which provides information related to a program to a user of the receiving terminal 100. The ECG server 200 registers and manages the information which is related to a program as ECG data and transmits the ECG data which is related to the currently viewable program to the receiving terminal 100 through the communication network 500 to thereby provide the information to a user of the receiving terminal 100.

A user of the receiving terminal 100 can select the provided information which is received through the communication network 500, the receiving antenna 600 and so on, such as video/audio information, data broadcast information, EPG-SI information and ECG data that are related to a program by operating a remote control 190 for the receiving terminal 100, for example. On a display screen of the receiving terminal 100, video information and ECG data related to a program are respectively displayed on the left and right sides of the display screen, for example, in the state where the ECG service provision is active.

Figure 2:
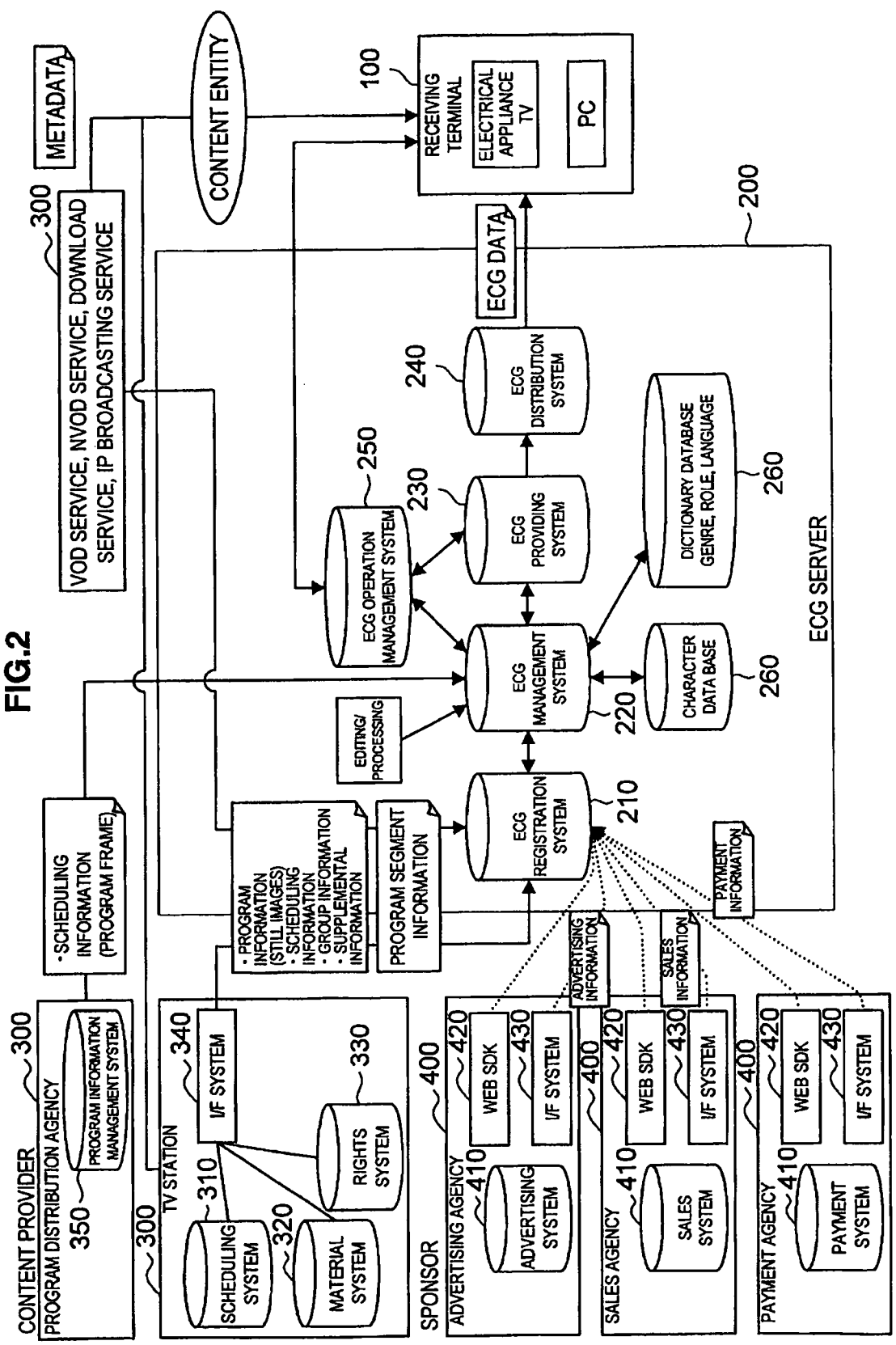
FIG. 2 is an explanatory view showing an example of a configuration model of an information providing system.

FIG. 2 is an explanatory view showing an example of a configuration model of an information providing system according to this embodiment. Referring to FIG. 2, the information providing system includes a content provider 300, a sponsor 400, a receiving terminal 100 and an ECG server 200.

The content provider 300 is a content provider which provides information related to a program together with video/audio information, data broadcast information and EPG-SI information related to a program. The content provider 300 may include a TV station, a data broadcast station and a program distribution agency, for example. The information related to a program includes program information (including still image information), scheduling information, group information, supplemental information, program segment information and so on (which are collectively referred to hereinafter as program information).

The TV station operates a scheduling system 310, a material system 320, a right system 330 and so on which manage program information that is related to a program. The data broadcast station operates a program information management system which manages program information related to a provided program that is provided by video-on-demand (VOD), near video-on-demand (NVOD), download, IP broadcasting services or the like. The program distribution agency operates a program information management system 350 which manages program information (scheduling information) related to a distributed programs. The content provider 300 provides video/audio information and so on that is related to a program to a user of the receiving terminal 100 and also provides program information and detail information, which is described later, that is related to a program to the ECG server 200 through an input/output (I/F) system 340 or the like. The program information which is provided from the content provider 300 is provided to a user of the receiving terminal 100 through the ECG server 200.

The sponsor 400 may include an advertising agency, a sales agency, a payment agency and so on which provide advertising, sales, payment services and so on. In some cases, it may also include a content provider which provides video/audio information that is related to a program. The sponsor 400 operates a different kind of information processing system 410 according to business type such as advertising, sales or payment system, a Web software development kit (SDK) 420, an I/F system 430 and so on.

The sponsor 400 provides advertising information and sales information which introduce products or services that are sold or provided by an advertiser of the sponsor 400 or the sponsor 400, for example. If the sponsor 400 is a payment agency, the sponsor 400 provides payment information in the processing of product purchase based on sales information. If the sponsor 400 is a content provider, the sponsor 400 provides program information which introduces a content such as a program that is provided or distributed by the sponsor 400. The advertising information, sales information, payment information, program information and so on which are provided by the sponsor 400 are provided as service provision information that is related to a program to a user of the receiving terminal 100 through the ECG server 200.

As described above, the receiving terminal 100 receives video/audio information or the like that is related to a program from the content provider 300, and also receives ECG data such as program information and service provision information that are related to a program from the ECG server 200.

Configuration of Information Providing Device

The ECG server 200 (information providing device) is operated by an information service provider or the like which produces, manages and provides information related to a program as ECG data. The ECG server 200 includes an ECG registration system 210, an ECG management system 220, an ECG providing system 230, an ECG distribution system 240, an ECG operation management system 250, databases 260 and so on.

The ECG registration system 210 registers information that is related to a program (program information, service provision information etc.) which is provided from the content provider 300 and the sponsor 400. The databases 260 include a character database and a dictionary database, for example, and store detail information concerning program information such as program scheduling, cast, genre and music and event related to a program.

The ECG management system 220 manages the program information and the service provision information which are registered in the ECG registration system 210 and the detail information which is stored in the databases 260. The ECG management system 220 performs various editing and processing on the program information, the service provision information and the detail information. Particularly, the ECG management system 220 produces information related to a program as ECG data and establishes associations or set priorities among the ECG data, thereby editing a plurality of pieces of ECG data into an ECG scenario, as described in detail later.

Further, the ECG management system 220 produces program listing information which indicates a plurality of currently viewable programs as ECG data by performing editing and processing on the program information. The information provided as the program listing information which is produced as ECG data is not limited as electronic program guide (EPG) information, and the program listing information may contain information such as still images contained in program information, for example, in addition to information concerning a broadcast time and an overview of a program. The program listing information is in conjunction with the currently viewable program, and it is updated in real time according to a program change.

The ECG providing system 230 provides the ECG data such as an ECG scenario and program listing information which are managed by the ECG management system 220 to a user of the receiving terminal 100 through the ECG distribution system 240. In response to a request from the receiving terminal 100, the ECG distribution system 240 provides the ECG data which is provided from the ECG providing system 230 to the receiving terminal 100 through the communication network 500.

The ECG operation management system 250 controls the ECG management system 220 and the ECG providing system 230, thereby managing the entire system operation of the ECG server 200.

In the ECG server 200, the ECG registration system 210, the ECG management system 220 and the databases 260, for example, serve as a related information storage portion 272, a detail information associating portion 280 and so on, which are described later. The ECG providing system 230 serves as a related information extracting portion 276 and a detail information acquiring portion 284 and so on. The ECG distribution system 240 serves as a program listing information transmitting portion 270, a related information transmitting portion 278, a detail information transmitting portion 286, a processing request receiving portion 282, and so on. Such a configuration is illustrated by an example only, and the configuration of the ECG server 200 is not limited to the above-described configuration.

Overall Configuration of Receiving Device

Figure 3:
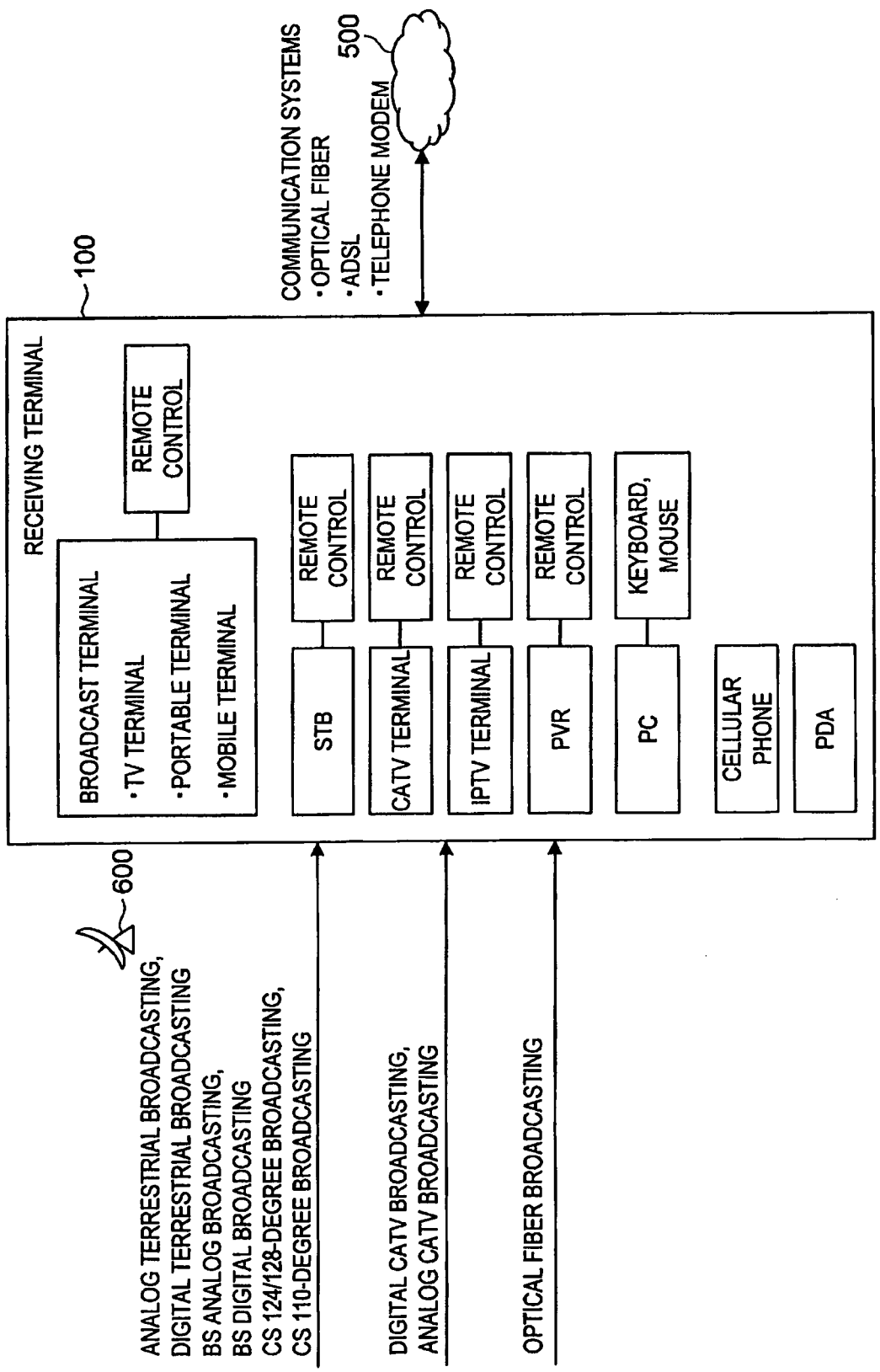
FIG. 3 is an explanatory view conceptually showing an example of the configuration of a communication network and a receiving terminal which are related to an information providing system.

FIG. 3 is an explanatory view conceptually showing an exemplary configuration of the receiving terminal 100 (receiving device) which is included in the information providing system according to this embodiment. Referring to FIG. 3, the receiving terminal 100 receives programs which are broadcasted through various transmission lines, such as analog terrestrial broadcasting, digital terrestrial broadcasting, broadcast satellite (BS) analog broadcasting, BS digital broadcasting, communication satellite (CS) 124/128-degree broadcasting, CS110-degree broadcasting, digital common antenna television (CATV) broadcasting, analog CATV broadcasting and optical fiber broadcasting, for example, through the receiving antenna 600 or the like.

The receiving terminal 100 may be a receiving terminal such as a TV terminal, a portable terminal or a mobile terminal, a set top box (STB), a CATV terminal, an internet protocol television (IPTV) terminal, a personal video recorder (PVR), a personal computer (PC), a cellular phone or a personal digital assistant (PDA), for example. The receiving terminal 100 is capable of communication through the communication network 500 including such as an optical fiber, asymmetric digital subscriber line (ADSL) and a telephone modem.

The receiving terminal 100 may be operated using a remote control, a keyboard, a mouse and so on. A remote control 190 for the receiving terminal 100 may include a channel selection button for selecting the channel of a program to be received, up, down, left and right buttons, an enter button, and so on, for example. A user of the receiving terminal 100 can directly select the channel of a program which is currently viewable by operating the channel selection button. Alternatively, a user can select the channel of a program by selecting a desired program based on program listing information which shows a plurality of currently viewable programs by operating the up, down, left and right buttons and determining the selection of the selected program by operating the enter button. The up, down, left and right buttons and the enter button may be operated in the same manner for the selection and determination of various information, besides the program channel selection.

The remote control 190 may further include an EPG-SI information button, a data broadcast information button, an ECG service button and so on, for example. A user of the receiving terminal 100 can access the EPG-SI information and the data broadcast information which are provided from the content provider 300 by operating the EPG-SI information button and the data broadcast information button, respectively. A user can also request the ECG server 200 to start or terminate the provision of an ECG service by operating the ECG service button.

Although the operation method using the remote control 190 is described above, the operation method using a keyboard, a mouse or an operating portion in the main body of the receiving terminal 100 is substantially the same as the operation method using the remote control 190 and a detailed description is omitted.

Figure 4:
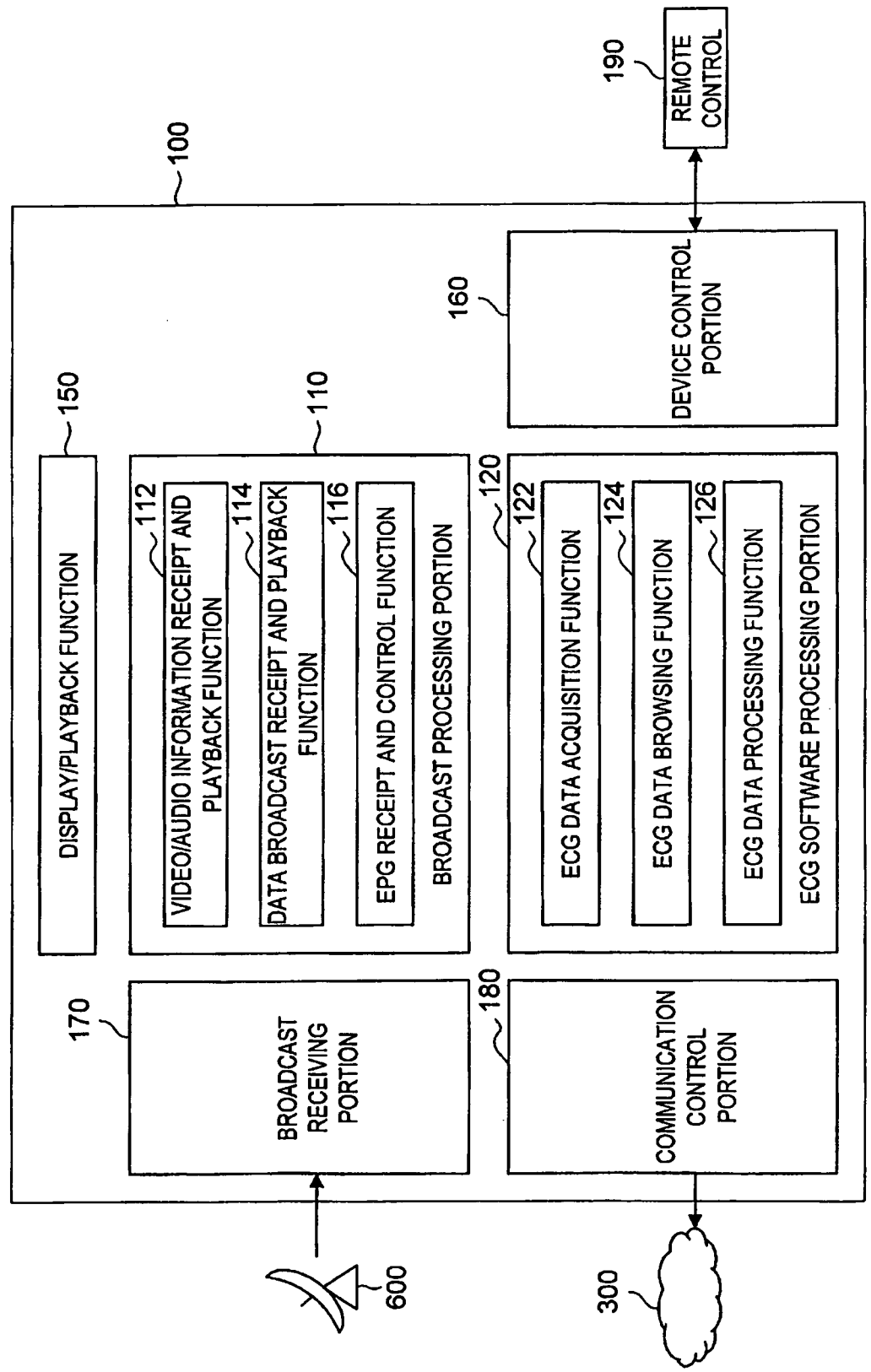
FIG. 4 is an explanatory view conceptually showing a functional configuration of a receiving terminal.

FIG. 4 is an explanatory view conceptually showing a functional configuration of the receiving terminal 100 according to this embodiment. Each functional block of the receiving terminal 100 is controlled by a computer system which includes CPU. A storage portion which is included in the receiving terminal 100 and/or a recording medium which is removable from the receiving terminal 100 stores a program for causing each functional block to be functioning.

Referring to FIG. 4, the receiving terminal 100 includes a broadcast processing portion 110, an ECG software processing portion 120, a display/playback portion 150 and a device control portion 160. The broadcast processing portion 110 includes a video/audio information receipt and playback function 112, a data broadcast receipt and playback function 114 and an EPG receipt and control function 116. The ECG software processing portion 120 includes an ECG data acquisition function 122, an ECG data browsing function 124 and an ECG data processing function 126.

In the receiving terminal 100, with the function of the ECG data acquisition function 122, the ECG software processing portion 120 serves, in conjunction with the communication control portion 180, as a program listing information receiving portion 132, a program designation information transmitting portion 136, a related information receiving portion 138, a processing request transmitting portion 144, a detail information receiving portion 146 and so on, which are described later. With the functions of the ECG data browsing function 124 and the ECG data processing function 126, the ECG software processing portion 120 serves as a related information processing portion 142 and so on. The display/playback portion 150 serves, in conjunction with the broadcast processing portion 110, the ECG software processing portion 120, the device control portion 160 and so on, as a display control portion 140 which includes a video display portion, a program listing information display portion and a related information display portion. Further, the remote control 190 serves as a channel selecting portion 130, a selection determining portion 134 and so on. Such a configuration is illustrated by an example only, and the configuration of the receiving terminal 100 is not limited to the above-described configuration.

The broadcast processing portion 110 receives video/audio information and data broadcast information that are related to a program from the content provider 300 through a broadcast receiving portion 170, performs necessary processing and displays and plays back the information by the display/playback portion 150. The broadcast processing portion 110 also receives EPG information from the content provider 300 through the broadcast receiving portion 170 and performs necessary control such as display or operation of the EPG information. The ECG software processing portion 120 acquires information related to the currently viewable program as ECG data from the ECG server 200 through a communication control portion 180, performs necessary processing and displays and plays back the information by the display/playback portion 150, thereby allowing a user to browse the information. The device control portion 160 controls the processing operation of the broadcast processing portion 110 and the ECG software processing portion 120 through the operation of the remote control 190 by a user.

Configuration of Receiving Terminal and ECG Server

Figure 5:
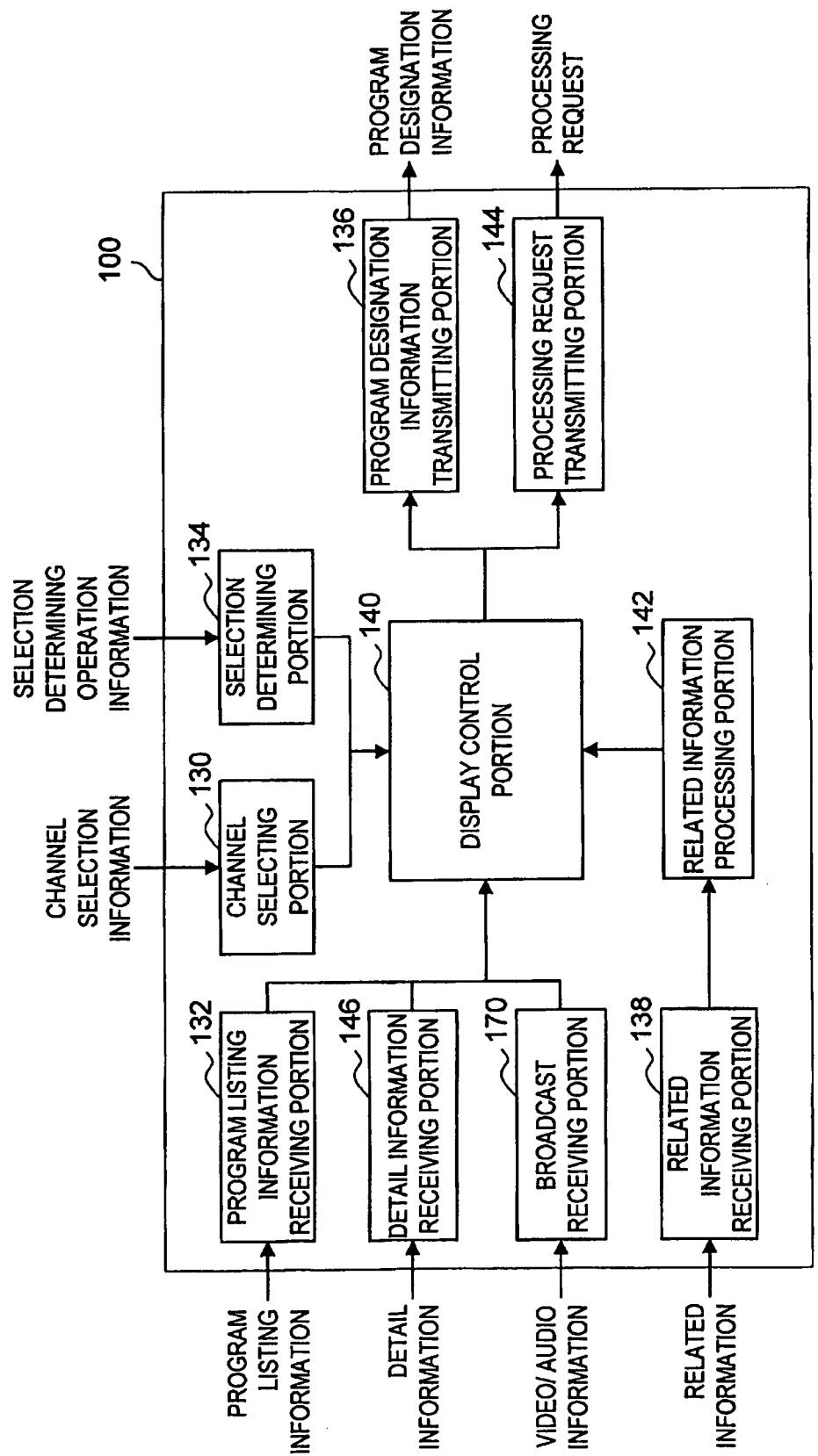
FIG. 5 is a block diagram showing main elements of a receiving terminal according to a first embodiment of the present invention.
Figure 6:
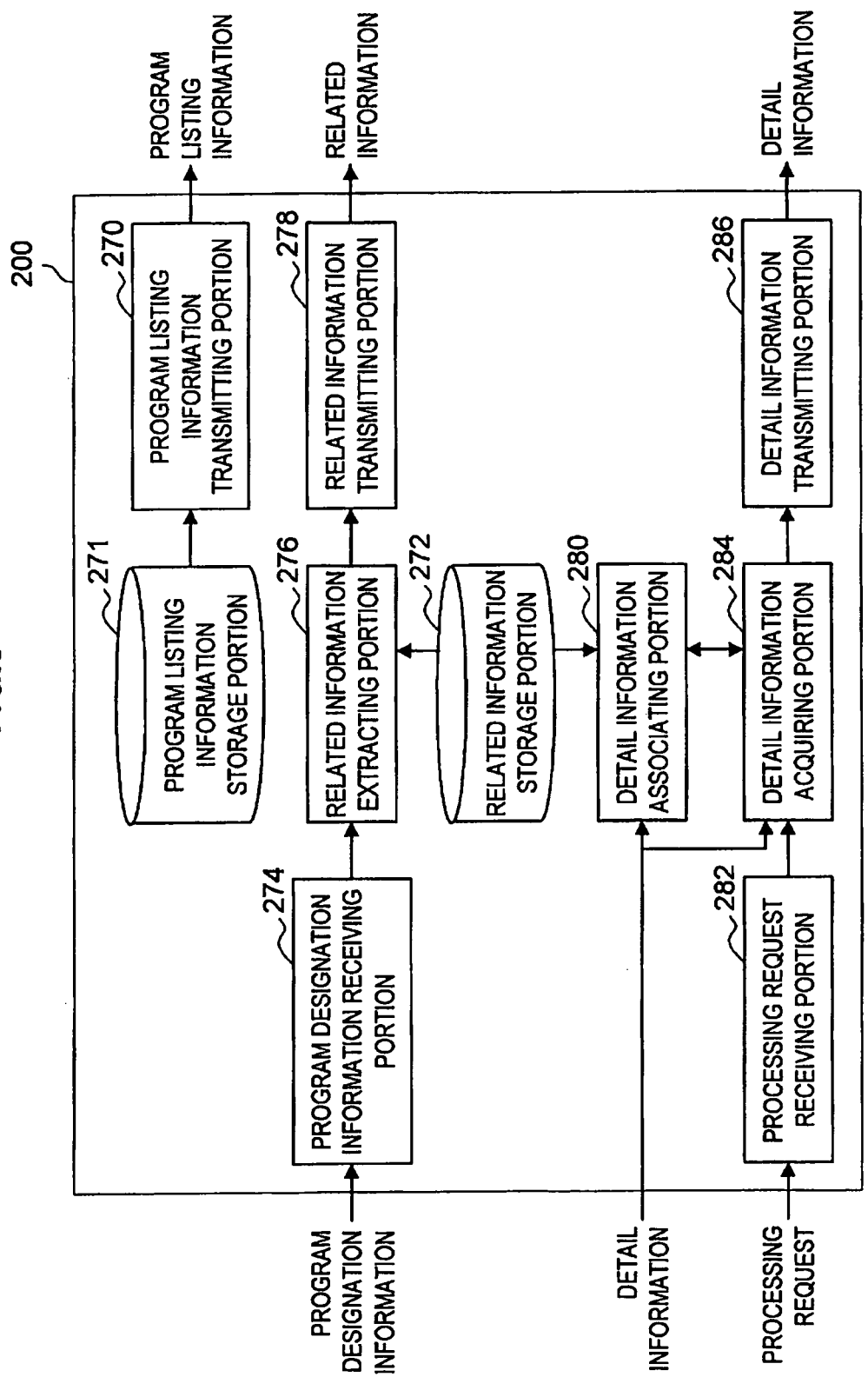
FIG. 6 is a block diagram showing main elements of an ECG server according to the first embodiment of the present invention.

FIGS. 5 and 6 are block diagrams showing the main elements of the information providing system according to the first embodiment of the present invention.

Referring to FIG. 5, the receiving terminal 100 includes a channel selecting portion 130, a program listing information receiving portion 132, a selection determining portion 134, a program designation information transmitting portion 136, a related information receiving portion 138, a display control portion 140, a related information processing portion 142, a processing request transmitting portion 144, and a detail information receiving portion 146.

The channel selecting portion 130 is used for a user to select a channel of a program to be received. The program listing information receiving portion 132 receives program listing information which indicates a plurality of currently viewable programs from the ECG server 200. The selection determining portion 134 is used for a user to select a program based on the program listing information and determines the selection of the program. The program designation information transmitting portion 136 transmits program designation information which designates a selected channel or a program that is selected or determined based on the program listing information to the ECG server 200. The related information receiving portion 138 receives the related information which is composed of a plurality of pieces of information related to a program that are edited and associated with the program and which corresponds to a program that is designated by the program designation information from the ECG server 200. The display control portion 140 controls the display of a video of a selected channel or a determined program and program listing information and sequentially displays a plurality of pieces of information which are contained in the received related information.

The related information processing portion 142 processes the related information which is received from the ECG server 200. The processing request transmitting portion 144 transmits a processing request which requests the provision of detail information to the ECG server 200 according to the information that is selected or determined by a user. The detail information receiving portion 146 receives the detail information corresponding to the processing request from the ECG server 200.

Referring to FIG. 6, the ECG server 200 includes a program listing information transmitting portion 270, a related information storage portion 272, a program designation information receiving portion 274, a related information extracting portion 276, a related information transmitting portion 278, a detail information associating portion 280, a processing request receiving portion 282, a detail information acquiring portion 284, and a detail information transmitting portion 286.

The program listing information transmitting portion 270 transmits program listing information indicating a plurality of currently viewable programs which is prestored in a program listing information storage portion 271 or the like to the receiving terminal 100. The related information storage portion 272 stores related information which is composed of a plurality of pieces of information related to a program that are edited so as to be sequentially displayed in association with the program. The program designation information receiving portion 274 receives program designation information which designates a selected channel or a program that is selected or determined based on program listing information from the receiving terminal 100. The related information extracting portion 276 extracts the related information which corresponds to the program that is designated by the program designation information. The related information transmitting portion 278 transmits the extracted related information to the receiving terminal 100.

The detail information associating portion 280 associates detail information concerning program information and service provision information with the program information and the service provision information, respectively. The processing request receiving portion 282 receives a processing request which requests the provision of detail information concerning program information or detail information concerning service provision information from the receiving terminal 100. The detail information acquiring portion 284 acquires the detail information which corresponds to the received processing request. The detail information transmitting portion 286 transmits the detail information which is acquired based on the processing request to the receiving terminal 100.

Structure of ECG Scenario

Figure 7:
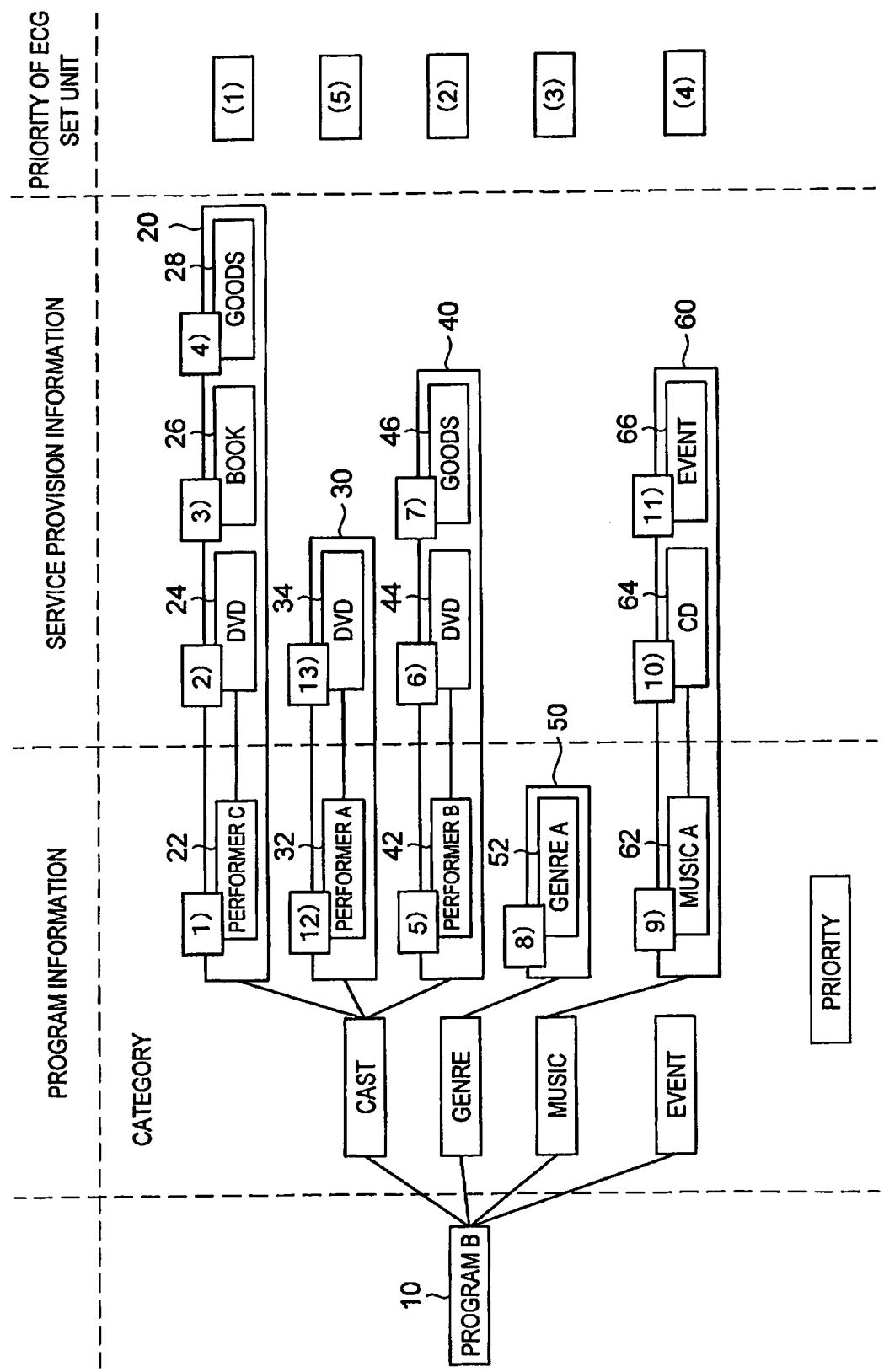
FIG. 7 is an explanatory view showing an example of the structure of ECG data which is contained in an ECG scenario.

FIG. 7 is an explanatory view showing an exemplary structure of ECG data which is contained in an ECG scenario. Referring to FIG. 7, an ECG scenario contains program information related to a program, service provision information related to program information, and association information which establishes association among a program, program information and service provision information. An ECG scenario is a collection of ECG sets, each set being a combination of each program information and service provision information which is associated with each program information. The ECG set may be composed of program information only, without including service provision information. Further, priorities are set to the ECG sets which form an ECG scenario and to the service provision information which form each ECG set.

In the structure of the ECG scenario which is illustrated in FIG. 7, the program information which is associated with the program B10, i.e. "performer C" 22, "performer A" 32, "performer B" 42, "genre A" 52 and "music A" 62, are classified into categories of cast, genre and music as appropriate. Further, the service provision information is associated with each program information. For example, the service provision information "DVD" 24, "book" 26 and "goods" 28 are associated with the program information "performer C" 22. Thus, one ECG set 20 which includes the "performer C" 22, the service provision information "DVD" 24, "book" 26 and "goods" 28 is formed, and further an ECG scenario which is a collection of the ECG sets 20, 30, 40, 50 and 60 that respectively correspond to the program information is formed.

Priorities "(1)", "(5)", "(2)", "(3)" and "(4)" are respectively set to the ECG sets 20, 30, 40, 50 and 60 which respectively correspond to the program information "performer C" 22, "performer A" 32, "performer B" 42, "genre A" 52 and "music A" 62. Further, priorities are also set to the service provision information according to the priorities of the ECG sets. For example, priorities "1)", "2)", "3)" and "4)" are respectively set to the program information "performer C" 22 and the service provision information "DVD" 24, "book" 26 and "goods" 28 which are associated with the program information "performer C" 22. Accordingly, in the execution of the ECG scenario, after the program information "performer C" 22 is displayed, the service provision information "DVD" 24, "book" 26 and "goods" 28 which are associated with the program information "performer C" 22 are sequentially displayed, and then the program information "performer B" 42 is displayed after that.

FIG. 8 is an explanatory view showing an example of a peripheral configuration of an ECG scenario. Referring to FIG. 8, the ECG scenario contains program information and service provision information, which are associated with detail information concerning the program information and detail information concerning the service provision information. The detail information concerning program information includes detail information about a program cast, detail information about music and event related to a program and so on, for example. The detail information concerning service provision information includes detail information or information about questionnaire regarding advertising information, information about product purchase regarding sales information, information about recording reservation and viewing reservation regarding program information and so on, for example.

The detail information concerning program information is provided from the ECG server 200 to the receiving terminal 100 in response to a request of a user which is made while the corresponding program information is displayed. The detail information concerning service provision information is provided from the sponsor 400 to the receiving terminal 100 through the ECG server 200 in response to a request of a user which is made while the corresponding service provision information is displayed. The detail information concerning service provision information may include information about processing such as questionnaire, product purchase, program recording reservation and viewing reservation, for example, and prescribed processing is performed between a user of the receiving terminal 100 and the sponsor 400 based on the information.

Metadata of ECG Scenario

FIGS. 9 to 12 are explanatory views showing an example of ECG data in meta format which is contained in an ECG scenario. FIGS. 9 to 12 illustrate metadata of program information, service provision information, association information for establishing association among a program, program information and service provision information, an ECG set and an ECG scenario, respectively.

The metadata of program information shown in FIG. 9 contains descriptions of information such as program genre, keyword, cast and so on.

In the metadata shown in FIG. 9, "P00001" is described as an program ID, "professional style" is described as a program name, "documentary" is described as a genre, and "AAAAAA BBB BBB know-how impression" is described as a keyword. Further, "2007/1/1", "13:00:00" and "2007/1/1" "15:00:00" are described as the program start date and time and the program end date and time, respectively. Furthermore, three casts who appear on the program are described, and it is described for the cast with the person ID "1_1" that a name is "AAAAAA" and a birthplace is "Japan". For the casts with the person ID "1_2" and "1_3" also, a name and a birthplace are described in the same manner. In addition, "AA1" is described as an association ID (relation ID) for the metadata, and "L00001" is described as a reference ID list for association information of the program.

The metadata of service provision information shown in FIG. 10 contains descriptions of information such as a service provision information genre, a keyword, a maker, a price, a place to obtain detail information and so on.

In the metadata shown in FIG. 10, "C00001" is described as a service provision information ID (content ID), "product 1" is described as a service provision information name, "publication" is described as a genre, "XXX YYY ZZZ" is described as a keyword, "zony" is described as a maker, "100 yen" is described as a price, and "www.zony.co.jp" is described as a place to obtain detail information.

The metadata of association information for establishing association among a program, program information and service provision information shown in FIG. 11 contains descriptions of information such as genres of program information and service provision information to be associated with a program and so on.

In the metadata shown in FIG. 11, "L00001" is described as a program association ID (program_relation id), "HHH" is described as a program association name, "2007/1/1", "13:00:00" and "2007/1/1", "15:00:00" are described the start date and time and the end date and time. Further, "1" is described as a program ID to be associated (link_program id), "P00001" is described as a program ID (program_id), and "shopping" is described as a genre. Furthermore, three pieces of service provision information to be associated are described, and it is described for the service provision information with the service provision information ID to be associated (link content ID) "1" that a service provision information ID (content_id) is "C00001" and a genre is "sport". For the service provision information with the service provision information ID to be associated "2" and "3" also, a service provision information ID and a genre are described in the same manner.

The metadata of an ECG set shown in FIG. 12 contains descriptions of information such as program information and service provision information which form an ECG set.

In the metadata of an ECG set shown in FIG. 12 (upper part), "es00001" is described as an ECG set ID, "GGG" is described as an ECG set name, "2007/1/1", "13:00:00" and "2007/1/1" "15:00:00" are described as the start date and time and the end date and time of the ECG set, respectively. Further, five items which constitute the ECG set are described. It is described for the item with the item ID (content id) "1" that a type is "program" and a program ID (program_id) is "P00001". It is also described for the items with the item ID "2" to "5" that a type is "service provision information" (content) and a service provision information ID (content_id) is "C00001" to "C00004", respectively.

The metadata of an ECG scenario shown in FIG. 12 (lower part) contains descriptions of information of ECG sets which form the ECG scenario.

In the metadata of an ECG scenario shown in FIG. 12, "sc00011" is described as an ECG scenario ID, "GGG" is described as an ECG scenario name, "2007/1/1", "13:00:00" and "2007/1/1" and "15:00:00" are described as the start date and time and the end date and time of the ECG scenario, respectively. Further, four ECG sets which form the ECG scenario are described. It is described for the items with the item ID (content_id) "1" to "4" that the ECG set ID is "es00001" to "es00004", respectively.

Process Flow of ECG Scenario

Figure 13:
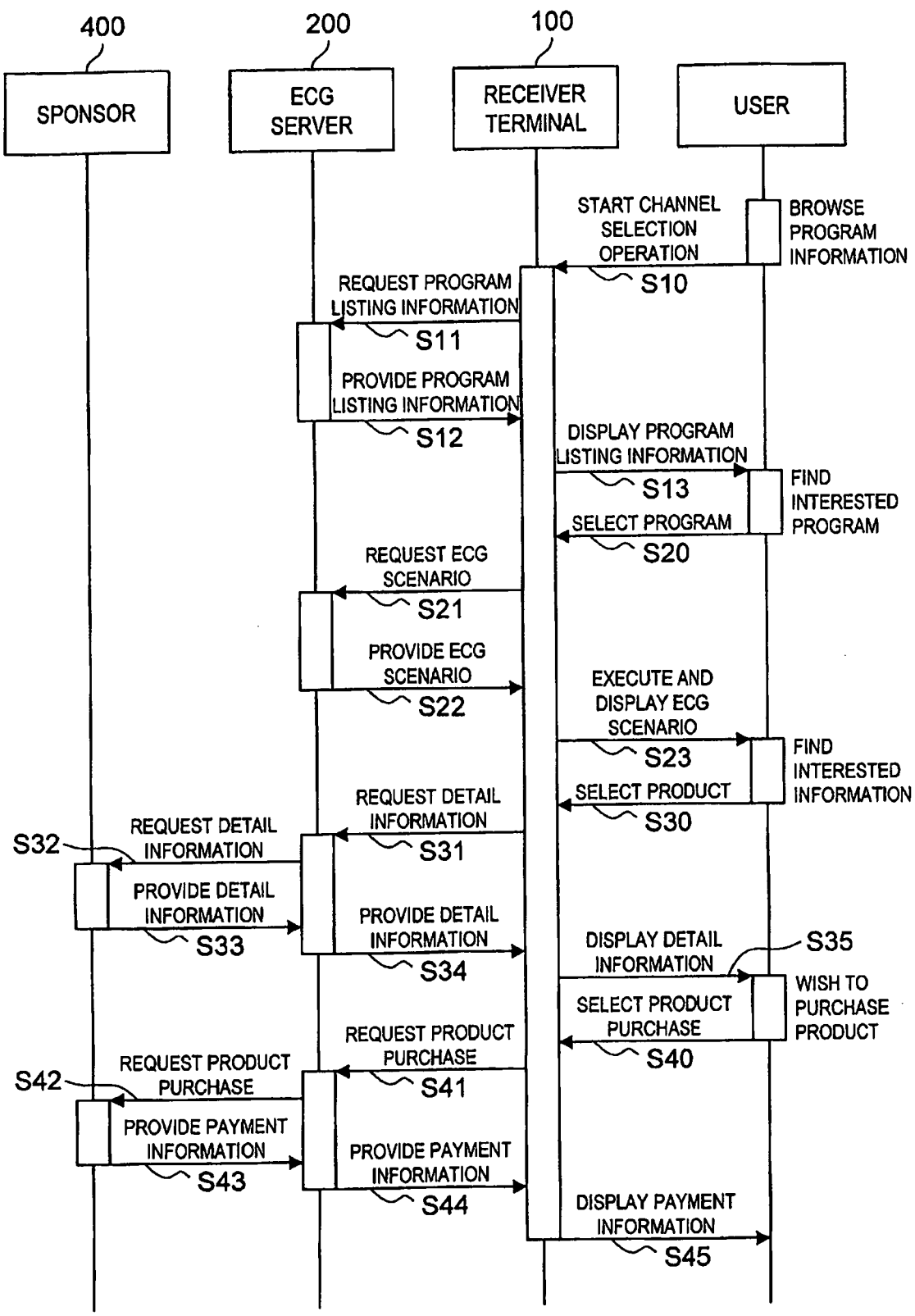
FIG. 13 is a sequence chart showing an example of a process flow of an ECG scenario in an information providing system as a whole.

FIG. 13 is a sequence chart showing an example of a process flow of an ECG scenario in the entire information providing system according to this embodiment. The process flow of an ECG scenario in the entire information providing system is described hereinafter with reference to FIG. 13.

When switching the program being viewed, a user of the receiving terminal 100 starts channel selection operation using the remote control 190 by operating the ECG service button or the like in order to browse the program listing information which shows the currently viewable programs (S10). When the channel selection operation is started, the receiving terminal 100 requests the provision of program listing information showing the currently viewable programs to the ECG server 200 (S11). In response to the request for the program listing information, the ECG server 200 provides the program listing information which is produced based on the program information that is acquired from the content provider 300 to the receiving terminal 100 (S12). The receiving terminal 100 displays the provided program listing information (S13), thereby providing the program listing information to the user.

When the program listing information is provided, the user selects (determines) a program based on the program listing information by remote control operation (S20). When the program is selected (determined), the receiving terminal 100 transmits information which designates the selected program and requests the provision of an ECG scenario which is associated with the selected (determined) program by remote control operation to the ECG server 200 (S21). Although the case of selecting (determining) a program based on the program listing information is described in this example, the process is the same for the case of directly selecting a channel by the channel selection button of the remote control 190 or the like. In response to the request for the ECG scenario, the ECG server 200 extracts the ECG scenario of the designated program based on the program designation information and provides the extracted ECG scenario to the receiving terminal 100 (S22). The receiving terminal 100 executes the provided ECG scenario and sequentially displays the information (S23), thereby providing the program information and the service provision information to the user.

If the user finds interested information in the program information and the service provision information which are sequentially displayed based on the ECG scenario, the user selects the service provision information which introduces a product that is soled by the sponsor 400, for example, by remote control operation (S30). When the service provision information is selected, the receiving terminal 100 requests the provision of detail information concerning the product (service provision information) which is selected by the remote control operation to the ECG server 200 (S31). In response to the request for the detail information, the ECG server 200 requests the provision of the relevant detail information to the relevant sponsor 400 (S32), acquires the detail information from the sponsor 400 (S33) and provides the acquired detail information to the receiving terminal 100 (S34). The receiving terminal 100 displays the provided detail information (S35), thereby providing the detail information concerning the product to the user.

If the user wishes to purchase the product, the user selects the product purchase by the remote control operation (S40). When the product purchase is selected, the receiving terminal 100 requests the processing of the product purchase (service provision information) to the ECG server 200 (S41). In response to the request for the product purchase processing, the ECG server 200 requests the provision of payment information concerning the product purchase to the sponsor 400 serving as a payment agency (S42), acquires the payment information from the sponsor 400 (S43) and provides the acquired payment information to the receiving terminal 100 (S44). The receiving terminal 100 transmits and receives the payment information concerning the product purchase and the information concerning a response of the user to the payment information to and from the sponsor 400 (S41 to S44). The product purchase processing is thereby performed between the user of the receiving terminal 100 and the sponsor 400 through the ECG server 200 (S41, S45).

Activation of ECG Scenario

Figure 14:
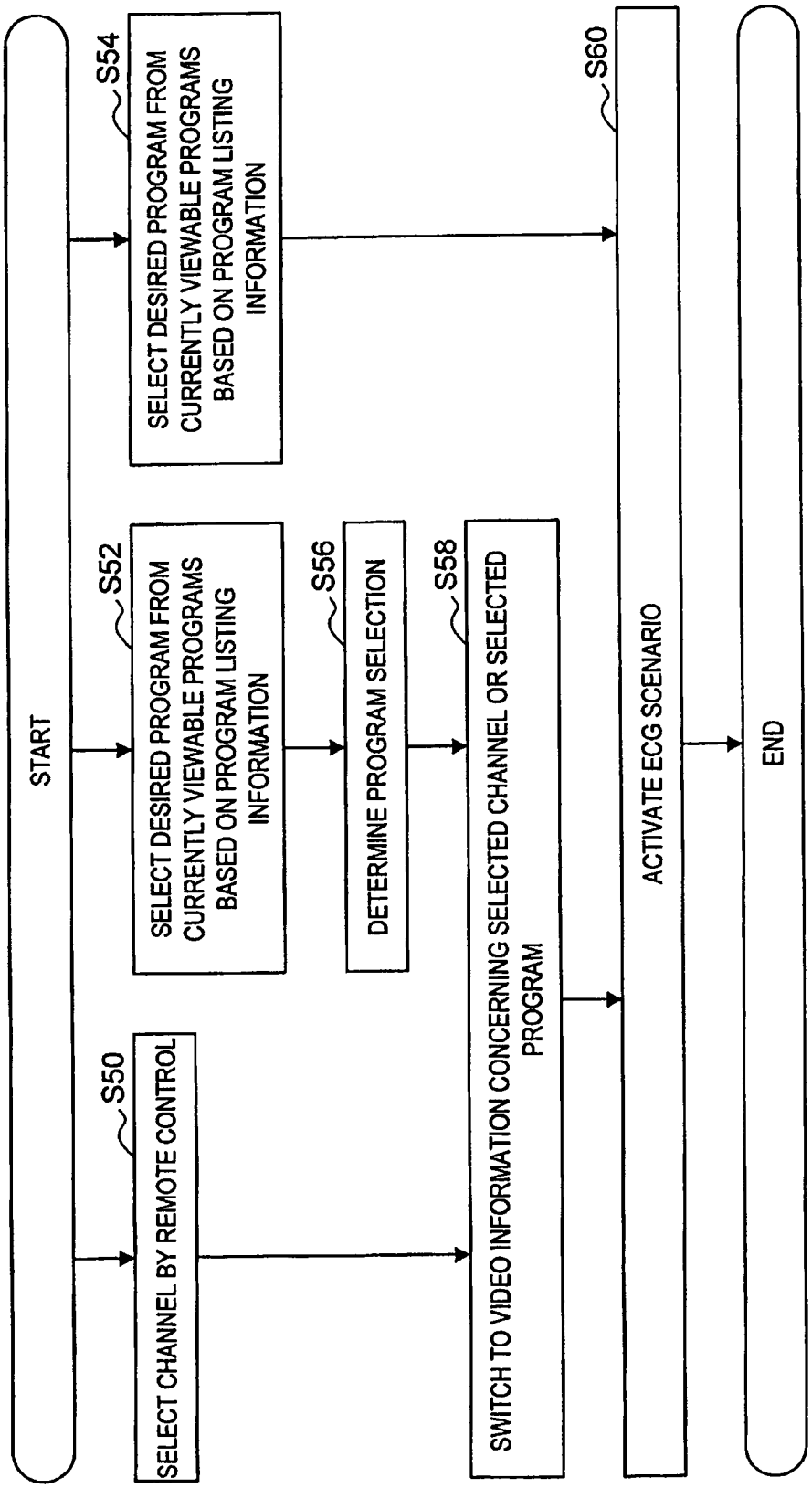
FIG. 14 is a flowchart showing a process flow of activation of an ECG scenario.

FIG. 14 is a flowchart showing a process flow of activation of an ECG scenario according to this embodiment. The process flow of activation of an ECG scenario is described hereinafter with reference to FIG. 14. An ECG scenario is activated when the following remote control operation is performed by a user of the receiving terminal 100, for example.

As a first activation pattern, in the case where a channel is selected by remote control operation when the provision of an ECG service is active (S50), the video information which is displayed on the display screen of the receiving terminal 100 is switched so as to correspond to the program that is currently broadcasted in the selected channel (S58). Then, the ECG scenario which is associated with the program that is currently broadcasted in the selected channel is acquired from the ECG server 200, and the acquired ECG scenario is activated (S60).

As a second activation pattern, in the case where any one of the currently viewable programs is selected by remote control operation based on the program listing information which is acquired from the ECG server 200 (S52) and the selection is determined (S56), the display of video information is switched (S58), and the ECG scenario which is associated with the program that is currently broadcasted in the selected channel is activated (S60).

As a third activation pattern, in the case where any one of the currently viewable programs is selected by remote control operation based on the program listing information which is acquired from the ECG server 200 (S54), the ECG scenario which is associated with the program that is currently broadcasted in the selected channel is activated without the switching of the display of video information (S60).

In the first and second activation patterns, when the video information related to the program being viewed is displayed, the ECG scenario which is associated with the same program is activated. In the third activation pattern, on the other hand, the ECG scenario which is associated with a program that is different from the program being viewed is activated.

Execution of ECG Scenario

FIGS. 15 and 16 are explanatory views showing display patterns of a display screen in the execution of an ECG scenario according to this embodiment. In FIGS. 15 and 16, the display patterns in the cases of: (1) executing an ECG scenario which is associated with a program being viewed, (2) executing an ECG scenario which is associated with a program after a channel change, (3) executing an ECG scenario which is associated with a program that is different from a (recorded and played back) program being viewed, are illustrated. Further, the display patterns in the cases of: (4) switching channels based on program listing information, (5) manually switching the execution of an ECG scenario based on program listing information and (6) automatically switching the execution of an ECG scenario based on program listing information, are illustrated.

In the display patterns shown in FIGS. 15 and 16 or the display patterns shown in other drawings described later, display areas of video information and an ECG scenario are disposed on the left side and the right side of a display screen. The program listing information and the ECG scenario are thereby displayed without overlapping the video information related to the program, so that a user can browse the information related to the currently viewable programs with high visibility while viewing the video information related to the program. The placement of displays areas shown in those drawings is illustrated by an example only, and it is not limited thereto.

In the display pattern (1), an ECG scenario A1 which is associated with a program A is executed while video information related to the program A being viewed is displayed. In the display pattern (2), an ECG scenario C1 which is associated with a program C is executed while video information related to the program C after a channel is changed is displayed.

In the display pattern (3), an ECG menu A is displayed while video information related to a (recorded and played back) program being viewed is displayed. The ECG menu is menu information which appears in response to remote control operation by a user, and it may contain program listing information indicating the currently viewable programs and operation information of an ECG scenario so as to prompt a user to select provided information. If a user selects the program A from the ECG menu A, the ECG scenario A1 which is associated with the program A is executed.

In the display pattern (4), the ECG scenario A1 which is associated with the program A is executed while the video information related to the program A being viewed is displayed. The ECG menu A is also displayed, and if a user selects a program B from the ECG menu A, an ECG scenario B1 which is associated with the program B is executed, and the ECG menu A is switched to an ECG menu B. Then, if a user selects a program C from the ECG menu B, an ECG scenario C1 which is associated with the program C is executed, and the ECG menu B is switched to an ECG menu C. Further, if a user determines the selection of the program C, the display of the video information related to the program A being viewed is switched to the display of video information related to the program C.

In the display pattern (5), when the provision of an ECG service is active, the video information related to the program A being viewed is displayed, and programs 1 to 5 are displayed as a list as program listing information. If a user selects the program 2 from the program listing information, the display of the video information related to the program A is switched to the display of video information related to the program 2, and an ECG scenario which is associated with the program 2 is executed and the display of the program listing information is switched to the display of the ECG scenario.

In the display pattern (6), when the provision of an ECG service is active, the video information related to the program A being viewed is displayed, and programs 1 to 5 are displayed as a list as program listing information. If remote control operation is not performed for a predetermined length of time in this state, ECG scenarios which are associated with the programs 1 to 5 are sequentially executed in place of the program listing information while the video information related to the program A being viewed is displayed. A user can switch the display of the program listing information and the display of the ECG scenario by operating the left and right buttons of the remote control 190, for example.

Figure 17:
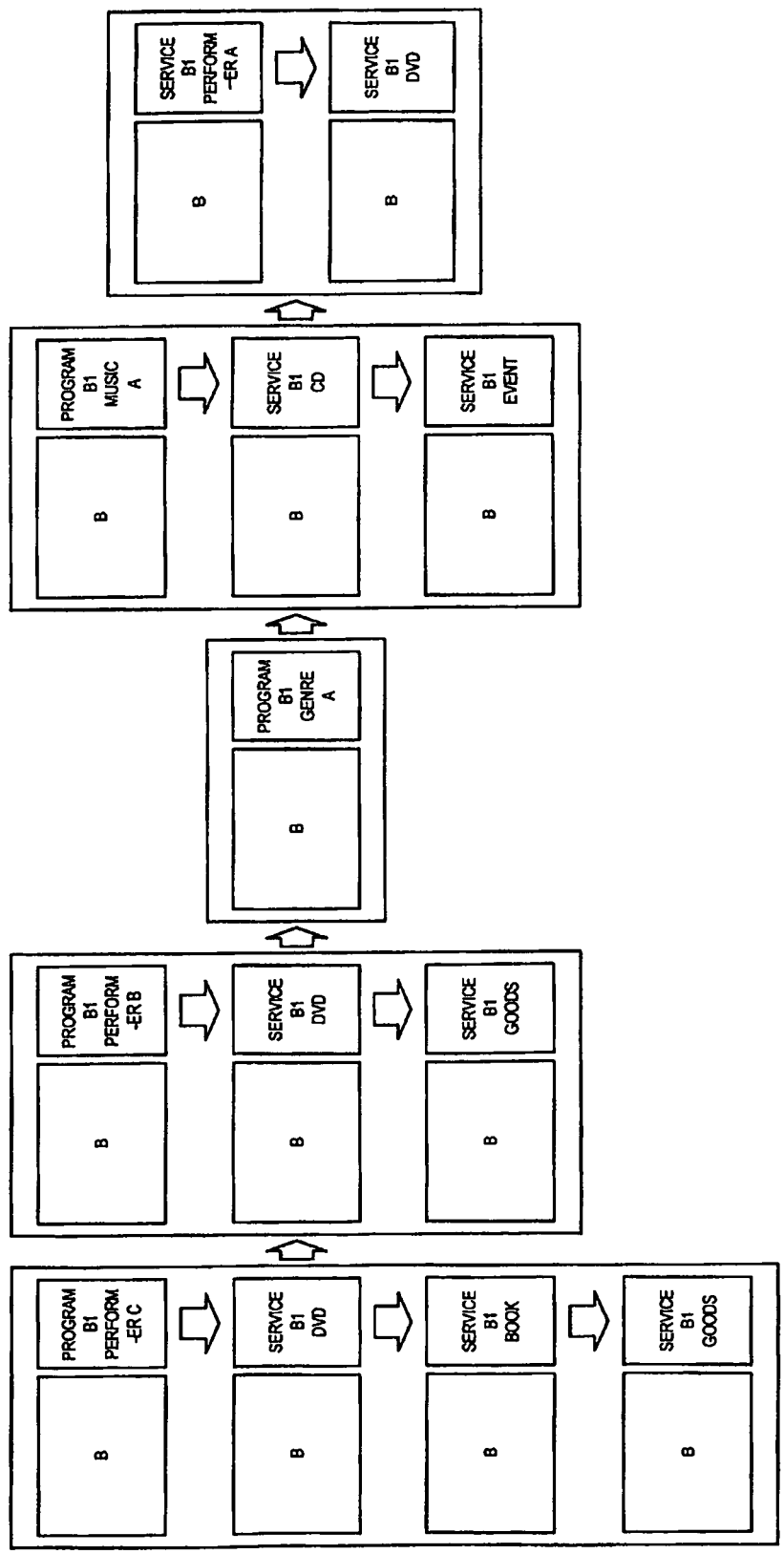
FIG. 17 is an explanatory view showing display patterns of a display screen in execution of the ECG scenario shown in FIG. 7.

FIG. 17 is an explanatory view showing display patterns of a display screen in execution of the ECG scenario shown in FIG. 7. As shown in FIG. 17, when the ECG scenario is executed, the program information and the service provision information which form the ECG scenario are sequentially displayed in units of ECG sets according to the priorities that are set thereto.

In the display patterns shown in FIG. 17, an ECG scenario which is associated with a program B10 is executed while video information related to the program B10 being viewed is displayed. In the execution of the ECG scenario, the ECG sets 20, 40, 50, 30 and 60 which correspond to the program information "performer C" 22, "performer B" 42, "genre A" 52, "performer A" 32 and "music A" 62, respectively, are displayed according to the priorities that are set to the ECG sets. In the display of the ECG sets, after the program information is displayed, the service provision information which are associated with the program information "performer C" 22, i.e. "DVD" 24, "book" 26 and "goods" 28, are sequentially displayed, for example. In the ECG scenario which is associated with the program B10, when the display of the ECG set 20 (which corresponds to the program information "performer C" 22) with the priority "(1)" is finished, the display of the ECG set 40 (which corresponds to the program information "performer B" 42) with the priority "(2)" is started.

In the display of the program information and the service provision information, display processing such as coloring of the display area of ECG scenarios differently according to the categories of program information and/or the categories of service provision information may be performed. A user of the receiving terminal 100 can thereby efficiently browse the information related to a program. Further, the content provider 300 and the sponsor 400 can thereby effectively provide the information related to a program to a user.

Figure 18:
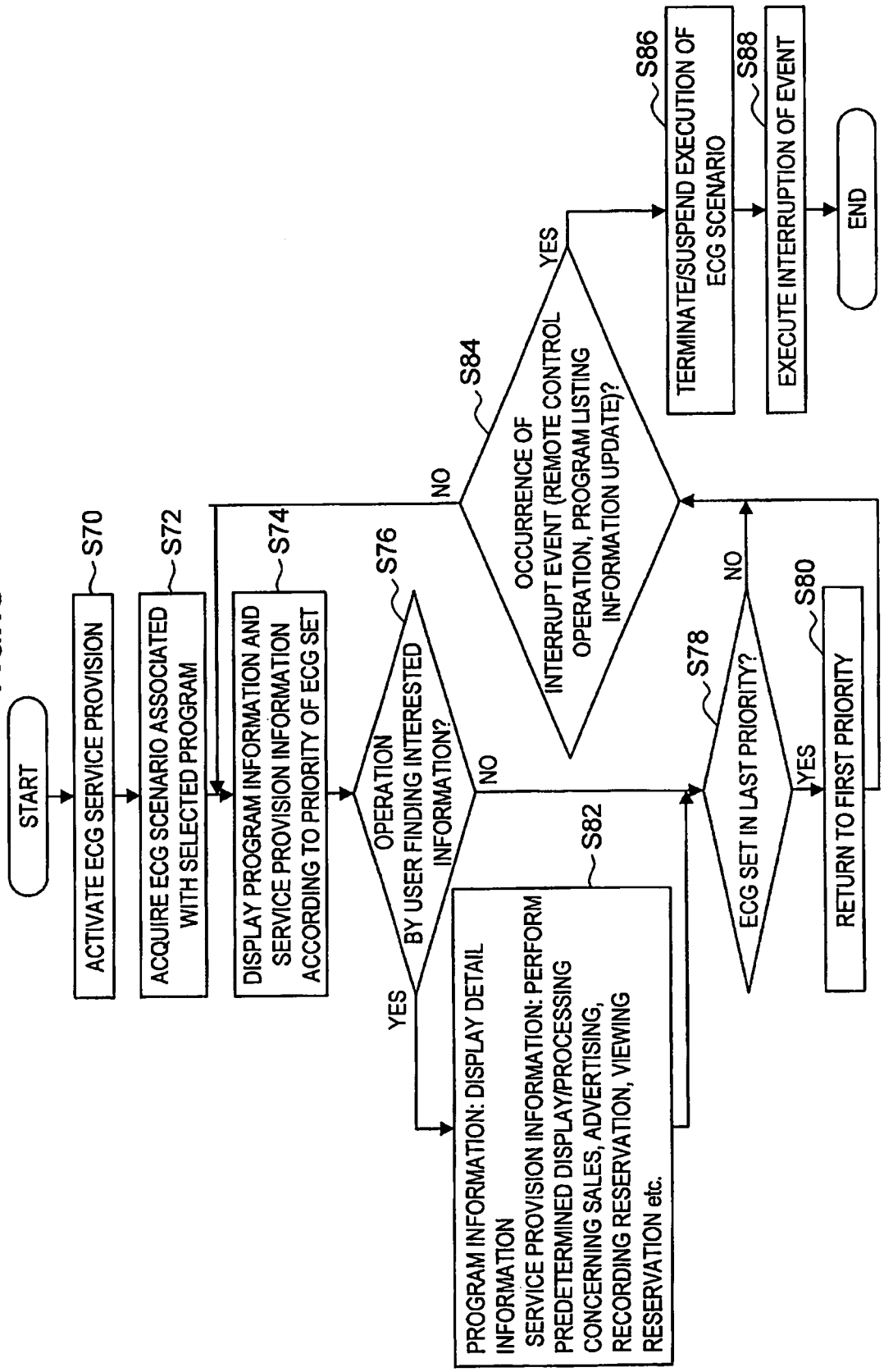
FIG. 18 is a flowchart showing a process flow in execution of an ECG scenario.

FIG. 18 is a flowchart showing a process flow in the execution of an ECG scenario according to this embodiment. The process flow in the execution of an ECG scenario is described hereinafter with reference to FIG. 18.

Prior to the execution of an ECG scenario, the provision of an ECG service is activated through the operation of the receiving terminal 100 by a user (S70). After the provision of an ECG service is activated, the ECG scenario which is associated with a selected channel or a selected program by remote control operation is acquired from the ECG server 200 (S72). After the ECG scenario is acquired, the program information and the service provision information which form the ECG scenario are sequentially displayed in units of ECG sets according to the priorities that are set thereto (S74). After the display of all the program information and the service provision information which form the ECG scenario is completed (S78), the display of the ECG scenario is repeated according to the priorities (S80).

If a user finds interested information in the displayed program information and service provision information, the user performs determination operation using the remote control 190 (S76). When the determination operation is performed, the display of the detail information concerning the program information and the service provision information or the processing for providing services concerning the service provision information are performed according to the program information and the service provision information which are displayed when the determination operation is performed (S82).

Because the program information and the service provision information which form the ECG scenario are sequentially displayed, a user can easily browse the information related to the currently viewable programs. On the other hand, the content provider 300 and the sponsor 400 can effectively provide the information for prompting the program channel selection or the use of services to a user through the ECG server 200.

Further, because the program information and the service provision information which are contained in the ECG scenario are sequentially displayed in units of ECG sets according to the priorities, a user can efficiently browse the information related to the currently viewable programs. On the other hand, the content provider 300 and the sponsor 400 can effectively provide the information for prompting the program channel selection or the use of services to a user through the ECG server 200 according the priorities in consideration of the advertising characteristics of information or the advertising effect to be obtained by display sequences, for example.

Furthermore, because the information which is contained in the ECG scenarios related to a plurality of programs that are contained in the program listing information are sequentially displayed without performing channel selection operation or selection determination operation by the remote control 190, a user can easily browse the information related to the currently viewable programs.

Further, because the information for executing the processing necessary for service provision is associated with the service provision information, the sponsor 400 can effectively prompt a user to use services based on the service provision information.

During the execution of an ECG scenario, if an interrupt event such as remote control operation not related to the execution of the ECG scenario or update/change of program listing information occurs (S84), the execution of the ECG scenario is terminated or suspended (S86), and the interrupt event is executed (S88).

Because the detail information concerning the program information and the service provision information is thereby displayed, a user can easily browse the detail information concerning the currently viewable programs. On the other hand, the content provider 300 and the sponsor 400 can effectively provide the detail information for prompting the program channel selection or the use of services to a user through the ECG server 200.

Figure 19:
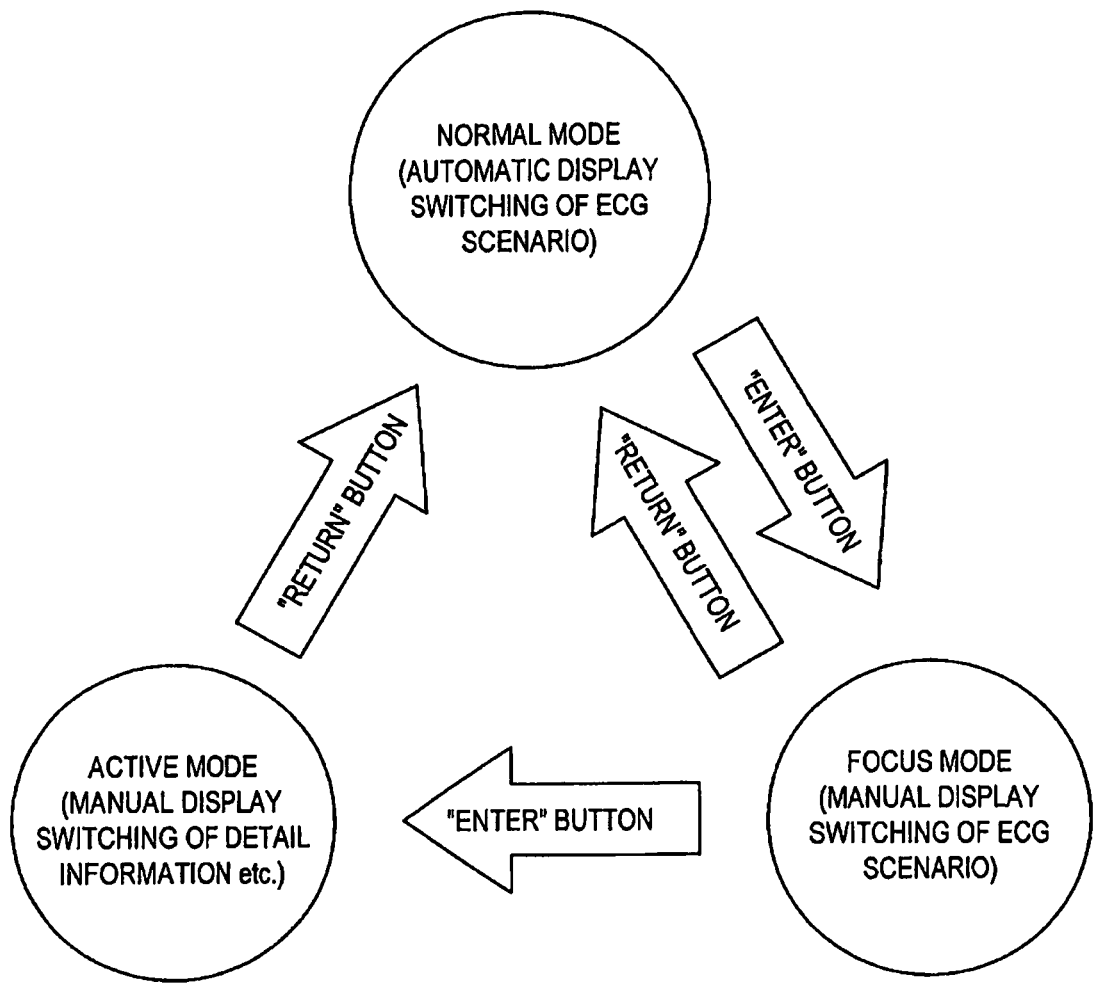
FIG. 19 is an explanatory view showing ECG service provision modes.

FIG. 19 is an explanatory view showing ECG service provision modes. As shown in FIG. 19, the provision modes of an ECG service include normal, focus and active modes.

In the normal mode, a plurality of pieces of information such as program information and service provision information which are contained in an ECG scenario are automatically switched and displayed. Thus, a user can browse the information related to a program in a passive attitude without performing any operation. If a user finds interested information and operates "Enter" button of the remote control 190, for example, the mode changes from the normal mode to the focus mode.

In the focus mode, a plurality of pieces of information such as program information and service provision information which are contained in an ECG scenario are manually switched by a user and displayed. Thus, a user can browse the information related to a program in an active attitude by operating the left and right buttons, for example, and selecting desired information. If a user finds interested information and operates "Enter" button, for example, the mode changes from the focus mode to the active mode. If a user operates "Return" button, the mode changes from the focus mode to the normal mode.

In the active mode, the detail information concerning the program information and the service provision information which is selected in the focus mode is manually switched by a user and displayed. The detail information concerning the service provision information contains information about processing such as product purchase, recording reservation and viewing reservation. Thus, a user can browse and use the information related to the program in an active attitude by operating the up and down buttons, for example, and scrolling the display of the detail information. Then, if a user operates "Return" button, for example, the mode changes from the active mode to the normal mode.

As described above, because an ECG scenario (related information) is provided through the operation of selecting a channel or selecting or determining a program in this embodiment, a user can browse the information related to the currently viewable programs for sure with a simple operation. Further, because a plurality of pieces of information such as program information and service provision information which are contained in an ECG scenario are sequentially displayed, a user can effectively browse the information related to the program with high visibility. On the other hand, because an ECG scenario is edited so as to sequentially display a plurality of pieces of information related to a program, the content provider 300 and the sponsor 400 can effectively provide the information related to the currently viewable programs with high visibility to a user through the ECG server 200 (information providing apparatus).

Execution Example of ECG Scenario

Specific execution examples 1 to 3 of an ECG scenario are described hereinafter.

Execution Example 1

Figure 20:
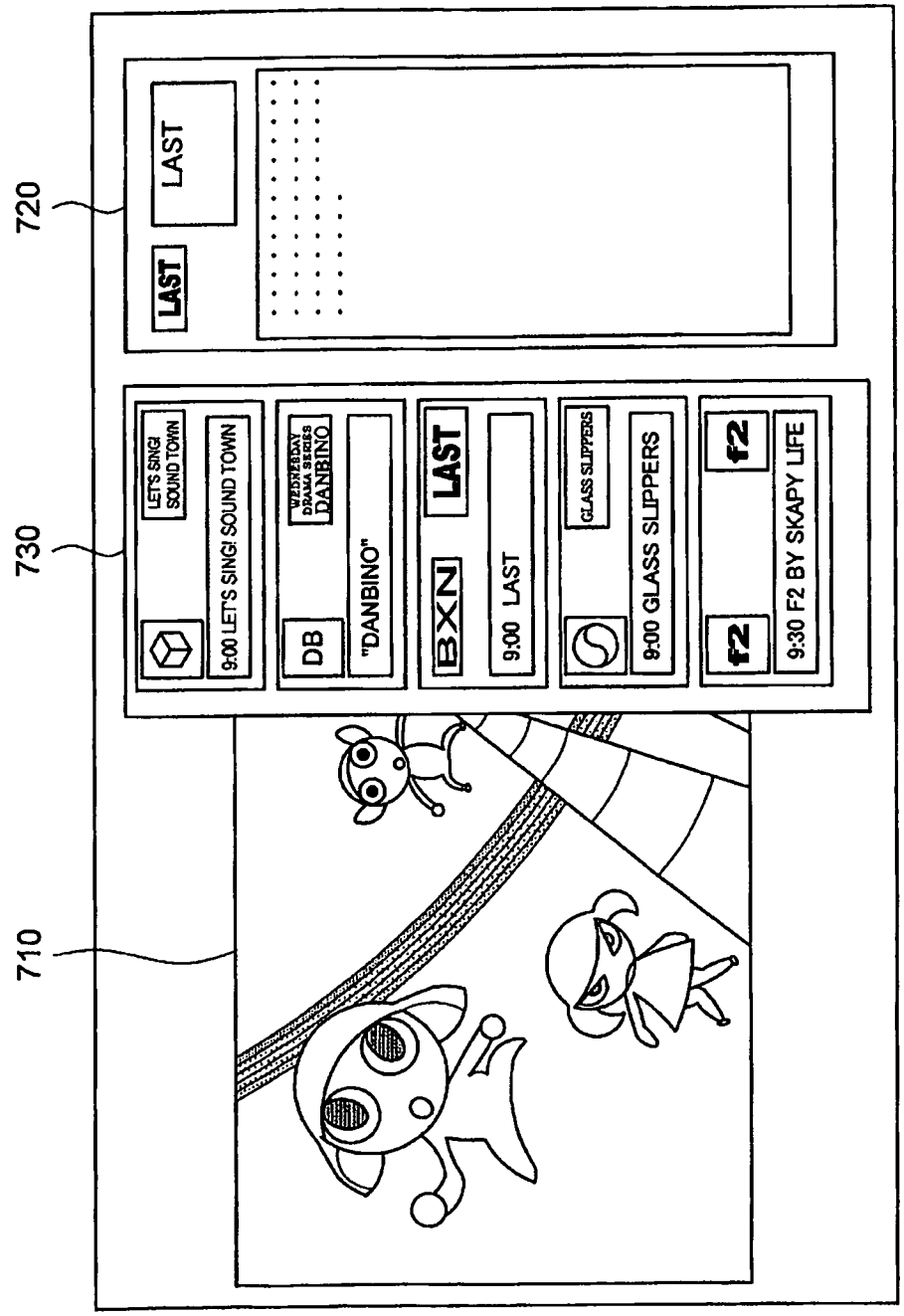
FIG. 20 is an explanatory view showing a display screen in an execution example 1 of an ECG scenario.
Figure 21:
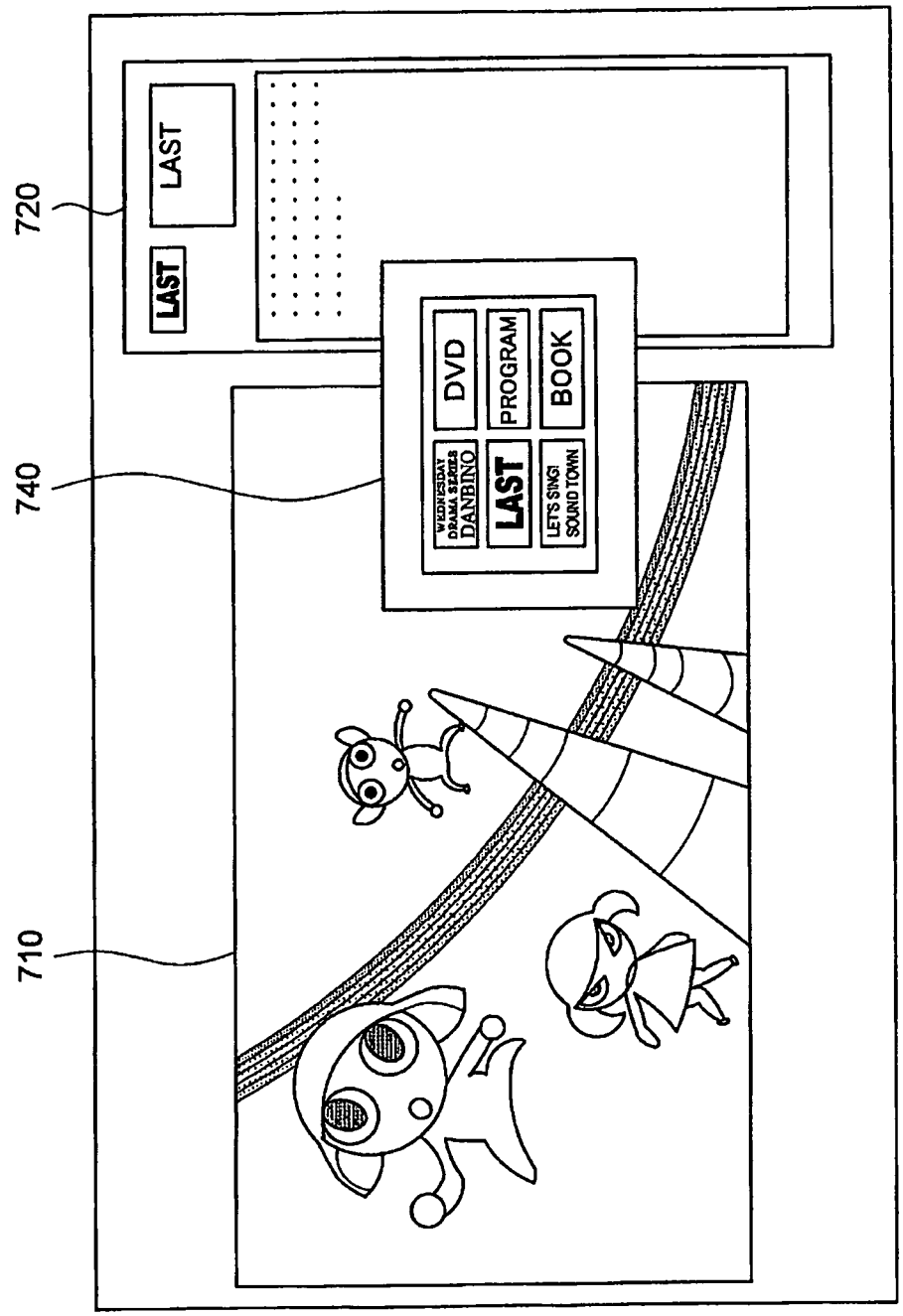
FIG. 21 is an explanatory view showing a display screen in the execution example 1 of an ECG scenario.

FIGS. 20 and 21 are explanatory views showing display screens in the execution example 1 of an ECG scenario. As shown in FIGS. 20 and 21, in the execution example 1, video information 710 related to the program being viewed is displayed on the left side of the display screen, and program information 720 which is contained in an ECG scenario is displayed on the right side of the display screen. The program information 720 includes the title "LAST", the logotype, the overview or the like of a program which is currently viewable and different from the program being viewed.

On the display screen shown in FIG. 20, program listing information 730 is displayed on the middle right side of the display screen, and the program information related to five programs which are currently viewable is displayed. The program listing information 730 includes logotypes of content providers, logotypes of programs, titles of programs and scheduled broadcast start time as program information.

On the display screen shown in FIG. 20, a user of the receiving terminal 100 can select a desired program based on the program listing information 730 by remote control operation. If any program is selected based on the program listing information 730, the display on the display screen of the ECG scenario is switched to the display of the program information related to the selected program. Further, if any program is selected and the selection is determined, the display on the display screen of the video information 710 related to the program is switched to the display of video information related to the selected program. On the other hand, if remote control operation is not performed for a predetermined length of time, the ECG scenarios related to the programs which are included in the program listing information 730 are sequentially executed, so that the program information and the service provision information which are contained in each ECG scenario are sequentially displayed.

On the other hand, on the display screen shown in FIG. 21, an ECG menu 740 is displayed on the middle right side of the display screen, and the program information related to three programs which are currently viewable and the operation information of ECG scenarios are displayed. The ECG menu 740 includes logotypes of programs as program information and categories (DVD, program and book) of service provision information as service provision information.

On the display screen shown in FIG. 21, a user of the receiving terminal 100 can select a desired program or category based on the ECG menu 740 by remote control operation. If any program is selected and determined based on the ECG menu 740, the display on the display screen of the ECG scenario 720 and the display on the display screen of the video information 710 related to the program are switched just like the display screen shown in FIG. 20. If any category is selected, the display on the display screen of the ECG scenario 720 is switched to the display of the service provision information regarding the selected category.

Execution Example 2

Figure 22:
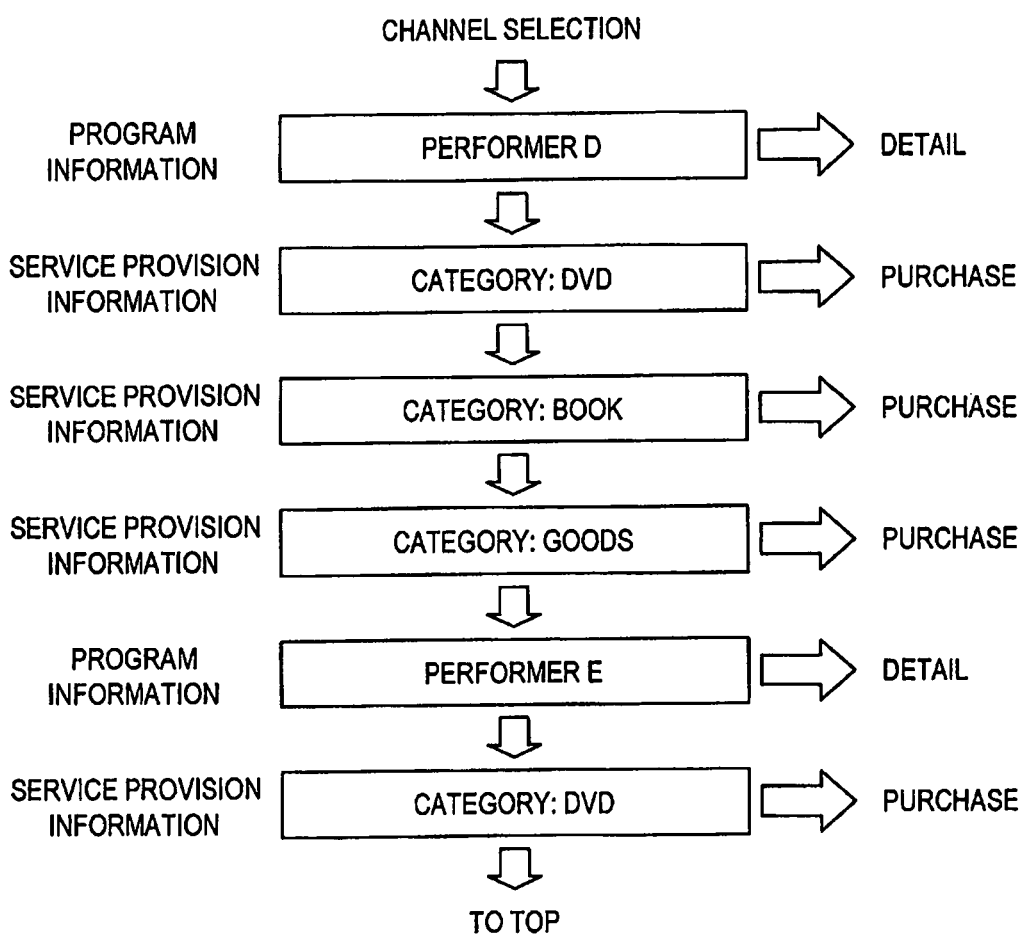
FIG. 22 is a flowchart showing a process flow in execution of an execution example 2 of an ECG scenario.

FIG. 22 is a flowchart showing a process flow in the execution of an execution example 2 of an ECG scenario. FIGS. 23 to 28 are explanatory views showing display screens in the execution example 2 of an ECG scenario. The display screens in the execution example 2 are described hereinafter with reference to the process flow shown in FIG. 22.

Referring to FIG. 22, in the execution example 2, after an ECG scenario is activated by program channel selection, the following information (1) to (6) related to the program are sequentially displayed, and then the display of an ECG scenario is repeated. The information related to the program includes (1) first program information, (2) first service provision information (sales information) related to the first program information, (3) second service provision information related to the first program information, (4) third service provision information related to the first program information, (5) second program information, and (6) first service provision information related to the second program information.

As shown in FIGS. 23 to 28, in the execution example 2, video information 810 related to the program being viewed is displayed on the left side of the display screen, and information related to the program which is contained in an ECG scenario is displayed on the right side of the display screen. As the ECG scenario, information related to the same program as the program being viewed is displayed.

Figure 23:
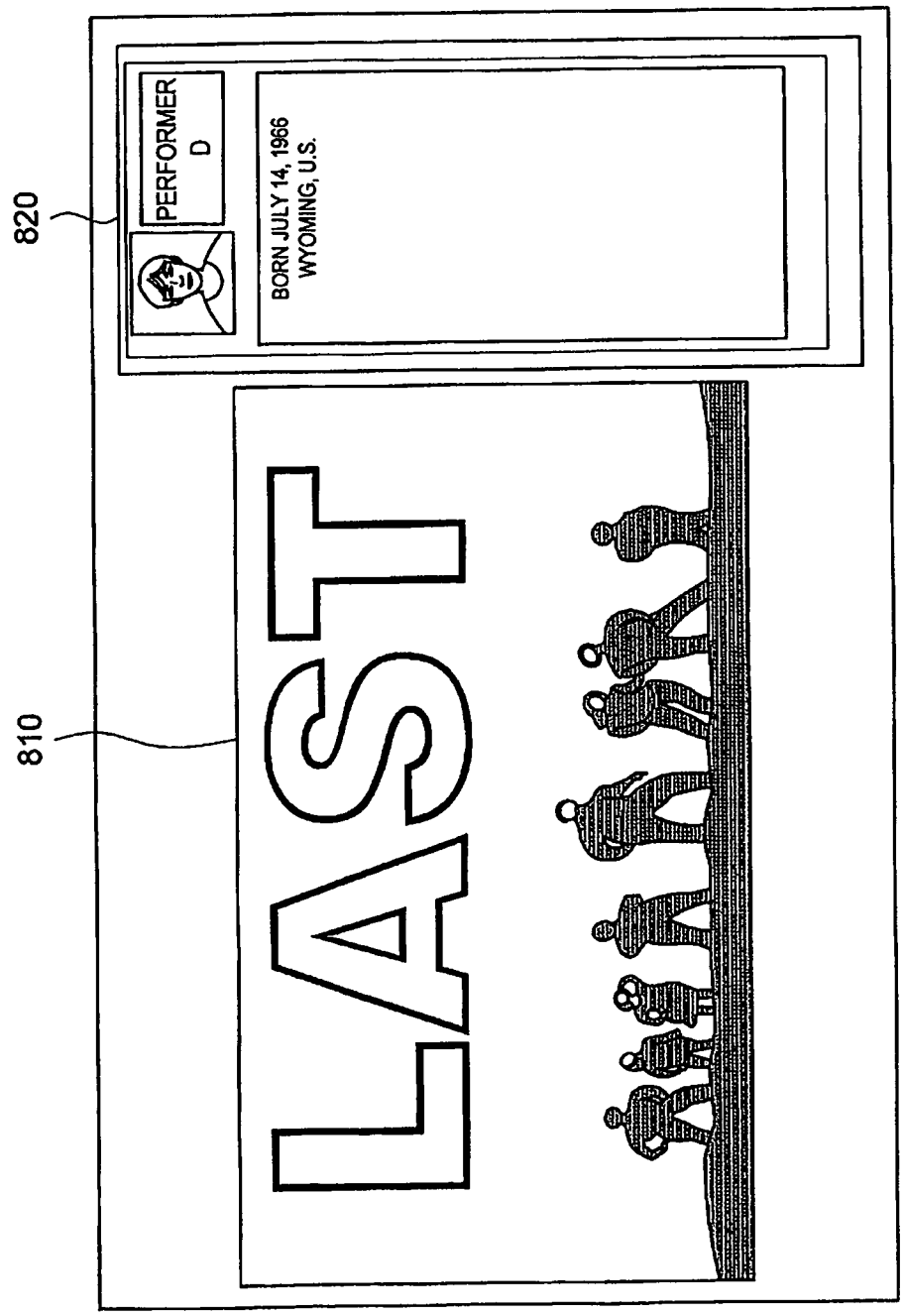
FIG. 23 is an explanatory view showing a display screen in the execution example 2 of an ECG scenario.

On the display screen shown in FIG. 23, the name "performer D", the profile and the biography of a "performer D" are displayed as first program information 820 which is contained in the ECG scenario. If determination operation by remote control is performed in this state, the detail information of the "performer D" is provided from the ECG server 200 and displayed.

Figure 24:
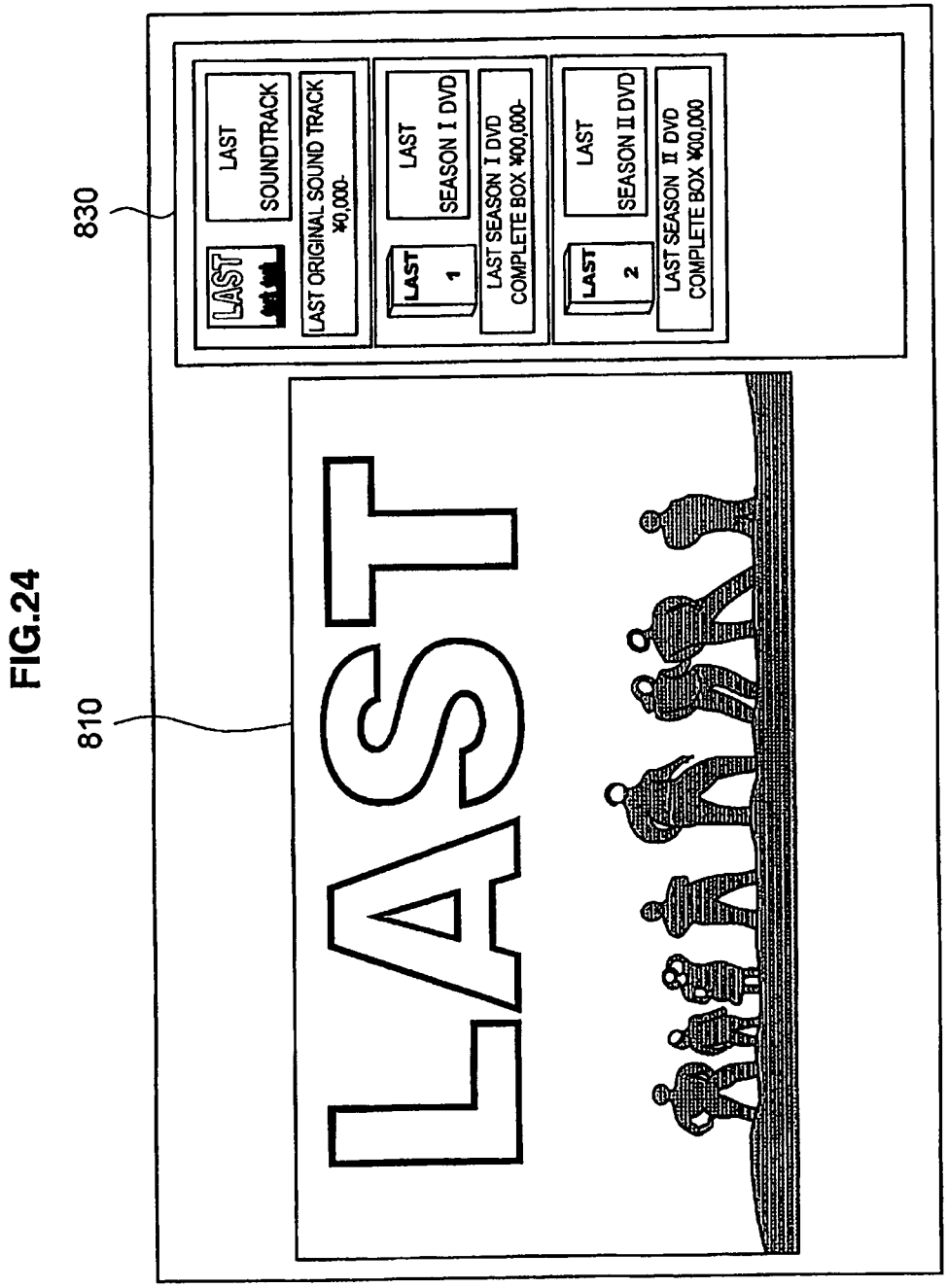
FIG. 24 is an explanatory view showing a display screen in the execution example 2 of an ECG scenario.

On the display screen shown in FIG. 24, sales information of three DVD are displayed as first service provision information 830 concerning the first program information ("performer D") which is contained in the ECG scenario. The service provision information 830 includes product name, image, detail and price. If any product is selected and determined by remote control operation in this state, the detail information concerning the service provision information of the selected product is provided from the sponsor 400 through the ECG server 200 and displayed. After the detail information is displayed, prescribed product purchase processing is performed between a user of the receiving terminal 100 and the sponsor 400.

Figure 25:
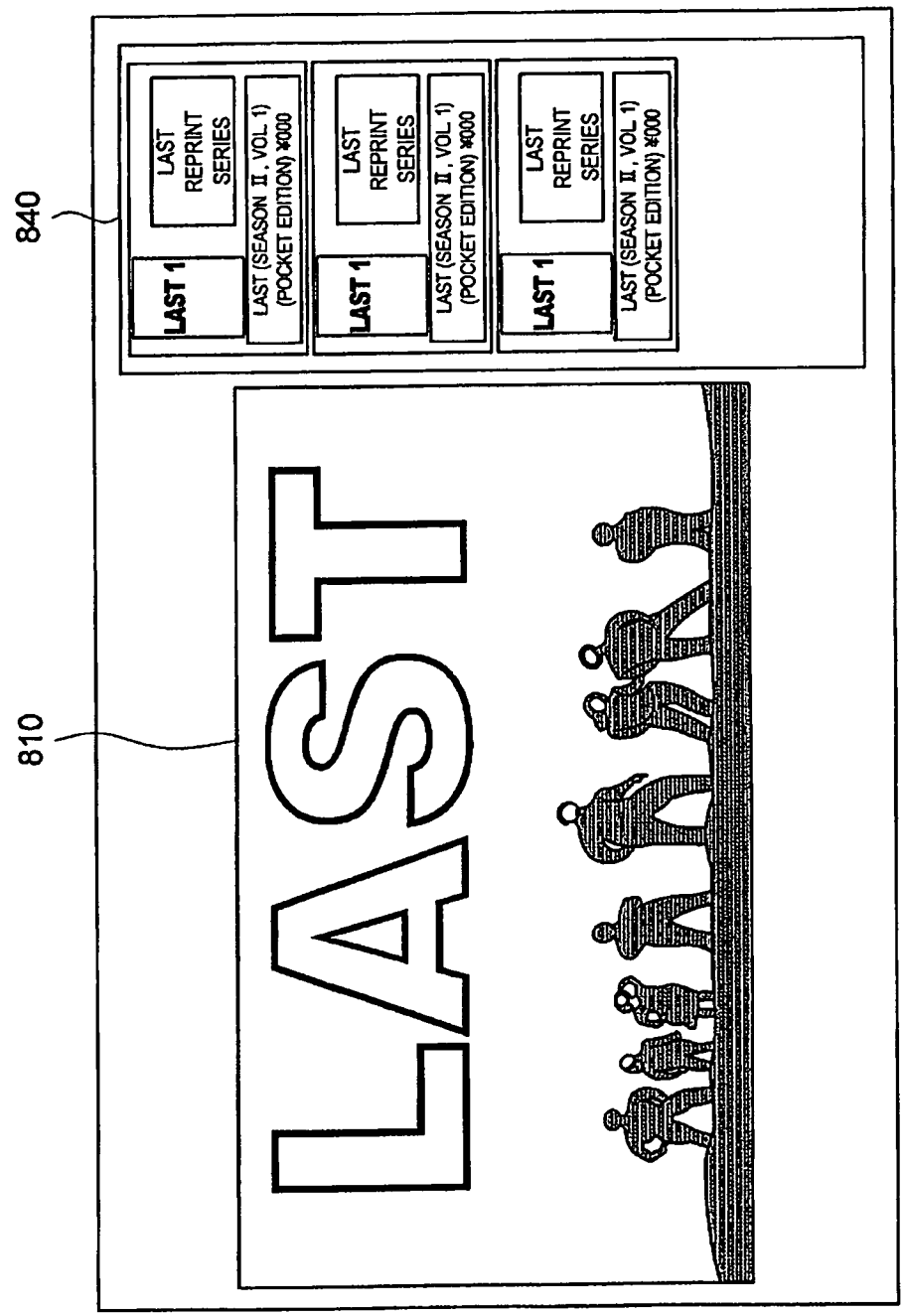
FIG. 25 is an explanatory view showing a display screen in the execution example 2 of an ECG scenario.

On the display screen shown in FIG. 25, sales information of three books are displayed as second service provision information 840 concerning the first program information ("performer D") which is contained in the ECG scenario. The service provision information 840 includes product name, image, detail and price. The display of the detail information and the product purchase processing are the same as in the display screen shown in FIG. 24 and not repeatedly described.

Figure 26:
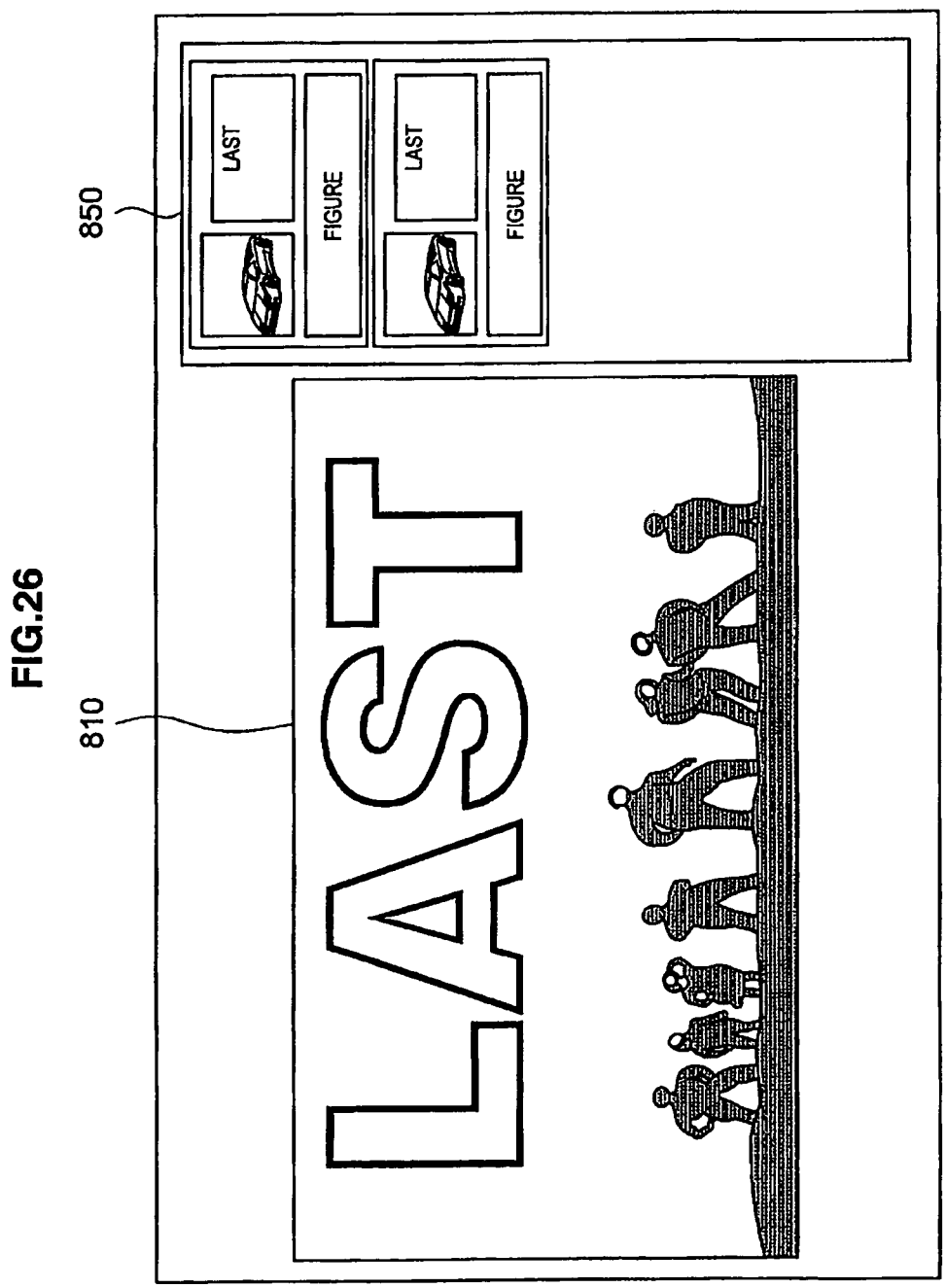
FIG. 26 is an explanatory view showing a display screen in the execution example 2 of an ECG scenario.

On the display screen shown in FIG. 26, sales information of two goods (figures) are displayed as third service provision information 850 concerning the first program information ("performer D") which is contained in the ECG scenario. The service provision information 850 includes product name, image, detail and price. The display of the detail information and the product purchase processing are the same as in the display screen shown in FIG. 24 and not repeatedly described.

Figure 27:
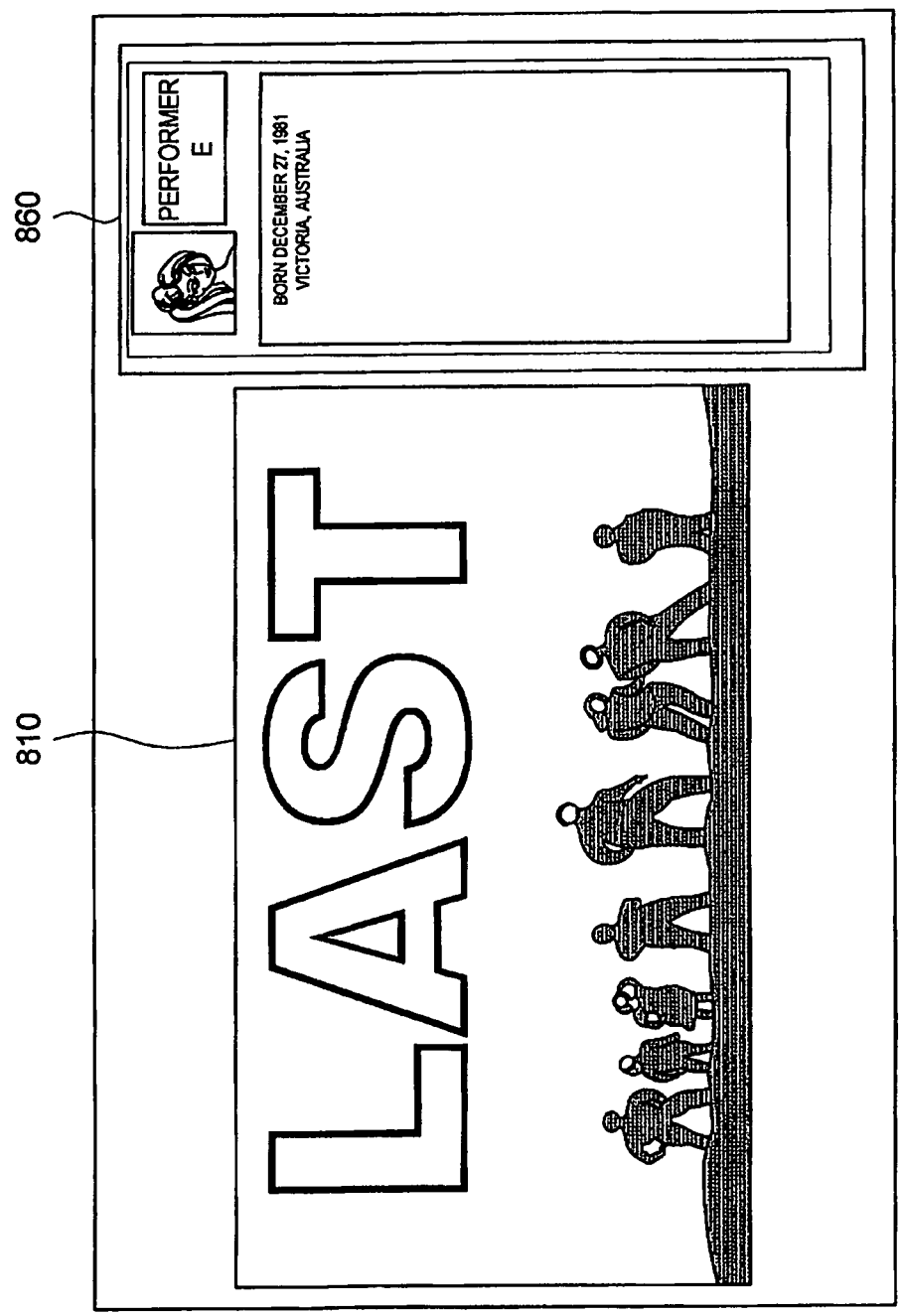
FIG. 27 is an explanatory view showing a display screen in the execution example 2 of an ECG scenario.

On the display screen shown in FIG. 27, the name "performer E", the profile and the biography of a "performer E" are displayed as second program information 860 which is contained in the ECG scenario. If determination operation by remote control is performed in this state, the detail information of the "performer E" is provided from the ECG server 200 and displayed.

Figure 28:
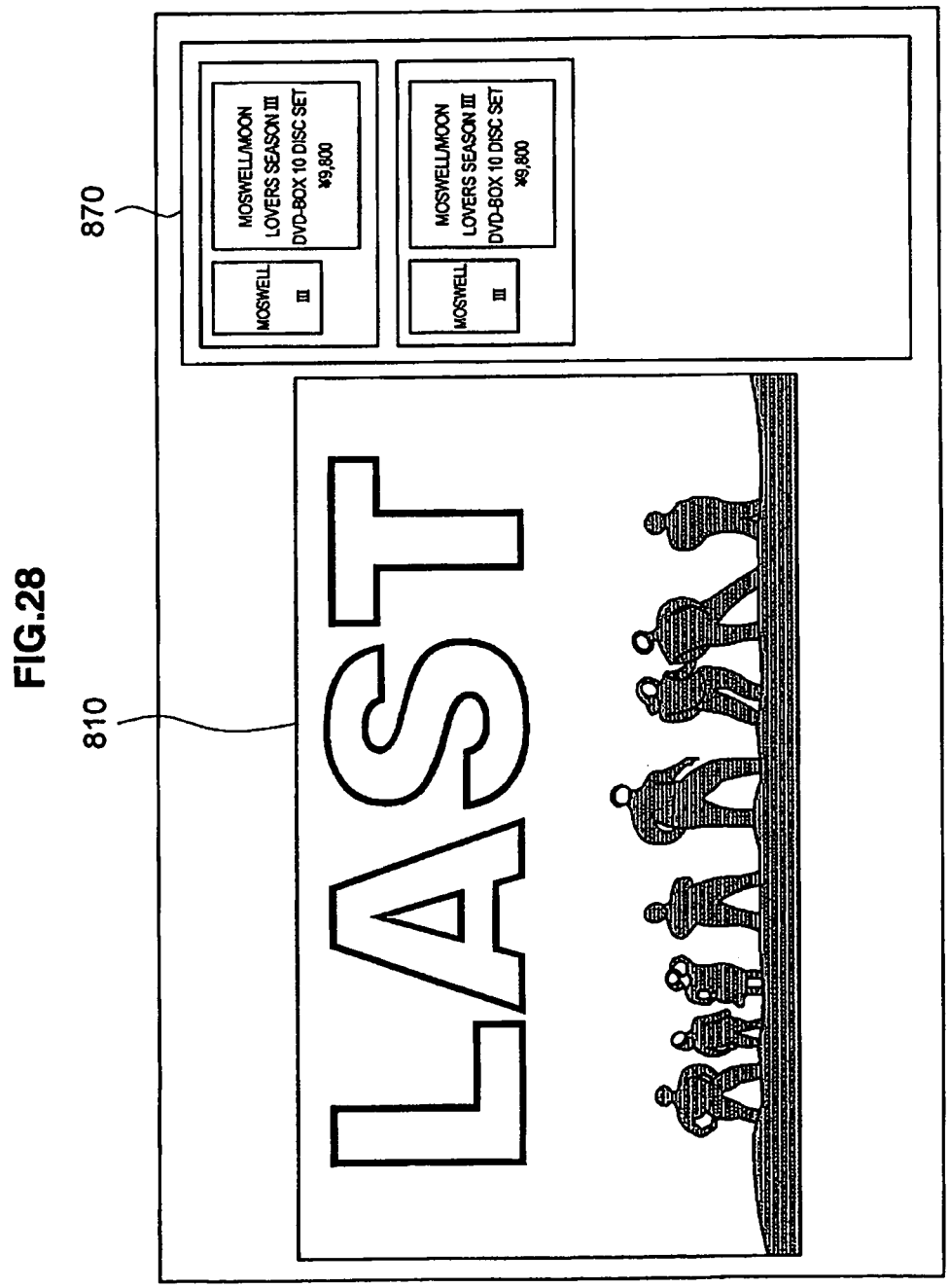
FIG. 28 is an explanatory view showing a display screen in the execution example 2 of an ECG scenario.

On the display screen shown in FIG. 28, sales information of two DVDs are displayed as first service provision information 870 concerning the second program information ("performer E") which is contained in the ECG scenario. The service provision information 870 includes product name, image, detail and price. The display of the detail information and the product purchase processing are the same as in the display screen shown in FIG. 24 and not repeatedly described.

Execution Example 3

FIGS. 29 to 34 are explanatory views showing display screens in the execution example 3 of an ECG scenario. The display screens in the execution example 3 are described hereinafter with reference to FIGS. 29 to 34.

As shown in FIGS. 29 to 34, in the execution example 3, video information 910 related to the program being viewed is displayed on the left side of the display screen, and information related to the program which is contained in an ECG menu or an ECG scenario is displayed on the right side of the display screen. As the ECG scenario, information related to the same program as or a different program from the program being viewed is displayed.

Figure 29:
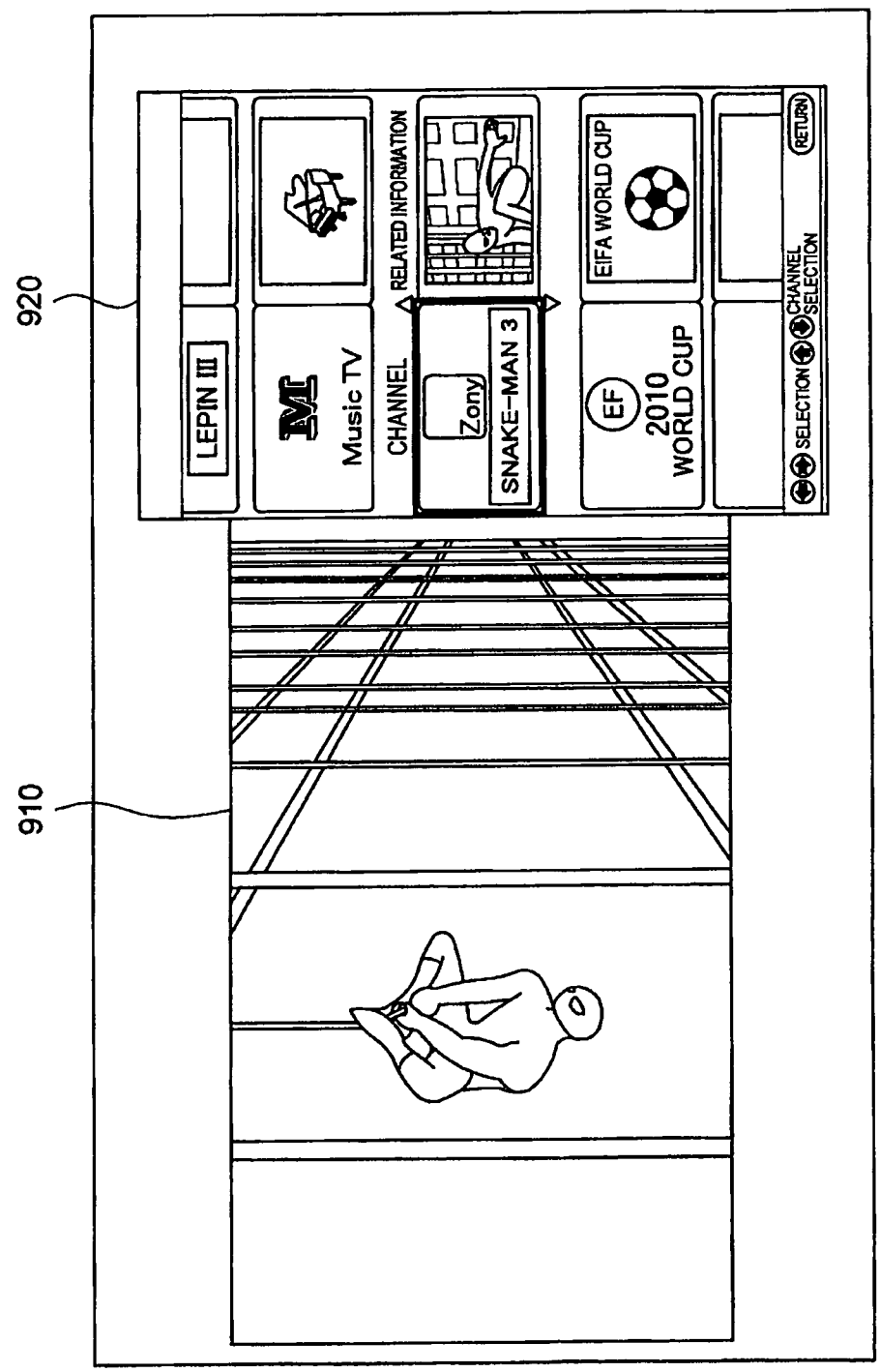
FIG. 29 is an explanatory view showing a display screen in a execution example 3 of an ECG scenario.

On the display screen shown in FIG. 29, program information (channel and related information) related to a plurality of currently viewable programs is displayed in an ECG menu

920. The ECG menu 920 includes a logotype of the content provider 300, a program name and a still image as program information.

In this state, a user can select a desired channel by remote control and select desired related information based on the ECG menu 920. If all of the program information related to the currently viewable programs do not fall within the display frame of ECG menu 920, the display of the ECG menu 920 may be scrolled by remote control operation. On the display screen shown in FIG. 29, the program "Snake-man 3" which is provided from the content provider "Zony" is selected from the ECG menu 920.

Figure 30:
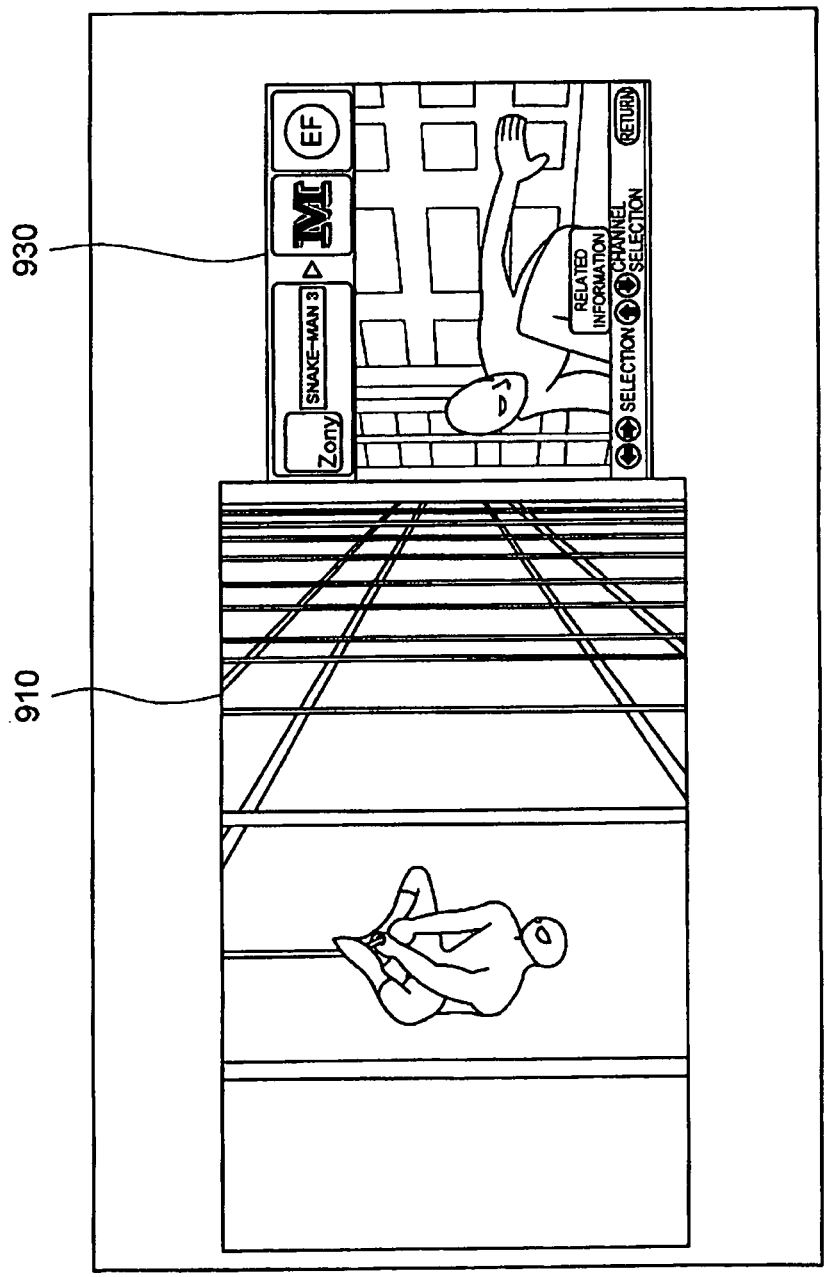
FIG. 30 is an explanatory view showing a display screen in the execution example 3 of an ECG scenario.

FIG. 30 shows the display screen when the related information which is related to the program "Snake-man 3" is selected from the ECG menu 920 on the display screen shown in FIG. 29. In an ECG menu 930, program information (still image) which is related to the program "Snake-man 3" is shown together with a related information button. In the upper part of the display screen of the ECG menu 930, program information (channel) which is related to the program "Snake-man 3" being viewed and the other currently viewable programs "Music TV" and "2010 World Cup" is displayed.

In this state, a user can start browsing of the related information such as program information and service provision information by operating (selecting) the related information button. Further, a user can select a desired channel based on the program information (channel) which is displayed in the upper part of the ECG menu 930 by remote control operation. A user can return to the display screen shown in FIG. 29 by operating (selecting) the "Return" button on the display screen of the ECG menu 930.

Figure 31:
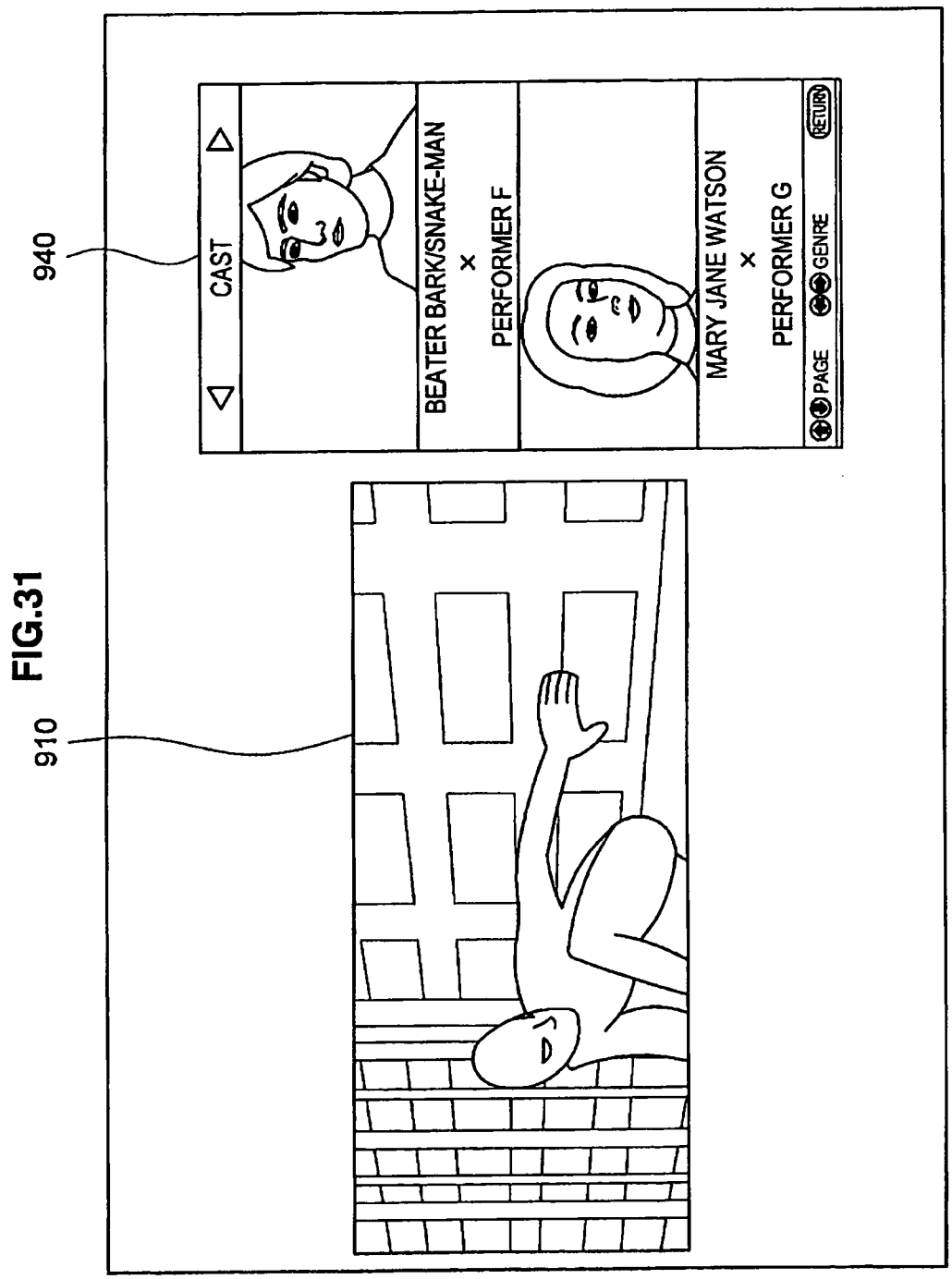
FIG. 31 is an explanatory view showing a display screen in the execution example 3 of an ECG scenario.

FIG. 31 shows the display screen when the related information button is operated (selected) from the ECG menu 930 on the display screen shown in FIG. 30. In the display area of the ECG menu 930, the display screen of an ECG scenario newly appears, and the ECG scenario is activated. On the display screen shown n FIG. 31, program information 940 concerning a performer of the program "Snake-man 3" is displayed as program information of the ECG scenario. The program information 940 includes the names "performer F" and "performer G", casting and profiles of the "performer F" and the "performer G".

In this state, a user can browse the detail information concerning the performer by selecting either one performer and determining the selection by remote control operation. Further, a user can operate the execution of the ECG scenario by selecting desired information (page, genre) related to the program by remote control operation. A user can return to the display screen shown in FIG. 30 by operating the "Return" button included in the program information 940.

Figure 32:
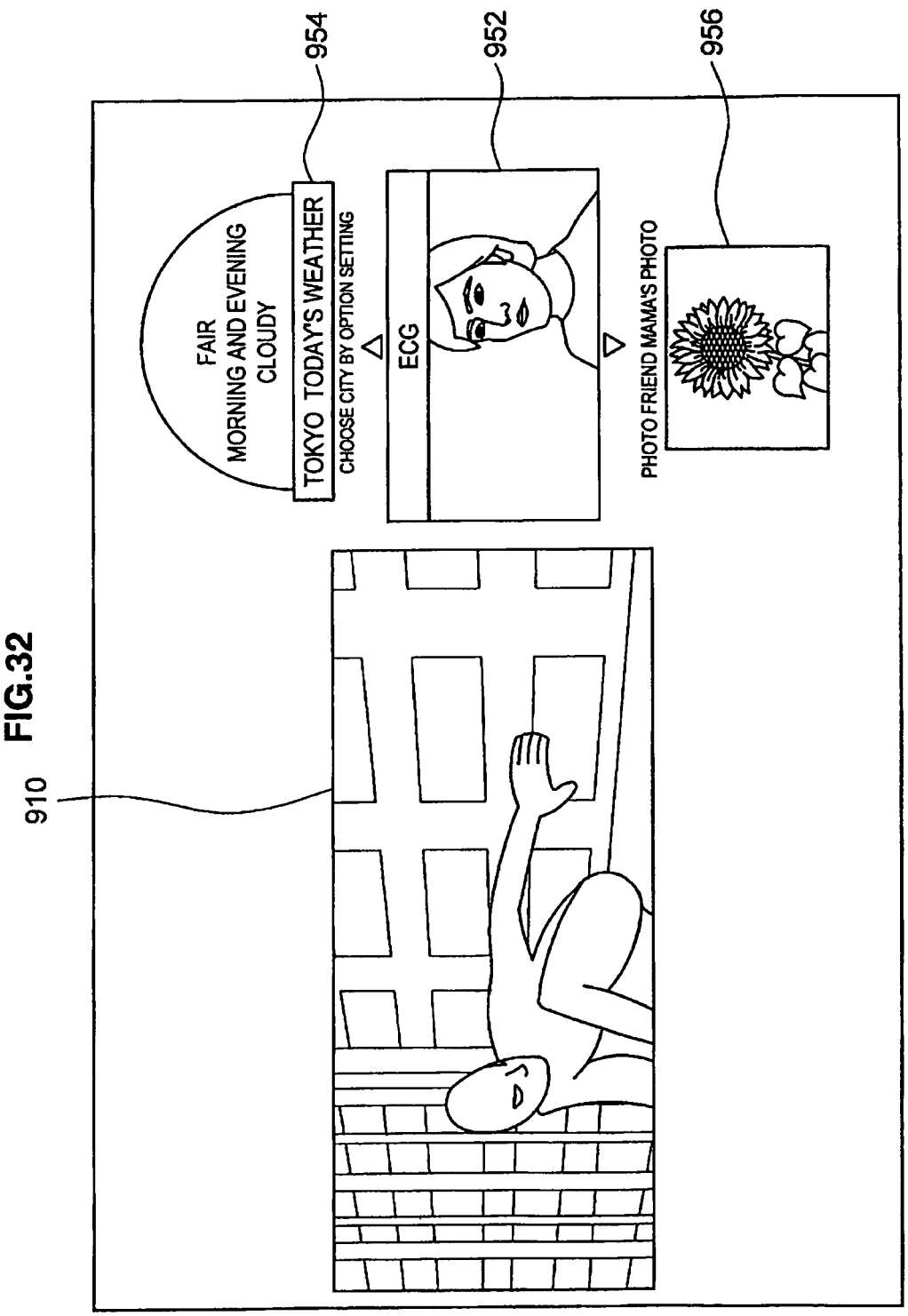
FIG. 32 is an explanatory view showing a display screen in the execution example 3 of an ECG scenario.

FIG. 32 shows a display screen when remote control operation is not performed for a predetermined length of time in the state of the display screen shown in FIG. 31. In the middle part of a menu display screen, an ECG scenario display screen 952 is displayed in a reduced scale, the ECG scenario is executed therein, and the profile of the "performer F" is displayed. In the upper and lower parts of the menu display screen, display screens 954 and 956 which display information about other programs appear.

In this state, a user can operate the execution of the ECG scenario by selecting the information which is displayed on the display screen of the ECG scenario by remote control operation or the like. If the remote control operation concerning the execution of the ECG scenario is not performed for a predetermined length of time, the execution of the ECG scenario is continued, and program information and service provision information are sequentially displayed on the ECG scenario display screen 952. A user can also browse the information concerning another program by remote control operation.

Figure 33:
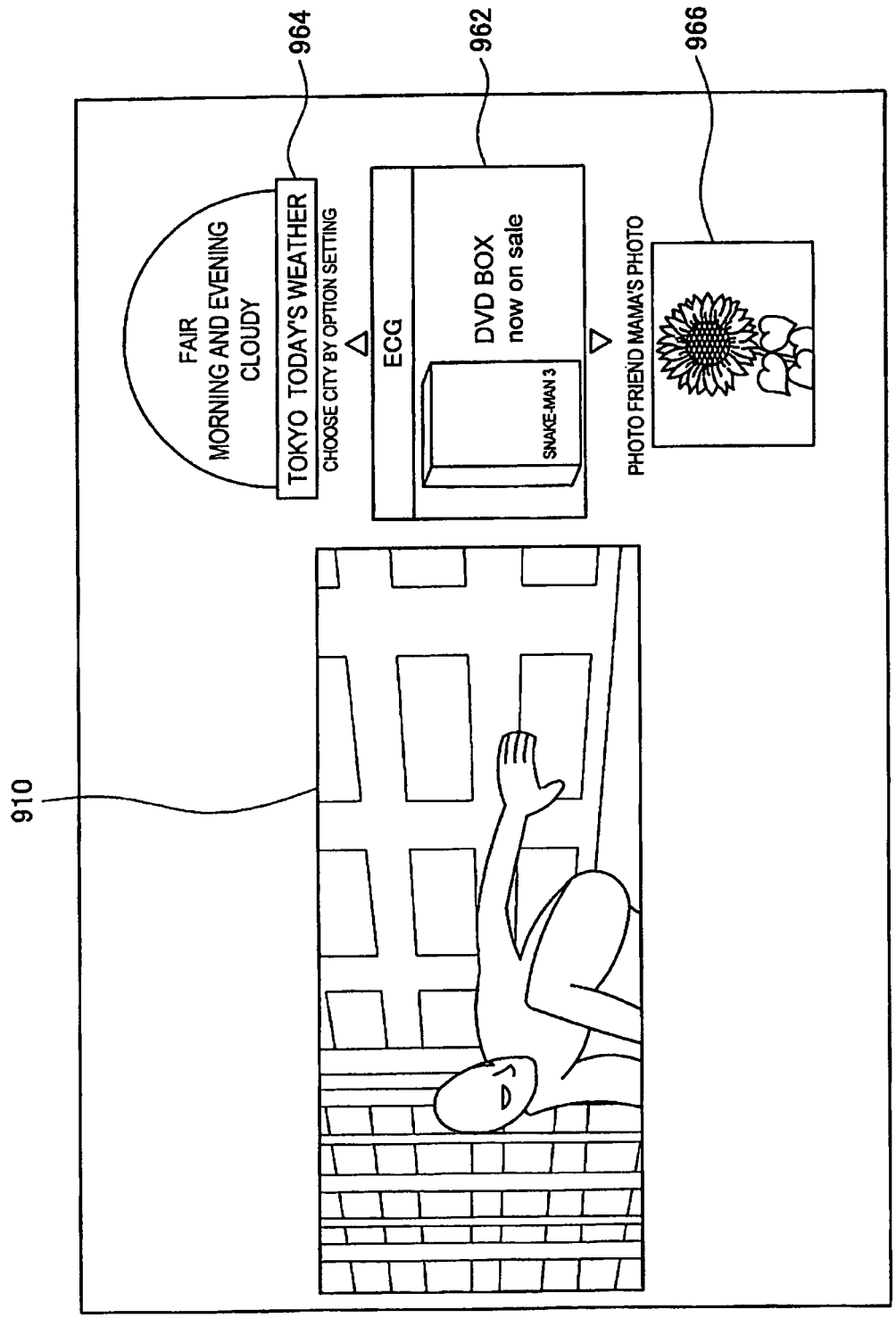
FIG. 33 is an explanatory view showing a display screen in the execution example 3 of an ECG scenario.

FIG. 33 shows a display screen when remote control operation is not performed for a predetermined length of time in the state of the display screen shown in FIG. 32. On an ECG scenario display screen 962 in the middle part of a menu display screen, sales information of DVD is displayed as service provision information.

Figure 34:
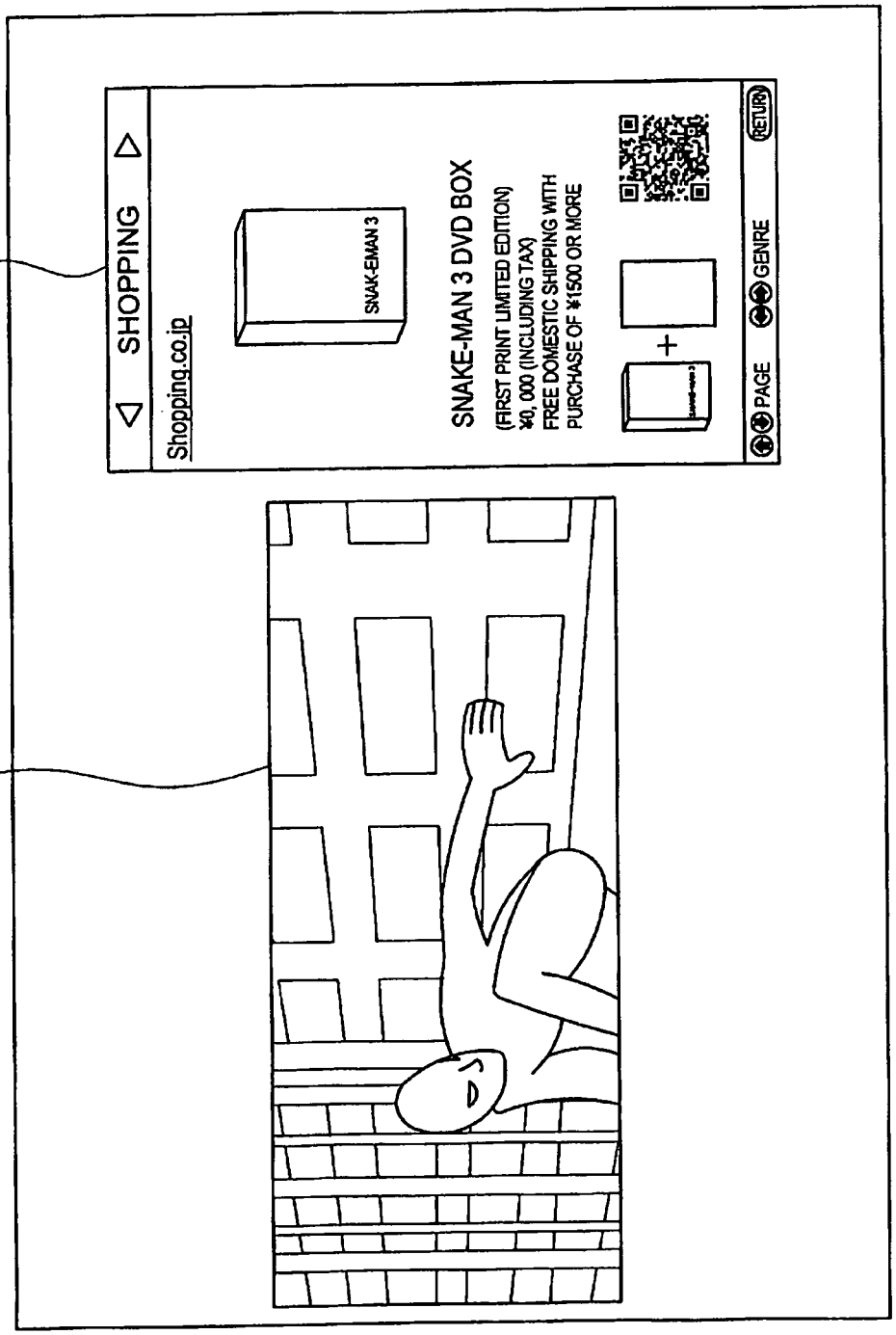
FIG. 34 is an explanatory view showing a display screen in the execution example 3 of an ECG scenario.

FIG. 34 shows a display screen when sales information of DVD is selected by remote control operation in the state of the display screen of FIG. 33. In a menu display screen, an ECG scenario display screen 970 is displayed in an enlarged scale, and the detail of the sales information of DVD is displayed as detail information concerning service provision information. The detail information includes a product name, image, detail, price, place to obtain more detail information and so on.

In this state, a user can browse a Web page to obtain more detail information by selecting the place to obtain more detail information by remote control operation. After the detail information is displayed, prescribed product purchase processing is performed between a user of the receiving terminal 100 and the sponsor 400. Further, a user can operate the execution of an ECG scenario by selecting desired information (page, genre) related to the program by remote control operation, for example. A user can return to the display screen shown in FIG. 33 by operating the "Return" button on the ECG scenario display screen 970.

Second Embodiment

Configuration of Receiving Terminal and ECG Server

Figure 35:
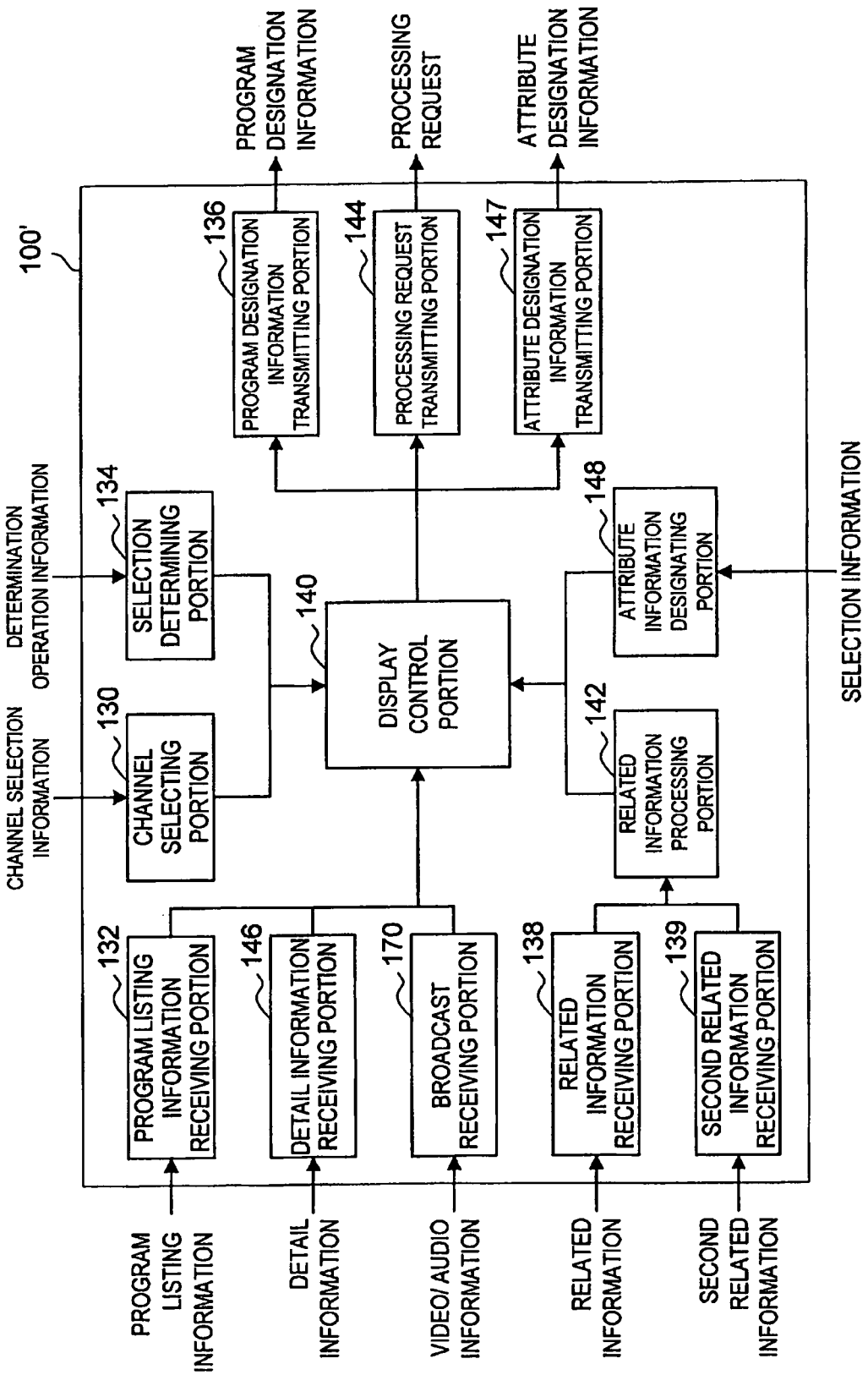
FIG. 35 is a block diagram showing main elements of a receiving terminal according to a second embodiment of the present invention.
Figure 36:
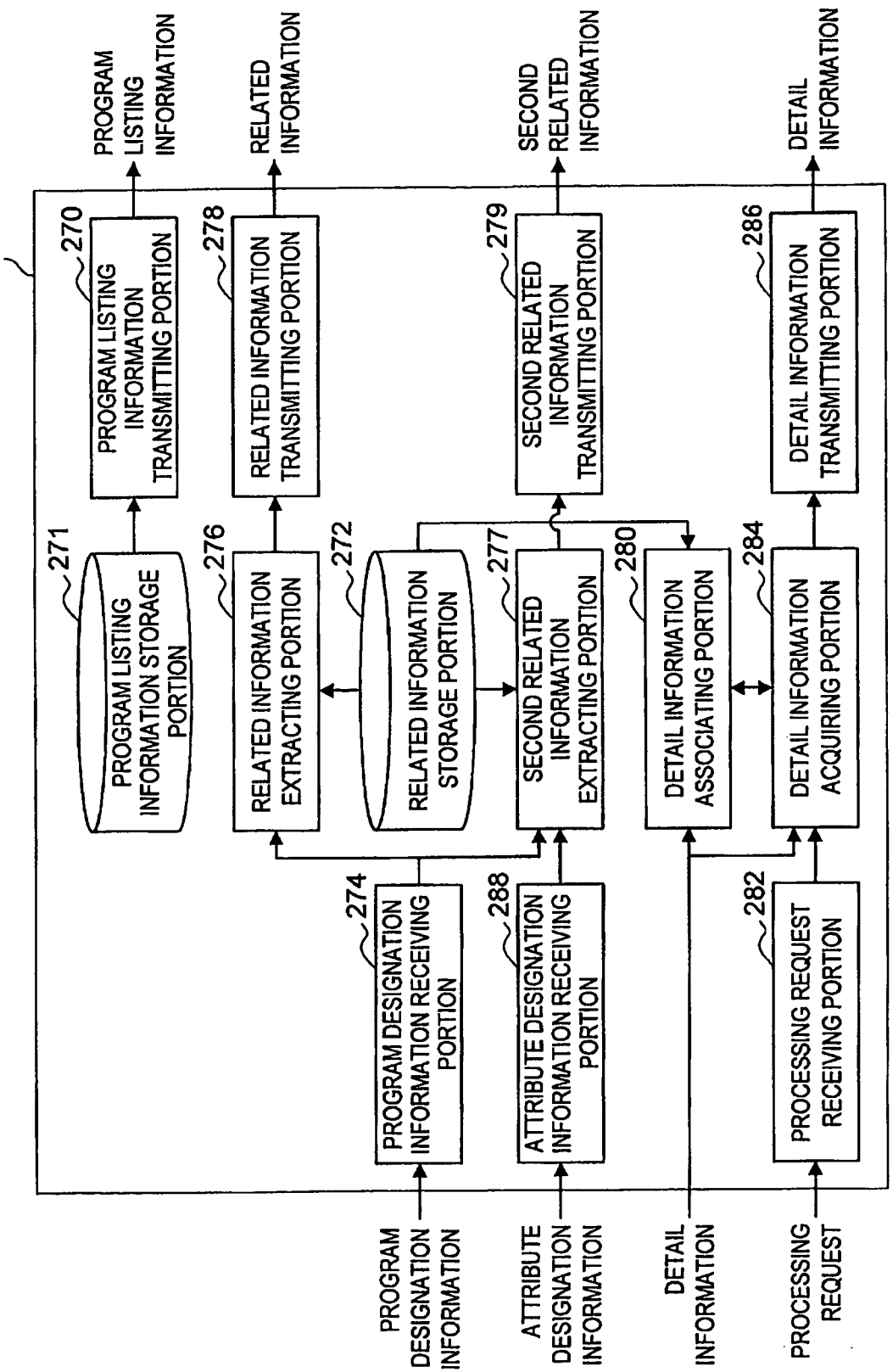
FIG. 36 is a block diagram showing main elements of an ECG server according to the second embodiment of the present invention.

FIGS. 35 and 36 are block diagrams showing main elements of an information providing system according to a second embodiment of the present invention. The elements which are identical to the main elements of the information providing system according to the first embodiment are not repeatedly described below.

Referring to FIG. 35, a receiving terminal 100' according to this embodiment includes an attribute information designating portion 148, an attribute designation information transmitting portion 147 and a second related information receiving portion 139 in addition to the main elements of the receiving terminal 100 according to the first embodiment.

The attribute information designating portion 148 is used for a user to designate attribute information in order to select information with a prescribed attribute from a plurality of pieces of information which are included in related information. The attribute designation information transmitting portion 147 transmits the designated attribute information as attribute designation information to an ECG server 200'. The second related information receiving portion 139 receives second related information which is composed of the information with the attribute that is designated by the attribute designation information, which is selectively extracted from a plurality of pieces of information that are included in the related information corresponding a program that is designated by program designation information and then edited, from the ECG server 200'.

Referring to FIG. 36, the ECG server 200' according to this embodiment includes an attribute designation information receiving portion 288, a second related information extracting portion 277 and a second related information transmitting portion 279 in addition to the main elements of the ECG server 200 according to the first embodiment.

The attribute designation information receiving portion 288 receives attribute designation information which is designated to select the information with a prescribed attribute from a plurality of pieces of information that are included in the related information from the receiving terminal 100'. The second related information extracting portion 277 extracts the related information which corresponds to the program that is designated by the program designation information and selectively extracts the information with the attribute that is designated by the attribute designation information from a plurality of pieces of information that are included in the extracted related information and edits the extracted information as second related information. The second related information transmitting portion 279 transmits the edited second related information to the receiving terminal 100'.

Description of Operation

Figure 37:
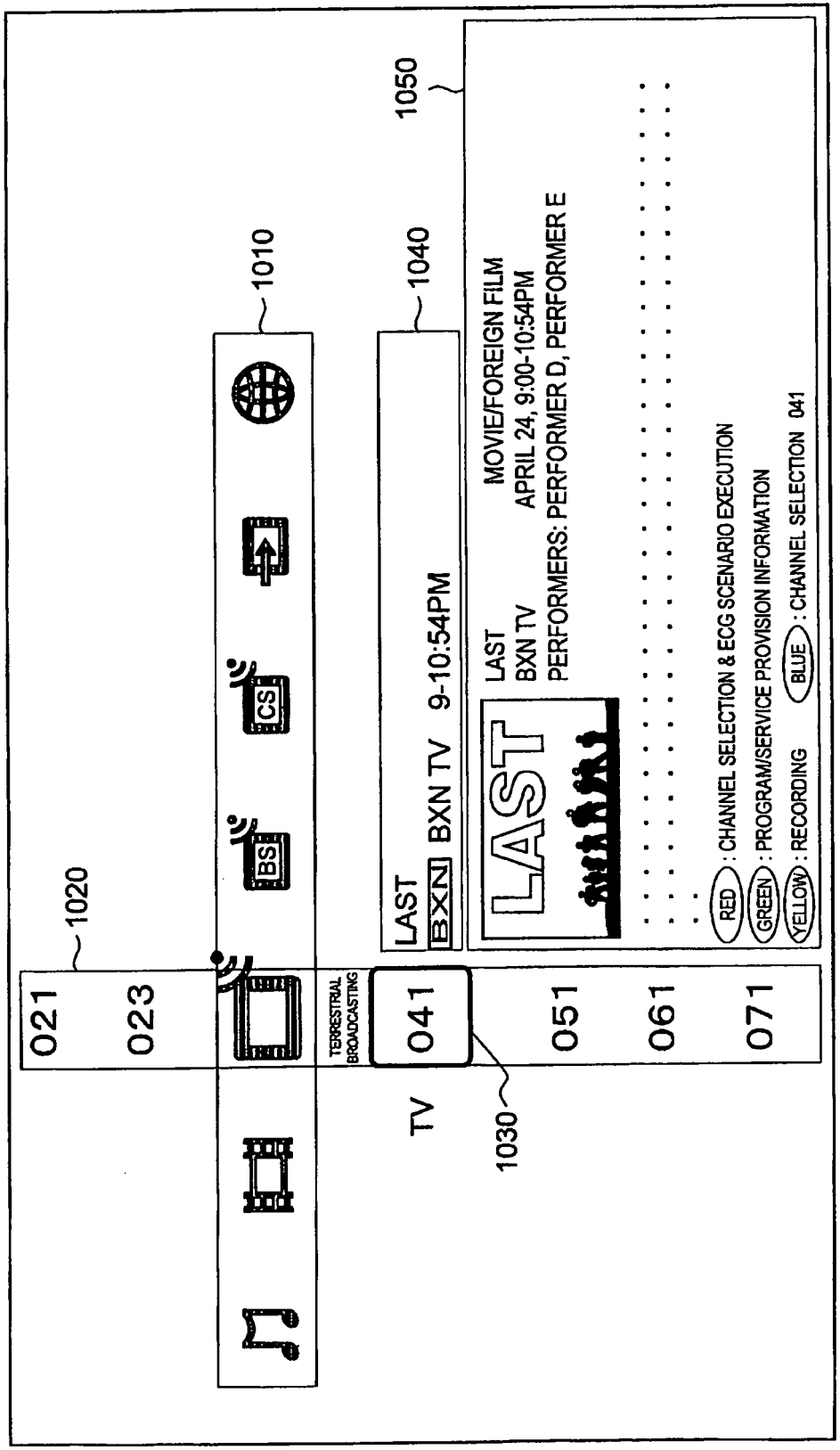
FIG. 37 is an explanatory view showing an example of the operation of an information providing system.
Figure 38:
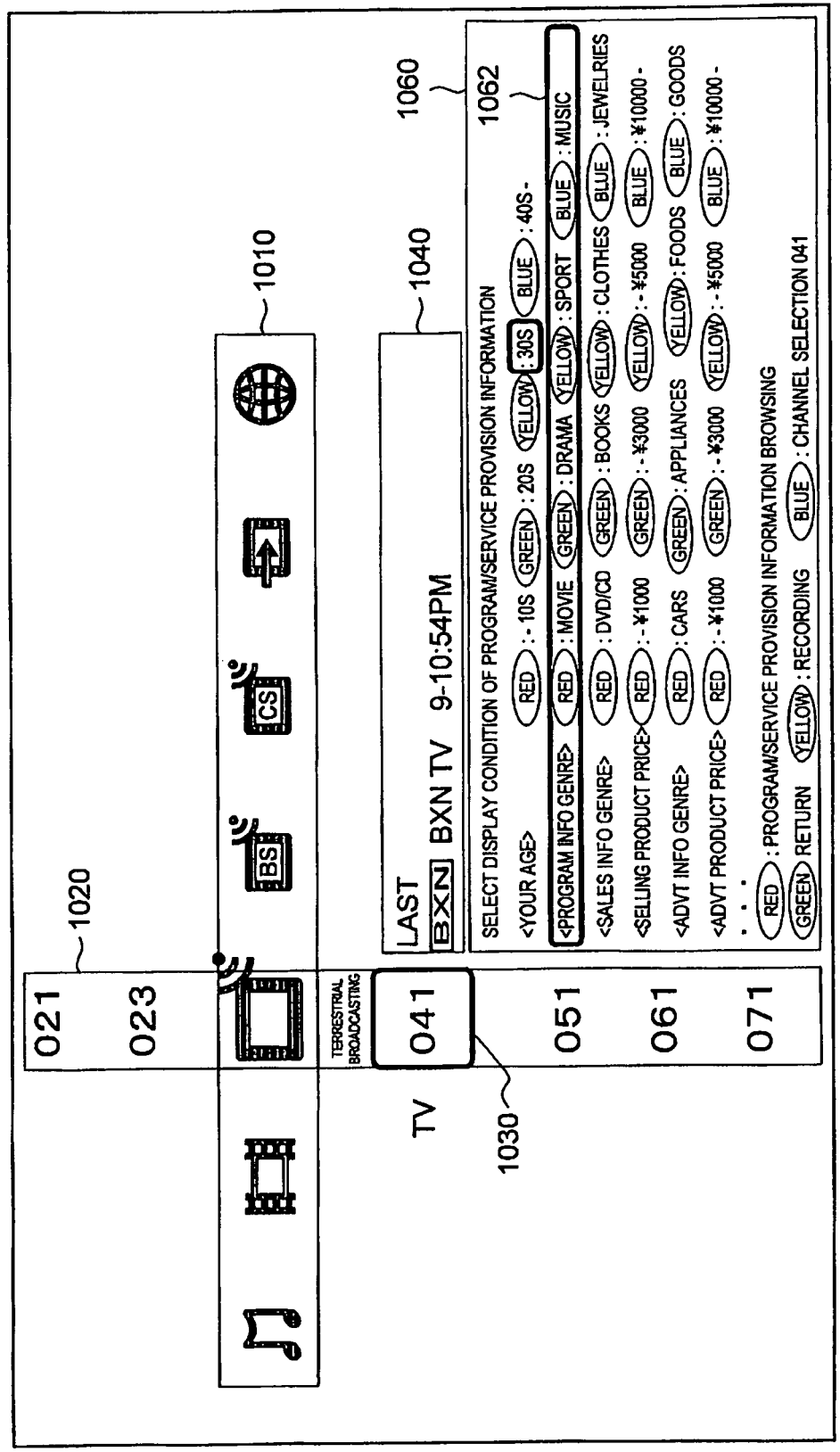
FIG. 38 is an explanatory view showing an example of the operation of an information providing system.
Figure 39:
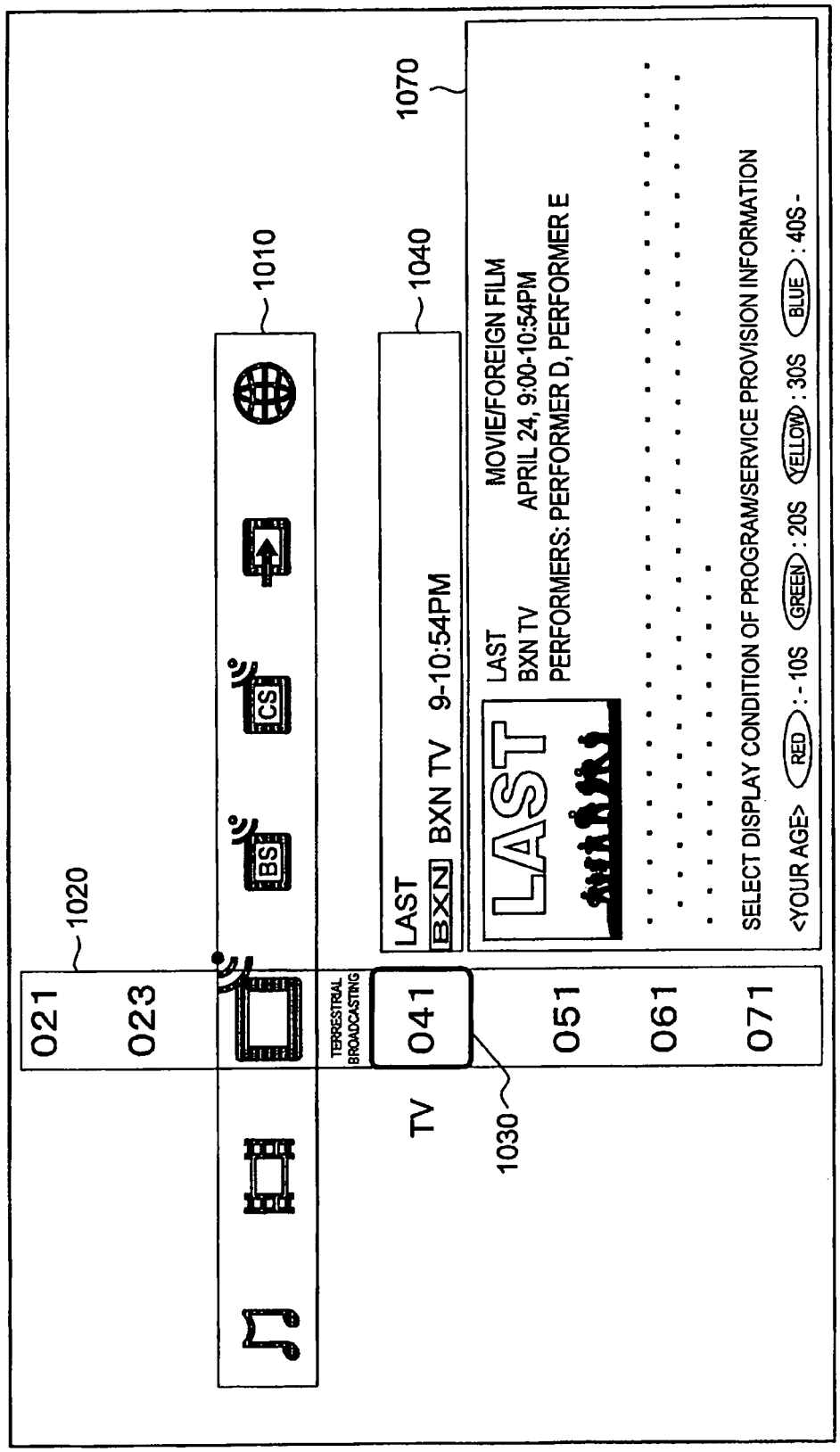
FIG. 39 is an explanatory view showing an example of the operation of an information providing system.

FIGS. 37 to 39 are explanatory views showing an example of the operation of the information providing system according to this embodiment. The information providing system according to this embodiment is different from the information providing system according to the first embodiment in that a channel selection menu is displayed separately from video information which is being viewed.

In the receiving terminal 100' of the information providing system according to this embodiment, a channel selection menu as shown in FIG. 37 is executed and displayed upon activation of the device, for example. In the central part of the channel selection menu, functional icons 1010 for selecting available functions are displayed in a single horizontal row, and content icons 1020 for selecting available contents for each function are displayed in a single vertical line, intersecting with the functional icons 1010. The point of the intersection of the functional icon row and the content icon line is fixed to a predetermined position on the display screen.

The available functions may include playback of audio information, playback of video information, viewing of a terrestrial broadcast program, viewing of a satellite broadcast program, viewing of a cable broadcast program, viewing of an external input program, use of Internet and so on. The available contents may include various channels of TV stations which provide terrestrial broadcasting for a terrestrial broadcast program viewing function, for example.

A user can smoothly select the function and the content to use by horizontally scrolling the display of the functional icons 1010 and vertically scrolling the display of the content icons 1020 using the up, down, left and right buttons of the remote control 190, for example.

In an example shown in FIG. 37, the functional icon which indicates the viewing of a terrestrial broadcast program is selected, and the program content of the channel "041" is selected as one of available contents by a cursor frame 1030. On the right side of the cursor frame 1030, a display frame 1040 which indicates the name of the currently viewable program in the relevant channel is displayed.

If a predetermined length of time is elapsed in this state, for example, a display frame 1050 which indicates program information (title video, program name, category, broadcast station name, scheduled broadcast date and time, cast, overview summary etc.) of the selected program is displayed.

The name of the currently viewable program and the program information may be switched appropriately according to the selection operation of the function and the content to use. Specifically, program designation information which designates a selected content (program) is transmitted from the receiving terminal 100' to the ECG server 200', and program information which corresponds to the program that is designated by the program designation information is transmitted from the ECG server 200' to the receiving terminal 100' and displayed. Alternatively, program listing information which shows program scheduling information for a prescribed period may be prestored in the receiving terminal 100', and at least part of the relevant information may be read from the program listing information according to the selected program and displayed.

In the lower part of the display frame 1050, operation information for prompting a user to operate the remote control 190 is displayed. In the example of FIG. 37, "Red: channel selection & ECG scenario execution; Green: program/service provision information; Yellow: recording; Blue: channel selection 041" is displayed as the operation information. "Red", "Green", "Yellow" and "Blue" which are displayed as the operation information indicate selection buttons which are included in the remote control 190.

If the "Red" button is operated in this state, the execution of the channel selection menu is interrupted for channel selection and ECG scenario execution, and the display screen is switched to the display as shown in FIG. 23, for example, so that the video information of the program is displayed and the execution of the ECG scenario related to the program is started. The flow of the operation by a user from the channel selection to the ECG scenario execution is thereby smooth. If the "Green" button is operated, after the selection of a display condition for program information and service provision information by a user which is described later, the ECG scenario related to the program is executed, so that the display of the program information and the service provision information is started. If the "Yellow" button is operated, the selection of a recording condition or the like by a user is executed. If the "Blue" button is operated, the display screen of a channel selection menu is switched for the viewing of the program and the video information of the program is displayed.

In the execution of the ECG scenario, program designation information which designates the program that is selected by the channel selection menu is transmitted from the receiving terminal 100' to the ECG server 200', and the ECG scenario which corresponds to the program that is designated by the program designation information is transmitted from the ECG server 200' to the receiving terminal 100' and executed and displayed in the receiving terminal 100'.

If the "Green" button is operated in the channel selection menu, a display frame 1060 for selecting a display condition of program information and service provision information as shown in FIG. 38, for example, is displayed. In the display frame 1060, a display (extraction) condition which is used in the ECG server 200' to extract the program information and the service provision information to be provided to and displayed in the receiving terminal 100' is displayed. The display condition may be an age of a user, a genre of program information to be displayed, a genre of sales information, a price of a selling product, a genre of advertising information, a price of an advertising product and so on. For the display condition "Your age", selection items for each display condition, such as "-10s", "20s", "30s" and "40s-" are set, for example.

A user can select a desired display condition by operating the up and down buttons and select a selection item for each display condition by operating the "Red", "Green", "Yellow" or "Blue" button, for example. In the example of FIG. 38, the selection item "30s" is selected as the display condition "Your age", and the next display condition "program information genre" is selected by a selection frame 1062 for the selection of a selection item. Depending on the display condition, a plurality of selection items may be selectable. Further, a selection item may be selected for a part of the display conditions only.

In the lower part of the display frame 1060, operation information for prompting a user to operate the remote control 190 is displayed. In the example of FIG. 38, "Red: program/service provision information browsing; Green: return; Yellow: recording; Blue: channel selection 041" is displayed as the operation information.

If the "Red" button is operated in the state where a selection frame 1062 is moved to the section of the operation information using the up and down buttons, the selection item of the display condition which is selected is registered and the viewing of the program information and the service provision information are started. If the "Green" button is operated, the selection operation of the display condition ends and the display of the display frame 1060 is switched to the display frame 1050 of the program information as described earlier. If the "Yellow" button is operated, the selection of a recording condition or the like by a user is executed to record the program. If the "Blue" button is operated, the display screen of the channel selection menu is switched, and the video information of the program is displayed for the viewing of the program.

FIG. 39 is an explanatory view showing another example of a display frame for selecting a display condition of program information and service provision information. In the example of FIG. 39, program information of a selected program is shown in a display frame 1070 as in the case shown in FIG. 37. In the lower part of the display frame 1070, operation information is displayed. In the example of FIG. 39, selection items of the display condition concerning an age of a user, "Red: -10s, Green: 20s, Yellow: 30s; Blue: 40s-" is displayed as operation information.

Therefore, a user can select a selection item of the display condition by operating the "Red", "Green", "Yellow" or "Blue" button. The display conditions which are displayed as the operation condition are previously set for each content (program) that is selected by the content icon 1020.

In the browsing of program information and service provision information, a selection item (attribute of related information) of a display condition is selected. Attribute designation information which designates a selected selection item may be stored in a storage portion of the receiving terminal 100', for example. In such a case, if the receiving terminal 100' is used by a plurality of users, a selection item of a display condition may be selected for each user and stored as attribute designation information for each user. Each user of the receiving terminal 100' can thereby acquire the program information and/or service provision information which match the user's wish by selecting and reading the program designation information for the user.

In the execution of the ECG scenario, the program designation information which designates the selected program and the selected or stored attribute designation information are transmitted from the receiving terminal 100' to the ECG server 200'. The ECG scenario may be displayed in the display frame 1050, 1060 or 1070 during the execution of the channel selection menu, or it may be displayed after the execution of the channel selection menu is interrupted and the display screen is switched to the display as shown in FIG. 23, for example.

In the ECG server 200', the ECG scenario of the program which corresponds to the program that is designated by the program designation information is extracted. Then, the program information and/or the service provision information which has the attribute that is designated by the attribute designation information is selected (extracted) from the program information and the service provision information which are contained in the extracted ECG scenario, and reedited as a new ECG scenario (second related information). For example, if the selection item "books" is selected as "sales information genre", service provision information concerning sales information of books is extracted from the service provision information. Further, if the selection item "¥10000-" is selected as "selling product price", service provision information concerning sales information of books with the price of 10,000 yen or higher is extracted.

After that, the ECG scenario which is reedited based on the attribute designation information is transmitted from the ECG server 200' to the receiving terminal 100' and executed and displayed in the receiving terminal 100'. Instead of selecting and operating a display condition upon each browsing of program information and service provision information, previously selected and stored attribute designation information may be read and transmitted to the ECG server 200'.

In the information providing system according to this embodiment, a channel selection menu (program listing information) and program information are displayed separately from the display of video information of a program being viewed. Therefore, the amount of program information to be displayed in a channel selection menu is not limited due to the limitation of a display area as in the case where a channel selection menu is displayed at the same time as video information, and a user can thereby select a channel without suffering from low visibility and operability. A user can thereby select a channel of a desired program accurately by referring to the program information which is displayed in the channel selection menu. Further, because the channel selection menu does not overlap video information and video information is not scaled down, a user can view a program without suffering from low visibility.

Further, program information and/or service provision information which is provided from the ECG server 200' is designated by a user. A user can thereby acquire the program information and/or the service provision information which match the user's wish rather than the program information and/or the service provision information which are intended for users in general, so that the user can efficiently browse desired information. On the other hand, the content provider 300 can thereby effectively provide the program information and/or the service provision information which match the user's wish to a user through the ECG server 200'. Further, the content provider 300 and the sponsor 400 can thereby keep track of preferences of users in general about program viewing and service provision based on the program designation information and the attribute designation information which are provided from users to the ECG server 200' so as to improve program scheduling and service provision.

It should be understood by those skilled in the art that various modifications, combinations, sub-combinations and alterations may occur depending on design requirements and other factors insofar as they are within the scope of the appended claims or the equivalents thereof.

What is claimed is:

1. A receiving device connected with an information providing device for providing information concerning a program through a communication network, comprising:
   a channel selecting portion to select a channel of a program to be received;
   a program listing information receiving portion to receive program listing information indicating a plurality of currently viewable programs from the information providing device;

a selection determining portion to select a program based on the program listing information and determine selection of the program;

a program designation information transmitting portion to transmit program designation information designating a selected channel or a program selected or determined based on the program listing information to the information providing device;

a related information receiving portion to receive related information including a plurality of pieces of information concerning a program edited and associated with the program and corresponding to a program designated by the program designation information from the information providing device; and a display control portion to perform display control to display a video of a selected channel or a determined program and the program listing information, and continuously cyclically sequentially display a plurality of pieces of visual information items included in the received related information until a user enters a command or the related information is updated such that the plurality of pieces of visual information items are continuously displayed one after another with a first visual information item redisplayed after a last visual information is item is displayed, the display control portion simultaneously displaying the selected channel or the determined program and the plurality of pieces of visual information items.

2. The receiving device according to claim 1, wherein the related information receiving portion receives scenario information containing set information in a scenario form, each set information including a combination of program information concerning a program and service provision information concerning the program information or including the program information, as the related information from the information providing device.

3. The receiving device according to claim 2, further comprising:

an attribute information designating portion to designate attribute information for selecting information with a prescribed attribute from a plurality of pieces of information included in the related information;

an attribute designation information transmitting portion to transmit the designated attribute information as attribute designation information to the information providing device; and a second related information receiving portion to receive second related information including information with an attribute designated by the attribute designation information selectively extracted from a plurality of pieces of information included in the related information corresponding a program designated by the program designation information and edited from the information providing device, wherein the display control portion performs display control to sequentially display a plurality of pieces of information included in the received second related information.

4. The receiving device according to claim 2, wherein the program listing information is displayed separately from a video of a selected channel or a determined program by the display control portion, the program designation information transmitting portion transmits the program designation information designating a program selected based on the program listing information to the information providing device, the related information receiving portion receives the related information corresponding to the program designated by the program designation information from the information providing device, and the display control portion performs display control to display the program information included in the received related information together with the program listing information.

5. The receiving device according to claim 2, further comprising:

a related information processing portion to process the related information received from the information providing device, wherein the related information processing portion processes the related information in such a way that a plurality of pieces of set information associated with a program are displayed according to preset priorities, and a plurality of pieces of service provision information associated with the program information are displayed according to preset priorities after the program information included in each set information is displayed, by display control of the display control portion.

6. The receiving device according to claim 5, wherein the related information processing portion processes the related information in such a way that the scenario information is repeatedly displayed by display control of the display control portion.

7. The receiving device according to claim 2, further comprising:

a processing request transmitting portion to transmit a processing request for requesting provision of detail information concerning selected program information to the information providing device when selection of the program information is determined, and transmit a processing request for requesting provision of detail information concerning selected service provision information to the information providing device when selection of the service provision information is determined; and a detail information receiving portion to receive detail information corresponding to the processing request from the information providing device, wherein the display control portion performs display control to display the received detail information.

8. The receiving device according to claim 2, wherein if the channel selecting portion and the selection determining portion are not operated for a predetermined length of time with the program listing information being displayed, the program designation information transmitting portion sequentially transmits the program designation information respectively designating a plurality of programs included in the program listing information to the information providing device, and the display control portion performs display control so as to sequentially display the related information received from the information providing device based on the program designation information.

9. The receiving device according to claim 2, wherein the display control portion performs display control in a video display area for displaying a video of a selected channel or a determined program or a prerecorded video, a program listing information display area for displaying the program listing information and a related information display area for displaying the related information, and the program listing information display area and the related information display area are arranged not to overlap the video display area.

10. The information providing device according to claim 1, wherein the plurality of pieces of visual information items includes visual information on goods relating to a performer in the video.

11. An information providing device connected with a receiving device for receiving a program through a communication network, comprising:
- a program listing information transmitting portion to transmit program listing information indicating a plurality of currently viewable programs to the receiving device;
- a related information storage portion to store related information including a plurality of pieces of visual information items concerning a program edited to be continuously cyclically sequentially displayed until a user enters a command or the related information is updated such that the plurality of pieces of visual information items are continuously displayed one after another with a first visual information item redisplayed after a last visual information is item is displayed, simultaneously with the program;
- a program designation information receiving portion to receive program designation information designating a selected channel or a program selected or determined based on the program listing information from the receiving device;
- a related information extracting portion to extract related information corresponding to a program designated by the program designation information from the related information storage portion; and
- a related information transmitting portion to transmit the extracted related information to the receiving device.

12. The information providing device according to claim 11, wherein the related information storage portion stores scenario information containing set information in a scenario form, each set information including a combination of program information concerning a program and service provision information concerning the program information or including the program information, as the related information in association with the program.

13. The information providing device according to claim 12, further comprising:
- an attribute designation information receiving portion to receive attribute designation information designated for selecting information with a prescribed attribute from a plurality of pieces of information included in the related information from the receiving device;
- a second related information extracting portion to extract the related information corresponding to a program designated by the program designation information from the related information storage portion, selectively extract information with an attribute designated by the attribute designation information from a plurality of pieces of information included in the extracted related information and edit the selectively extracted information as second related information; and
- a second related information transmitting portion to transmit the edited second related information to the receiving device.

14. The information providing device according to claim 12, wherein the related information storage portion stores scenario information containing a plurality of pieces of set information prioritized concerning the program, each set information including a combination of the program information and a plurality of pieces of service provision information prioritized concerning the program information or including the program information, as the related information in association with the program.

15. The information providing device according to claim 12, further comprising:
- a detail information associating portion to associate detail information concerning the program information and the service provision information respectively with the program information and the service provision information;
- a processing request receiving portion to receive a processing request for requesting provision of detail information concerning the program information or detail information concerning the service provision information from the receiving device;
- a detail information acquiring portion to acquire the detail information corresponding to the received processing request; and
- a detail information transmitting portion to transmit the detail information acquired based on the processing request to the receiving device.

16. The information providing device according to claim 15, wherein the detail information associating portion associates information for executing processing necessary for service provision based on the service provision information with the service provision information.

17. An information providing system where a receiving device for receiving a program and an information providing device for providing information concerning a program are connected through a communication network, wherein the receiving device includes:
- a channel selecting portion to select a channel of a program to be received;
- a program listing information receiving portion to receive program listing information indicating a plurality of currently viewable programs from the information providing device;
- a selection determining portion to select a program based on the program listing information and determine selection of the program;
- a program designation information transmitting portion to transmit program designation information designating a selected channel or a program selected or determined based on the program listing information to the information providing device;
- a related information receiving portion to receive related information based on the program designation information from the information providing device; and
- a display control portion to perform display control to display a video of a selected channel or a determined program and the program listing information, and continuously cyclically sequentially display a plurality of pieces of visual information items included in the received related information until a user enters a command or the related information is updated such that the plurality of pieces of visual information items arc continuously displayed one after another with a first visual information item redisplayed after a last visual information is item is displayed, the display control portion simultaneously displaying the selected channel or the determined program and the plurality of pieces of visual information items, and the information providing device includes:
- a program listing information transmitting portion to transmit the program listing information indicating a plurality of currently viewable programs to the receiving device;
- a related information storage portion to store the related information including a plurality of edited pieces of information concerning a program in association with the program;
- a program designation information receiving portion to receive the program designation information from the receiving device;

a related information extracting portion to extract the related information corresponding to a program designated by the program designation information from the related information storage portion; and a related information transmitting portion to transmit the extracted related information to the receiving device.

18. An information providing method applied to an information providing system where a receiving device for receiving a program and an information providing device for providing information concerning a program are connected through a communication network, the method comprising:

storing related information including a plurality of edited pieces of information concerning a program in association with the program by the information providing device;

providing program listing information indicating a plurality of currently viewable programs to the receiving device by the information providing device;

selecting a channel of a program to be received or selecting or determining a program based on the program listing information by the receiving device;

acquiring program designation information designating a selected channel or a program selected or determined based on the program listing information from the receiving device by the information providing device;

extracting related information corresponding to a program designated by the program designation information from the related information stored in association with the program and providing the extracted related information to the receiving device by the information providing device; and performing display control to display a video of a selected channel or a determined program and the program listing information, and continuously cyclically sequentially display a plurality of pieces of visual information items included in the extracted related information by the receiving device until a user enters a command or the related information is updated such that the plurality of pieces of visual information items are continuously displayed one after another with a first visual information item redisplayed after a last visual information is item is displayed, the selected channel or the determined program and the plurality of pieces of visual information items being displayed simultaneously.

19. A non-transitory computer readable medium encoded with a program applied to an information providing system where a receiving device for receiving a program and an information providing device for providing information concerning a program are connected through a communication network, the program causing a computer to implement a method comprising:

selecting a channel of a program to be received;

receiving program listing information indicating a plurality of currently viewable programs from the information providing device;

selecting a program based on the program listing information and determine selection of the program;

transmitting program designation information designating a selected channel or a program selected or determined based on the program listing information to the information providing device;

receiving related information including a plurality of pieces of information concerning a program edited and associated with the program and corresponding to a program designated by the program designation information from the information providing device; and performing display control to display a video of a selected channel or a determined program and the program listing information, and cyclically sequentially display a plurality of pieces of visual information items included in the received related information until a user enters a command or the related information is updated such that the plurality of pieces of visual information items are continuously displayed one after another with a first visual information item redisplayed after a last visual information is item is displayed, the selected channel or the determined program and the plurality of pieces of visual information items being displayed simultaneously.

20. A non-transitory computer readable medium encoded with a program applied to an information providing system where a receiving device for receiving a program and an information providing device for providing information concerning a program are connected through a communication network, the program causing a computer to implement a method comprising:

transmitting program listing information indicating a plurality of currently viewable programs to the receiving device;

storing related information including a plurality of pieces of visual information items concerning a program edited to be cyclically sequentially displayed until a user enters a command or the related information is updated such that the plurality of pieces of visual information items are continuously displayed one after another with a first visual information item redisplayed after a last visual information is item is displayed, simultaneously with the program;

receiving program designation information designating a selected channel or a program selected or determined based on the program listing information from the receiving device;

extracting related information corresponding to a program designated by the program designation information from the related information storage portion; and transmitting the extracted related information to the receiving device.

* * * * *